United States Patent [19]
Tanii et al.

[11] Patent Number: 5,798,625
[45] Date of Patent: Aug. 25, 1998

[54] DC MOTOR AND CONTROLLING SYSTEM THEREFOR

[75] Inventors: Junichi Tanii; Hiroshi Ootsuka; Toshihiko Taniguchi, all of Sakai; Takahisa Shimada; Sadafusa Tsuji, both of Osaka, all of Japan

[73] Assignee: Minolta Camera Co., Ltd., Osaka, Japan

[21] Appl. No.: 509,063

[22] Filed: Jul. 31, 1995

Related U.S. Application Data

[62] Division of Ser. No. 727,101, Jul. 9, 1991, Pat. No. 5,461,694.

[30] Foreign Application Priority Data

Mar. 10, 1986 [JP] Japan ................. 61-52299
Dec. 9, 1986 [JP] Japan ................. 61-292949

[51] Int. Cl.$^6$ ............................................ H02K 13/00
[52] U.S. Cl. ........................... 318/541; 310/136; 310/148
[58] Field of Search ............................. 318/432, 434, 318/521–542; 310/136–142, 148–151, 229–253, 127–131, 62 A

[56] References Cited

U.S. PATENT DOCUMENTS

| | | | |
|---|---|---|---|
| 2,367,079 | 1/1945 | Wiest | 310/71 |
| 2,929,944 | 3/1960 | Shewmon | 310/71 |
| 4,177,397 | 12/1979 | Lill | 310/71 |
| 4,318,022 | 3/1982 | Miller | 310/71 |
| 4,396,875 | 8/1983 | Yamauchi | 318/254 |
| 4,434,389 | 2/1984 | Langely et al. | 318/254 |
| 4,437,027 | 3/1984 | Yamamoto et al. | 310/71 |
| 4,513,214 | 4/1985 | Dieringer | 310/71 |
| 4,568,847 | 2/1986 | Schmider | 310/208 X |
| 4,862,581 | 9/1989 | Royer | 310/71 |
| 4,910,790 | 3/1990 | Kershaw | 310/136 X |
| 5,089,729 | 2/1992 | Moores, Jr. | 310/50 |
| 5,294,875 | 3/1994 | Reddy | 318/801 |

*Primary Examiner*—David S. Martin
*Attorney, Agent, or Firm*—Watson Cole Grindle Watson, PLLC

[57] ABSTRACT

A dc motor wherein a driving force thereof can be used effectively with a simple and compact mechanical construction and a motor controlling system which can control such a dc motor to be driven efficiently. The motor comprises at least two coils, and change-over means for changing electric connection of the coils to change over the motor, when power is selectively supplied to the coils, between a first mode in which the torque produced is relatively high and the rotational frequency is relatively low and a second mode in which the torque is relatively low and the rotational frequency is relatively high. The motor controlling system includes selecting means for automatically selecting one of the first and second modes to control the change-over means in response to a given condition of the motor.

20 Claims, 43 Drawing Sheets

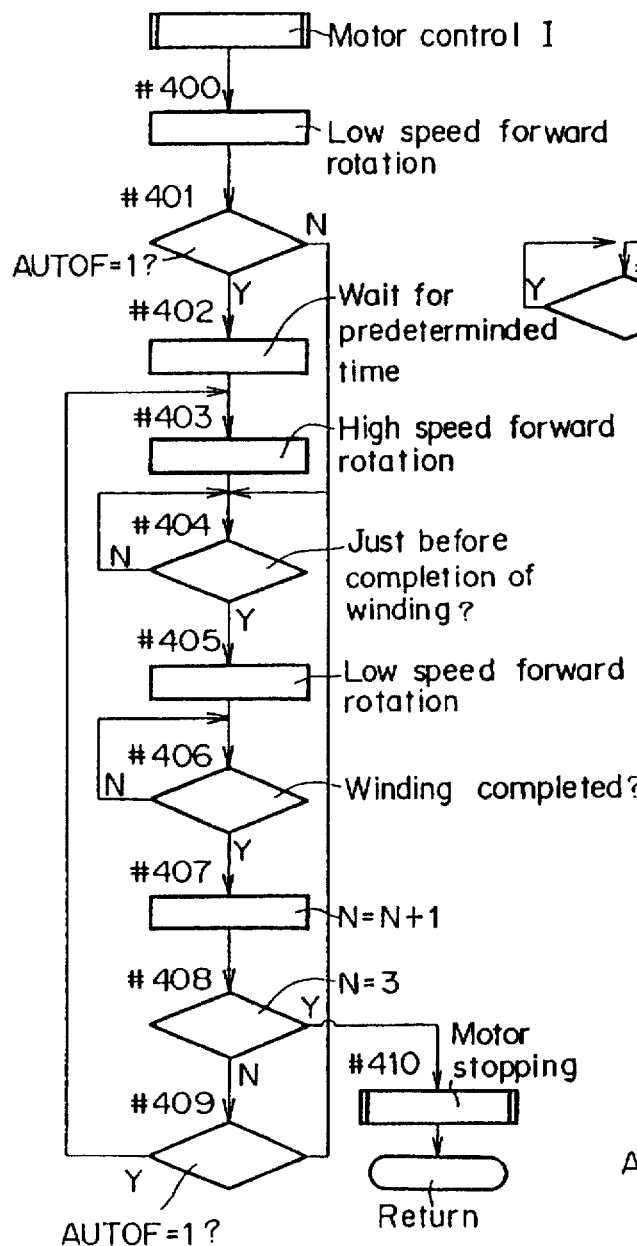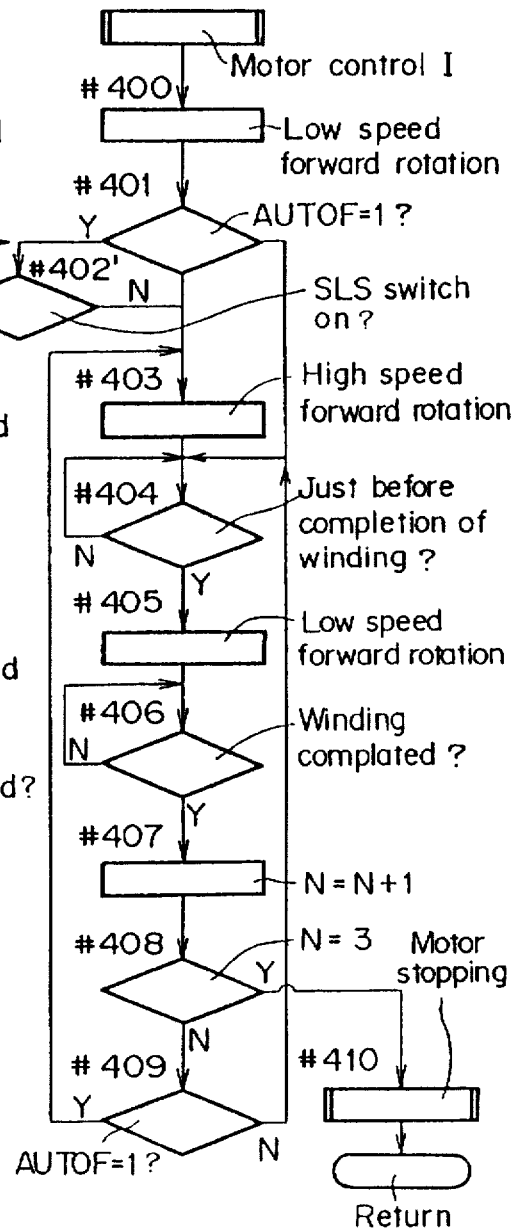

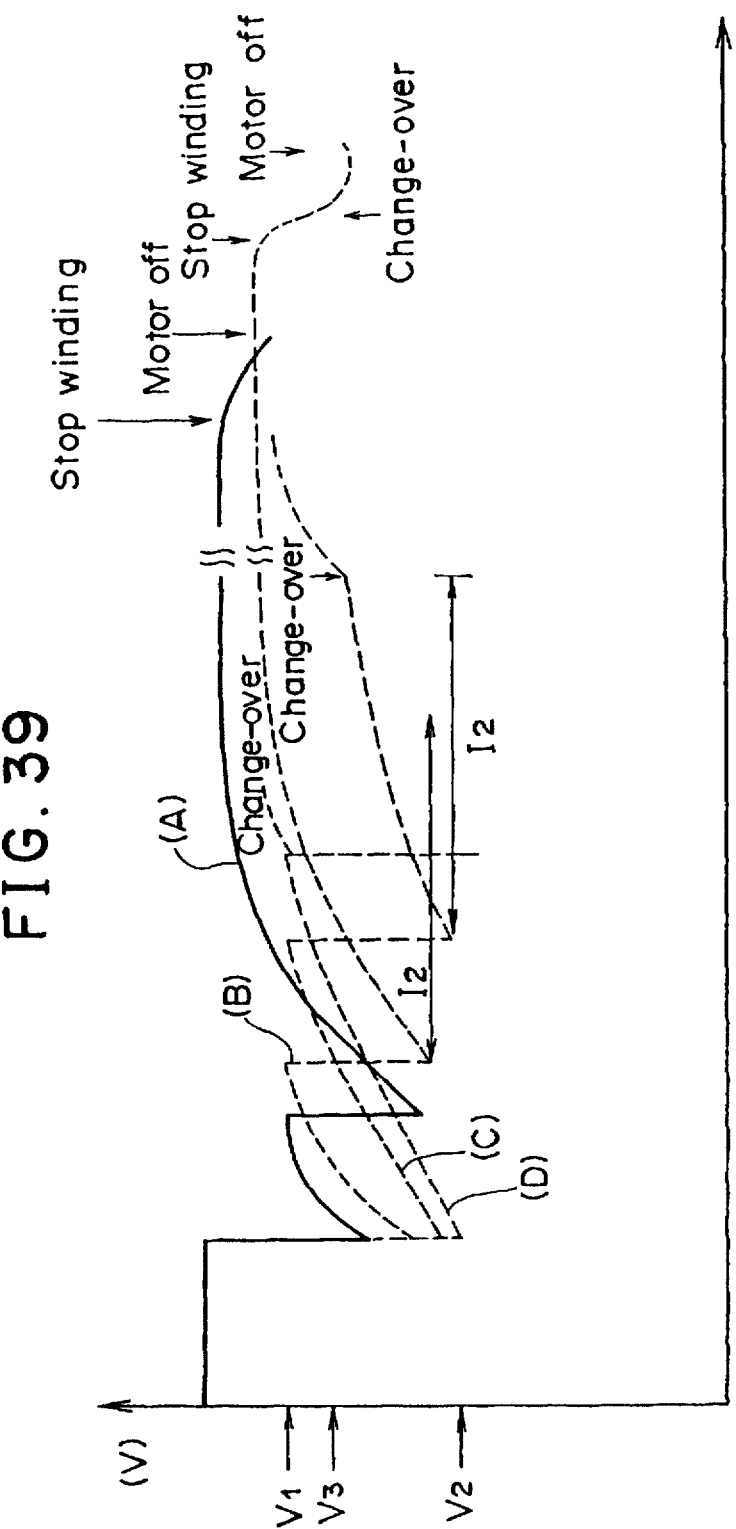

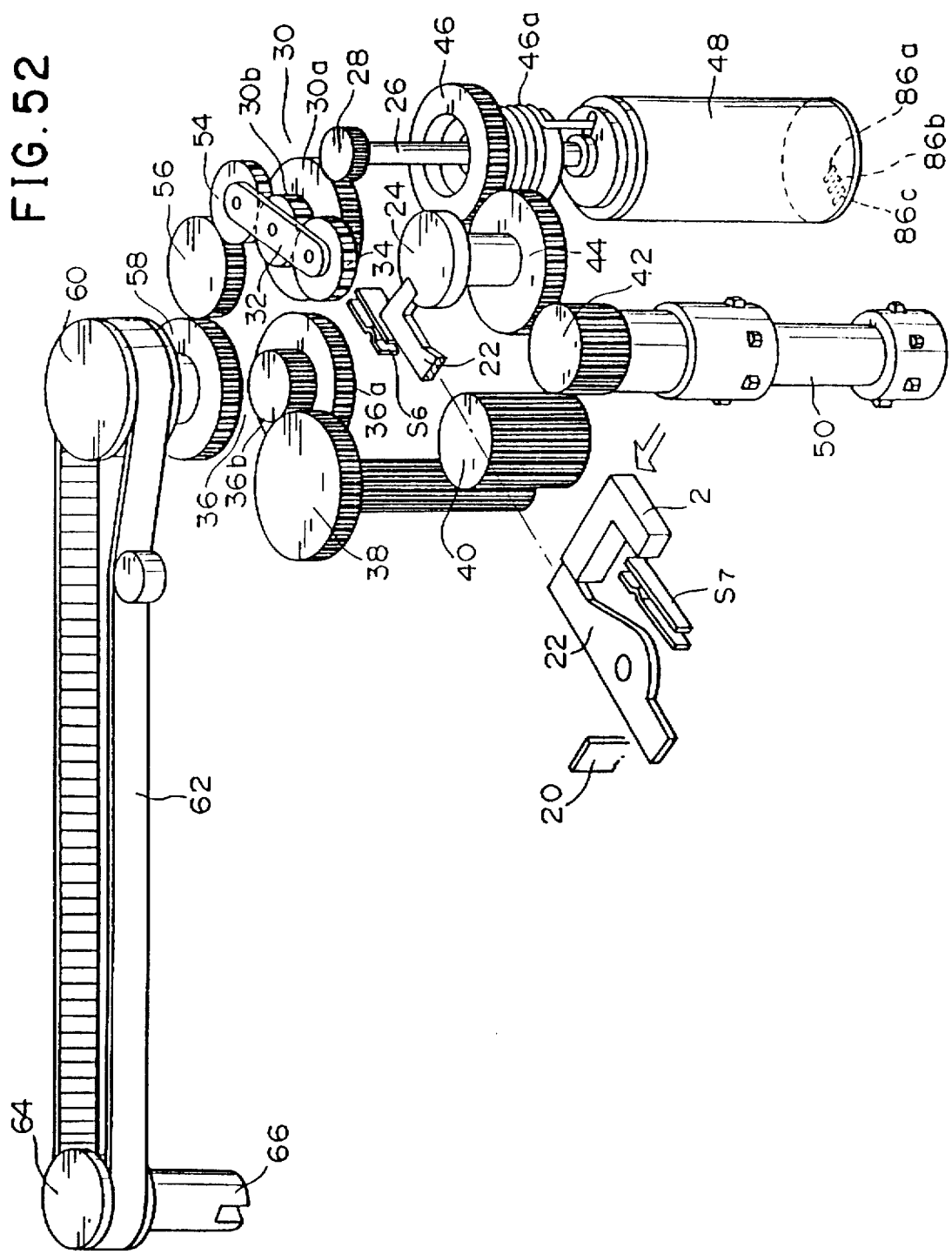

DC MOTOR AND CONTROLLING SYSTEM THEREFOR

This application is a divisional of application Ser. No. 07/727,101, filed Jul. 9, 1991 and which is now U.S. Pat. No. 5,461,694.

BACKGROUND OF THE INVENTION

1. Field of the Invention

This invention relates to a dc motor which is well suitably used to wind and rewind a film in a camera or a like apparatus and a controlling system for a dc motor.

2. Description of the Prior Art

Various dc motors which are driven by a voltage supplied thereto from a power source battery are already known. However, in such dc motors, reduction in voltage of the power source battery may sometimes result in delay of operation or halting of a mechanism which is connected to be driven by the dc motor.

Therefore, an improved arrangement has been proposed, for example, by a Japanese patent laid-open No. 60-194433, wherein a transmission mechanism for transmitting rotation of a motor to a driven mechanism includes, in order to use the driving force of the motor as effectively as possible, two gear trains whereby if the rotational speed of the motor decreases, the motor is temporarily rotated in the reverse direction to change over from the normal high torque gear train to the other lower torque gear train so that the driven mechanism may be driven at a low speed.

However, such conventional arrangements of the type mentioned requires two different gear trains as a transmission mechanism as well as a change-over mechanism for selectively using one of the two gear trains in order that a motor may be driven also at a low speed. Accordingly, it is a drawback of the conventional arrangements that they are complicated in mechanical construction and hence they may have a large overall size and be produced at a high production cost.

SUMMARY OF THE INVENTION

It is an object of the present invention to provide a dc motor wherein a driving force thereof can be used effectively with a simplified and compact mechanical construction.

It is another object of the invention to provide a motor controlling system which can control the dc motor of the type mentioned to be driven efficiently.

BRIEF DESCRIPTION OF THE DRAWINGS

FIG. 36 is a flow chart illustrating a motor control I subroutine;

FIG. 38 is a flow chart illustrating a modified motor control I subroutine;

FIG. 39 is a graph illustrating a relationship between the time and the voltage of a power source upon starting of a dc motor where the motor is controlled by a modified motor controlling system according to the present invention;

FIG. 52 is a perspective view of a film winding and rewinding mechanism of a camera showing a third embodiment of motor controlling system of the invention;

DETAILED DESCRIPTION OF THE PREFERRED EMBODIMENTS

Figure 1:
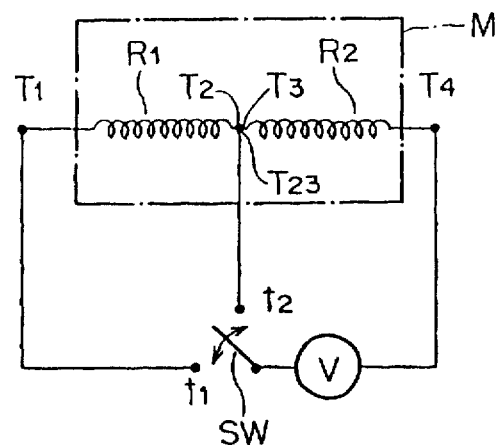
FIG. 1 is a circuit diagram illustrating a concept of the present invention.

Referring first to FIG. 1, there is illustrated a concept of a dc motor of the present invention. The dc motor shown is generally denoted at M and includes a first coil $R_1$ and a second coil $R_2$ wound on an iron core which will be hereinafter described. The first coil $R_1$ has a first terminal $T_1$ and a second terminal $T_2$ while the second coil $R_2$ has a third terminal $T_3$ and a fourth terminal $T_4$. Here, the second terminal $T_2$ and the third terminal $T_3$ are connected to each other and thus treated as a single common terminal $T_{23}$.

A dc power source V has an output terminal connected to the fourth terminal $T_4$ and another output terminal connected to a switch Sw which serves as a change-over means. The switch Sw can be alternatively connected to a contact $t_1$ connected to the first terminal $T_1$ and another contact $t_2$ connected to the common terminal $T_{23}$. Accordingly, in a first condition in which the switch Sw is connected to the contact $t_1$, a voltage is applied between the first terminal $T_1$ and the fourth terminal $T_4$, but in a second condition in which the switch Sw is connected to the contact $t_2$, a voltage is applied between the common terminal $T_{23}$ and the fourth terminal $T_4$.

It is known that following expressions stand for a dc motor:

$$V = (R+r)I + K_1 \phi N \quad (1)$$

$$T = K_2 \phi I - T_0 \quad (2)$$

Here, V is a voltage of the dc power source V, T a torque produced by the motor M, r an internal resistance of the dc power motor source V, R an internal resistance of the motor M, N a rotational frequency of the motor M, $\phi$ a magnetic flux of a stator of the motor M, $T_0$ a no-load torque, I electric current flow through the motor M, and $K_1$ and $K_2$ are proportional constants which are determined in accordance with a number of wound turns of the coils. It is to be noted that the no-load torque originates from a bearing loss of the motor M and accordingly I≠0 even where T=0.

Here, it is assumed that the voltage V and the internal resistance r of the power source, the stator flux $\phi$ and the no-load torque $T_0$ are constant and internal resistances of the first and second coils $R_1$, $R_2$ are represented as $R_1$, $R_2$, respectively. Thus, if the switch Sw is connected to the contact $t_2$, then $R=R_2$, and a starting torque $T\alpha$ in this condition will be examined below. Since N=0, the expressions (1) and (2) are rewritten as $$V = (R_2 + r)I\alpha \quad (3)$$

$$T\alpha = (K_2)\alpha \phi I - T_0 \quad (4)$$

and accordingly, $$T\alpha = (K_2)\alpha\phi \cdot \frac{V}{R_2 + r} - T_0 \quad (5)$$

It is to be noted here that $I\alpha$ and $(K_2)\alpha$ represent a value of electric current flow through the motor M and a value of the proportional constant $K_2$ where the switch Sw is connected to the contact $t_2$.

Now, a rotational frequency $N\alpha$ where $T=-T_0$ is examined here. Since $I=0$ in this instance, $$V = (K_1)\alpha\phi N\alpha \tag{6}$$

and hence $$N\alpha = \frac{V}{(K_1)\alpha\phi} \tag{7}$$

Figure 2:
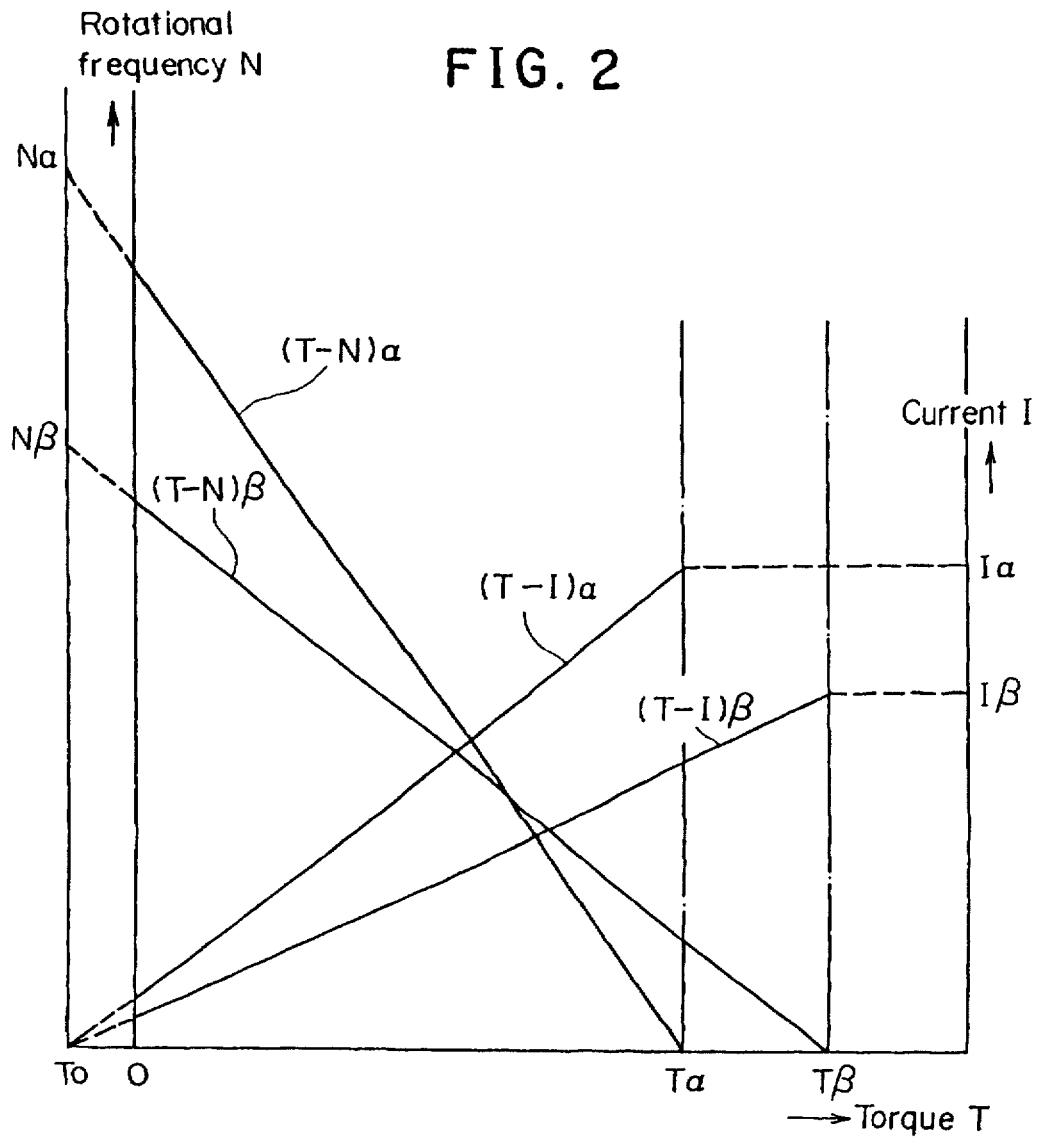
FIG. 2 is a graph illustrating a relationship of torque produced by a motor to a rotational frequency and electric current flow of the motor.

From $t\alpha$ and $N\alpha$ which are determined by the expressions (5) and (7), respectively, a characteristic line $(T - N)\alpha$ as shown in FIG. 2 can be drawn which indicates a relationship between the torque and the rotational frequency of the motor M where the switch Sw is connected to the contact $t_2$.

Subsequently, another condition in which the switch Sw is connected to the contact $t_1$ will be examined. In this case, $R=R_1+R_2$. Thus, a starting torque $T\beta$ and a rotational frequency $N\beta$ of the motor M will be calculated.

At first, $N=0$ is used in the same procedure. Consequently, $$V = (R_1 + R_2 + \gamma)I\beta \tag{8}$$

$$T = (K_2)\beta\phi I\beta - T_0 \tag{9}$$

are obtained, and accordingly, $$T\beta = (K_2)\beta\phi \cdot \frac{V}{R_1 + R_2 + r} - T_0 \tag{10}$$

is obtained. Here, $I\beta$ and $(K_2)\beta$ represent electric current flow through the motor M and a proportional constant $K_2$, respectively, when the switch Sw is connected to the contact $t_1$.

Here, if it is assumed that the two coils $R_1$, $R_2$ have a same wire diameter, the proportional constants $K_1$, $K_2$ vary in proportion to individual resistances of the coils $R_1$, $R_2$. Accordingly, $$(K_2)\beta = (K_2)\alpha \frac{R_1 + R_2}{R_2} \tag{11}$$

is obtained, and hence $$T\beta = (K_2)\alpha\phi \frac{R_1 + R_2}{R_2} \cdot \frac{V}{R_1 + R_2 + r} - T_0 \tag{12}$$

is obtained. Further, if $T=-T_0$ is used, $$N\beta = \frac{V}{(K_1)\beta} \cdot \phi \tag{13}$$

is obtained because $I=0$. Here, the value $(K_1)\beta$ of the proportional constant $K_1$ when the switch Sw is connected to the contact $t_1$ is also proportional to the number of wound turns of the coils of the motor M. Accordingly, $$(K_1)\beta = (K_1)\alpha \cdot \frac{R_1 + R_2}{R_2} \tag{14}$$

is obtained, and hence $$N\beta = \frac{V}{(K_1)\alpha \cdot \frac{R_1 + R_2}{R_2}} \cdot \phi \tag{15}$$

is obtained. Accordingly, from the expressions (5) and (12), $$T\alpha - T\beta = \left[(K_2)\alpha\phi \cdot \frac{V}{R_2 + r} - T_0\right] - \left[(K_2)\alpha\phi \cdot \frac{R_1 + R_2}{R_2} \cdot \frac{V}{R_1 + R_2 + r} - T_0\right]$$

$$= (K_2)\alpha\phi V \left(\frac{1}{R_2 + r} - \frac{R_1 + R_2}{R_2} \cdot \frac{1}{R_1 + R_2 + r}\right)$$

$$= (K_2)\alpha\phi V \cdot \frac{R_2(R_1 + R_2 + r) - (R_1 + R_2)(R_2 + r)}{(R_2 + r)R_2(R_1 + R_2 + r)}$$

$$= -\frac{(K_2)\alpha\phi V R_1 r}{(R_2 + r)R_2(R_1 + R_2 + r)} < 0 \tag{16}$$

is obtained, and accordingly, a following expression (17) stands:

$$T\beta > T\alpha \tag{17}$$

Further, from the expressions (7) and (15), $$N\alpha - N\beta = \frac{V}{(K_1)\alpha\phi} - \frac{V}{(K_1)\alpha\phi \cdot \frac{R_1 + R_2}{R_2} \phi} \tag{18}$$

$$= \frac{1}{(K_1)\alpha\phi}\left(1 - \frac{R_2}{R_1 + R_2}\right)$$

$$= \frac{V}{(K_1)\alpha\phi} \cdot \frac{R_1}{R_1 + R_2} > 0$$

is obtained. Accordingly, a following expression (19) stands:

$$N\alpha > N\beta \tag{19}$$

Here, from the expressions (16) and (18), another characteristic line $(T - N)\beta$ where $R=R_1+R_2$ can be drawn as shown in FIG. 2 relative to the characteristic line $(T - N)$ where $R=R_2$. Thus, it can be seen from FIG. 2 that the characteristic line $(T - N)\alpha$ and the characteristic line $(T - N)\beta$ intersect each other.

It is to be noted that, in drawing other characteristic lines $(T - I)\alpha$ and $(T - I)\beta$ as shown in FIG. 2 which indicate an electric current flow and a torque where $R=R_2$ and $R=R_1+R_2$, respectively, since starting torques $T\alpha$, $T\beta$ and electric current values $I\alpha$, $I\beta$ upon starting of the motor M can be obtained, a point of coordinates $(T=T\alpha, I=I\alpha)$ and $(T=T\beta, I=I\beta)$ and another point of coordinate $(T=-T_0, N=0)$ must only be interconnected by straight lines, respectively.

Figure 3:
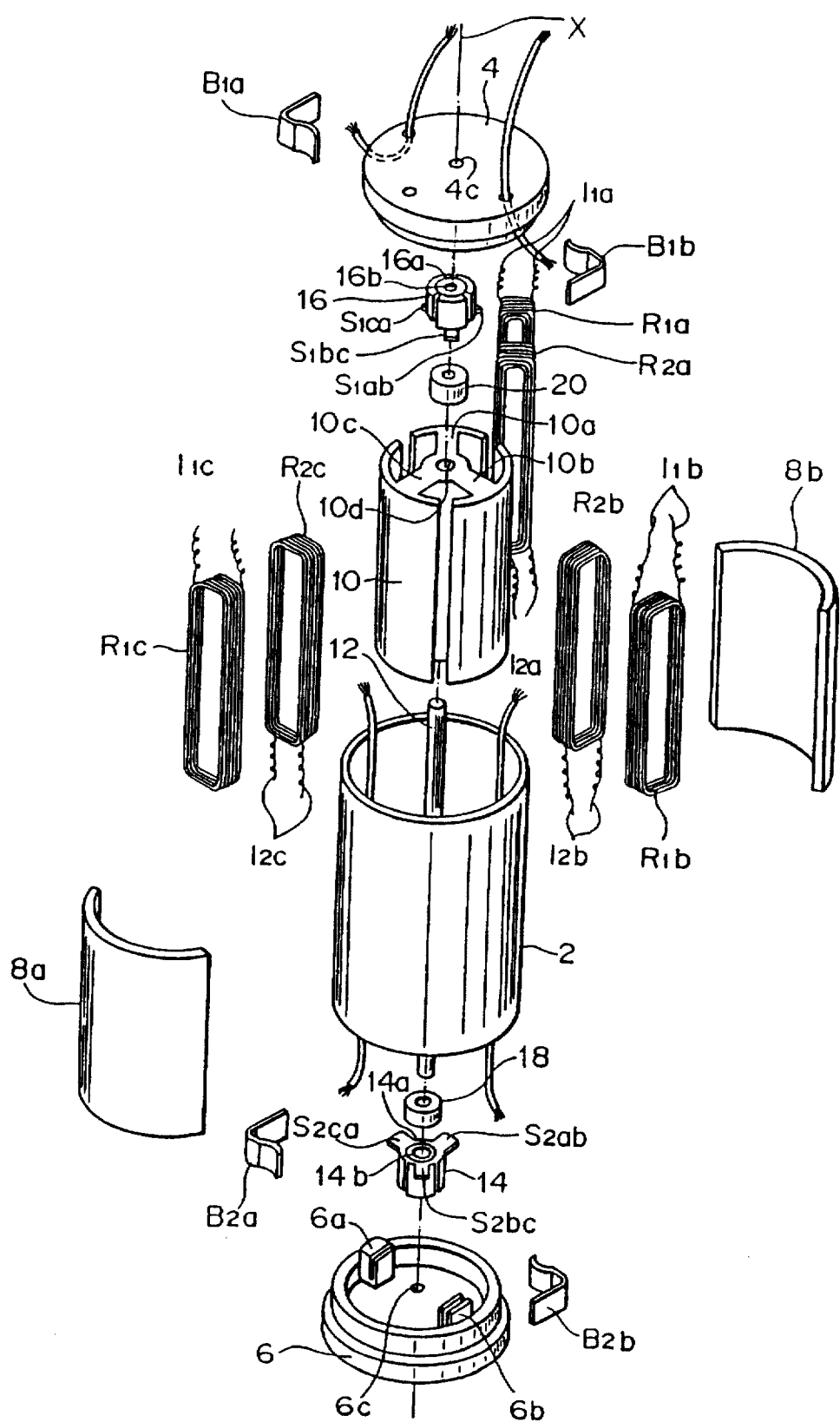
FIG. 3 is a fragmentary perspective view of a dc motor showing a first embodiment of the present invention.

Now, the present invention will be described in detail in connection with preferred embodiments thereof. At first, mechanical construction of a dc motor according to a first embodiment of the invention will be described with reference to a fragmentary perspective view of FIG. 3. The dc motor shown is constituted as a 2-pole 3-slot motor and includes a motor body surrounded by a cylinder 2, an upper cover 4 and a lower cover 6. A pair of permanent magnets 8a, 8b are secured at symmetrical positions on an inner wall of the cylinder 2 relative to an axis X of rotation of the motor by suitable means such as application or adhesion. The permanent magnets 8a, 8b have a substantially semicircular shape in plan and are magnetized in a direction of the thickness thereof. An iron core 10 is supported for rotation around the motor axis X by means of the upper cover 4 and the lower cover 6 in a manner hereinafter described and thus serves as a rotor of the motor. The iron core 10 has three arms 10a, 10b, 10c formed in a rotationally symmetrical relationship with respect to the motor axis X, and a center bore 10d formed at the center thereof. Accordingly, the arms 10a, 10b, 10c of the iron core 10 are spaced apart from each other by an angle of 120 degrees. First coils $R_1a$, $R_1b$, $R_1c$ and second coils $R_2a$, $R_2b$, $R_2c$ are wound in a radially juxtaposed relationship from the motor axis X on the area $10a$, $10b$, $10c$, respectively, of the iron core 10.

Meanwhile, a pair of brushes $B_1a$, $B_1b$ are secured to the upper cover 4 while another pair of brushes $B_2a$, $B_2b$ are secured to the lower cover 6. In order to allow mounting of the brushes on the lower cover 6, a pair of grooved projections $6a$, $6b$ are formed on an inner wall of the lower cover 6, and the brushes $B_2a$, $B_2b$ are thus secured to the grooved projections $6a$, $6b$, respectively, by interference fit or the like. Also in order to allow mounting of the brushes $B_1a$, $B_1b$ on the upper cover 4, another pair of grooved projections $4a$, $4b$ are formed on an inner wall of the upper cover 4 as seen from the bottom plan view of the upper cover 4 of FIG. 4, and thus the brushes $B_1a$, $B_1b$ are secured to the grooved projections $4a$, $4b$, respectively, by interference fit or the like.

A motor shaft 12 extends through the center bore $10d$ of the iron core 10 and is supported for rotation in center holes $4c$, $6c$ formed in the upper and lower covers 4, 6, respectively. The iron core 10 is secured in an integral relationship to the motor shaft 12.

Figure 4:
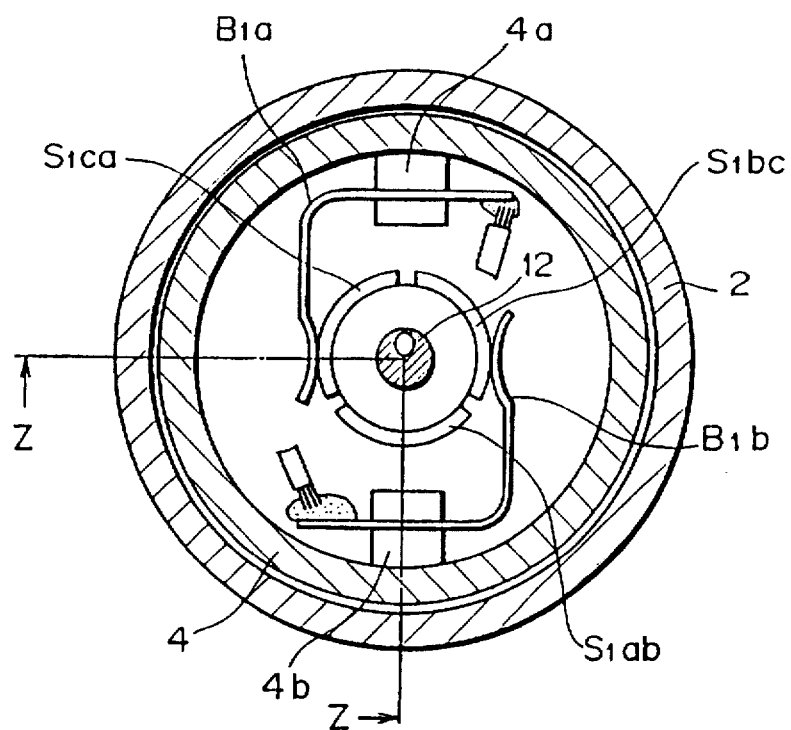
FIG. 4 is a bottom plan view of an upper cover of the motor of FIG. 3.

An electrode 14 is integrally mounted on the iron core 10 for contacting engagement with the brushes $B_2a$, $B_2b$ on the lower cover 6 and serves as a commutator. The electrode 14 has a center bore $14a$ formed therein and an insulating zone $14b$ formed thereon, and the motor shaft 12 extends through the center bore $14a$ of the electrode 14. Three electrode sections $S_2ab$, $S_2bc$, $S_2ca$ are formed in a rotationally symmetrical relationship around the motor axis X on an outer periphery of the electrode 14. Another electrode 16 is integrally mounted on the iron core 10 for contacting engagement with the brushes $B_1a$, $B_1b$ on the upper cover 4 and serves similarly as a commutator. Also the electrode 16 has a center bore $16a$ formed therein and an insulator section $16b$ formed thereon, and the motor shaft 12 extends through the center bore $16a$ of the electrode 16. The electrode 16 further has three electrode sections $S_1ab$, $S_1bc$, $S_1ca$ formed in a rotationally symmetrical relationship around the motor axis X on an outer periphery thereof. The three electrode sections $S_1ab$, $S_1bc$, $S_1ca$ of the electrode 16 and the pair of brushes $B_1a$, $B_1b$ on the upper cover 4 have such a relationship as seen in FIG. 4, and the three electrode sections $S_2ab$, $S_2bc$, $S_2ca$ of the electrode 14 and the pair of brushes $B_2a$, $B_2b$ have a similar relationship therebetween.

Referring back to FIG. 3, a pair of spacers 18, 20 are interposed between the iron core 10 and the electrodes 14, 16, respectively. The spacers 18, 20 are provided to assure spacings for allowing a wire to pass therethrough when the coils are wound on the iron core 10. Accordingly, the electrode 14, the spacer 18, the iron core 10, the other spacer 20 and the other electrode 16 are integrally secured in the order as listed from below to the motor shaft 12 by a suitable method such as interference fit. Accordingly, the motor components listed just above are rotated in an integral relationship with the motor shaft 12.

Figure 5:
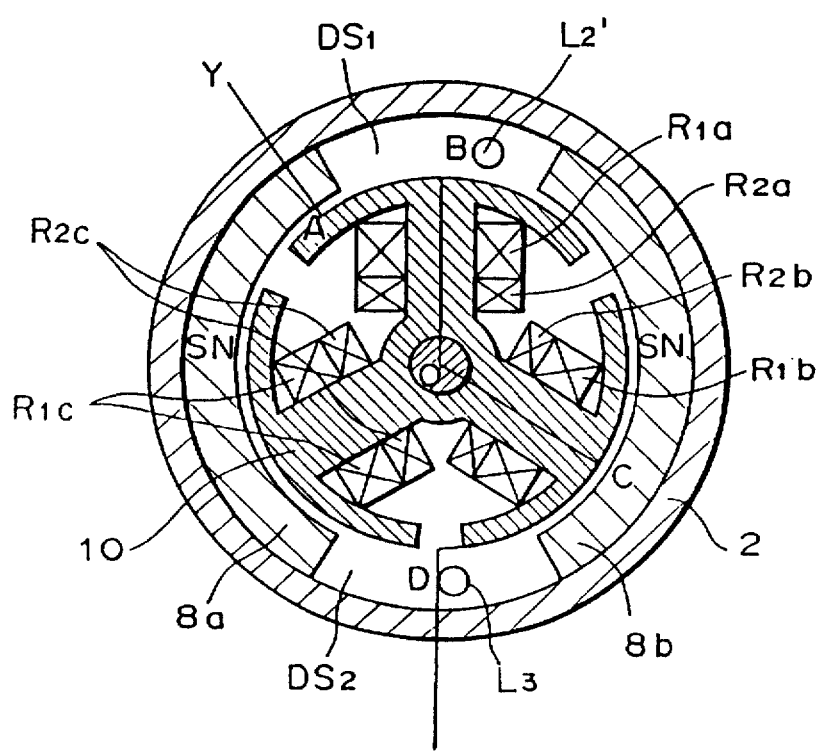
FIG. 5 is a transverse sectional view of the motor of FIG. 3.
Figure 6:
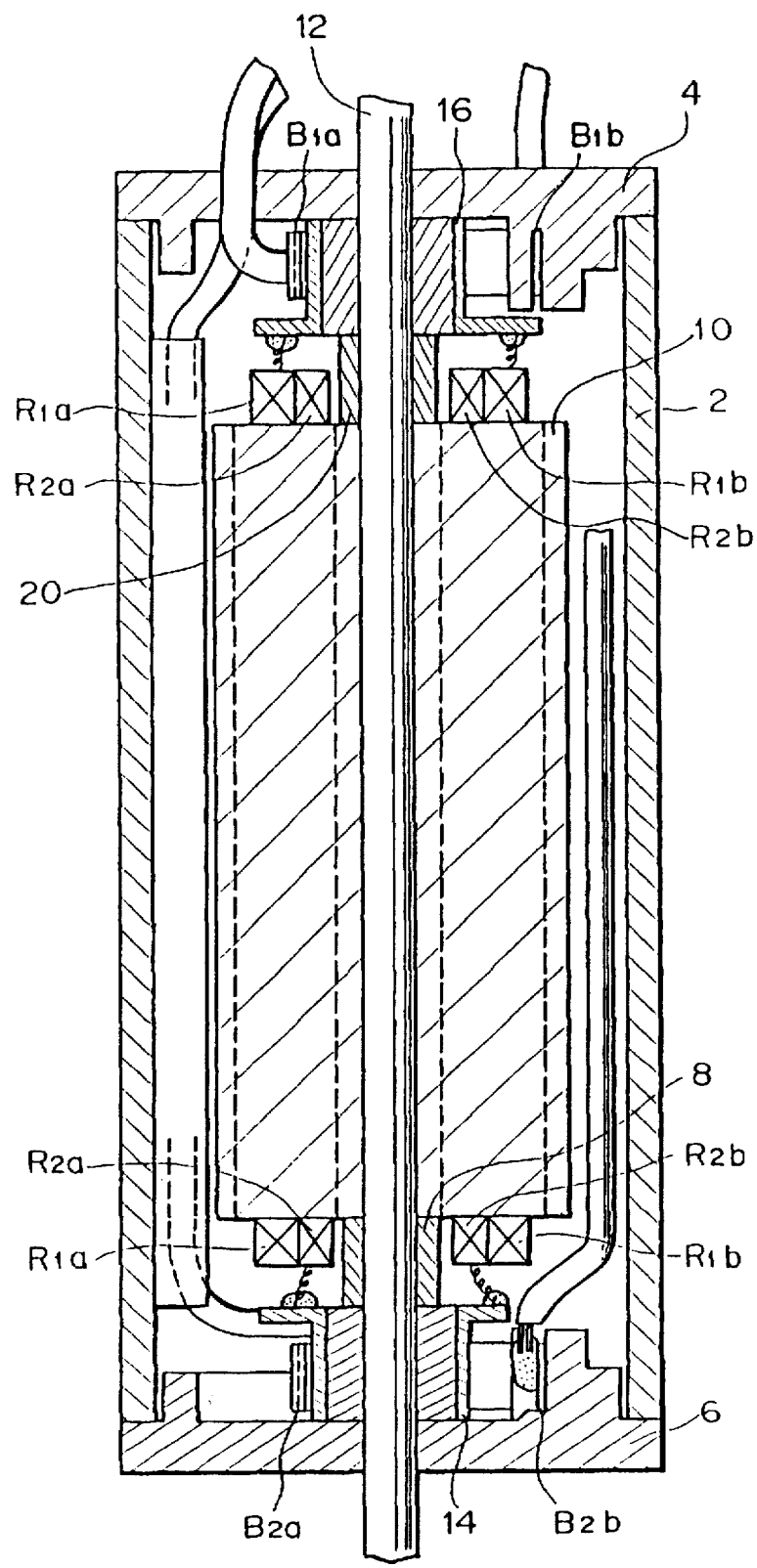
FIG. 6 is a longitudinal sectional view of the motor of FIG. 3.
Figure 7:
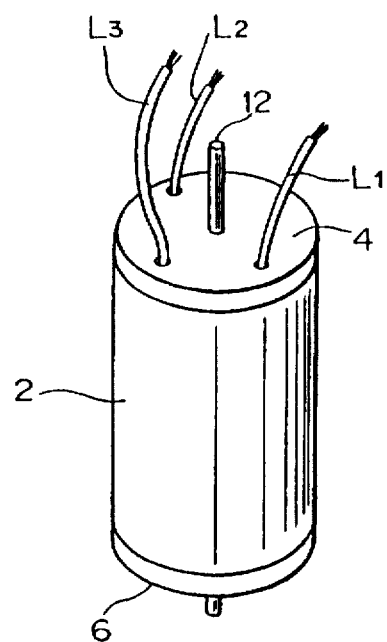
FIG. 7 is a general perspective view of the motor of FIG. 3.

A transverse sectional view of the motor of the embodiment as viewed from the position of the upper cover 4 is shown in FIG. 5 while a longitudinal sectional view taken along line Y-A-B-O-C-D-Y in FIG. 5 is shown in FIG. 6. Here, the upper and lower portions of FIG. 6 corresponds also to a longitudinal sectional view taken along line Z-O-Z in FIG. 4. As illustrated in FIG. 5, the permanent magnets $8a$, $8b$ are magnetized in a diametrical direction relative to the motor axis X (in a direction of the thickness). Further, a perspective view of the motor body of the present invention is shown in FIG. 7. As apparently seen from FIG. 7, in the present embodiment, three input leads $L_1$, $L_2$, $L_3$ are all drawn out from the upper cover 4. Thus, in order to assure wirings for power supply to the pair of brushes $B_2a$, $B_2b$ mounted on the lower cover 6, two dead spaces $DS_1$, $DS_2$ defined by the cylinder 1, the iron core 10 and the permanent magnets $8a$, $8b$ are utilized to thread the lead $L_3$ and an additional lead $L_2$' which will be hereinafter described.

Figure 8:
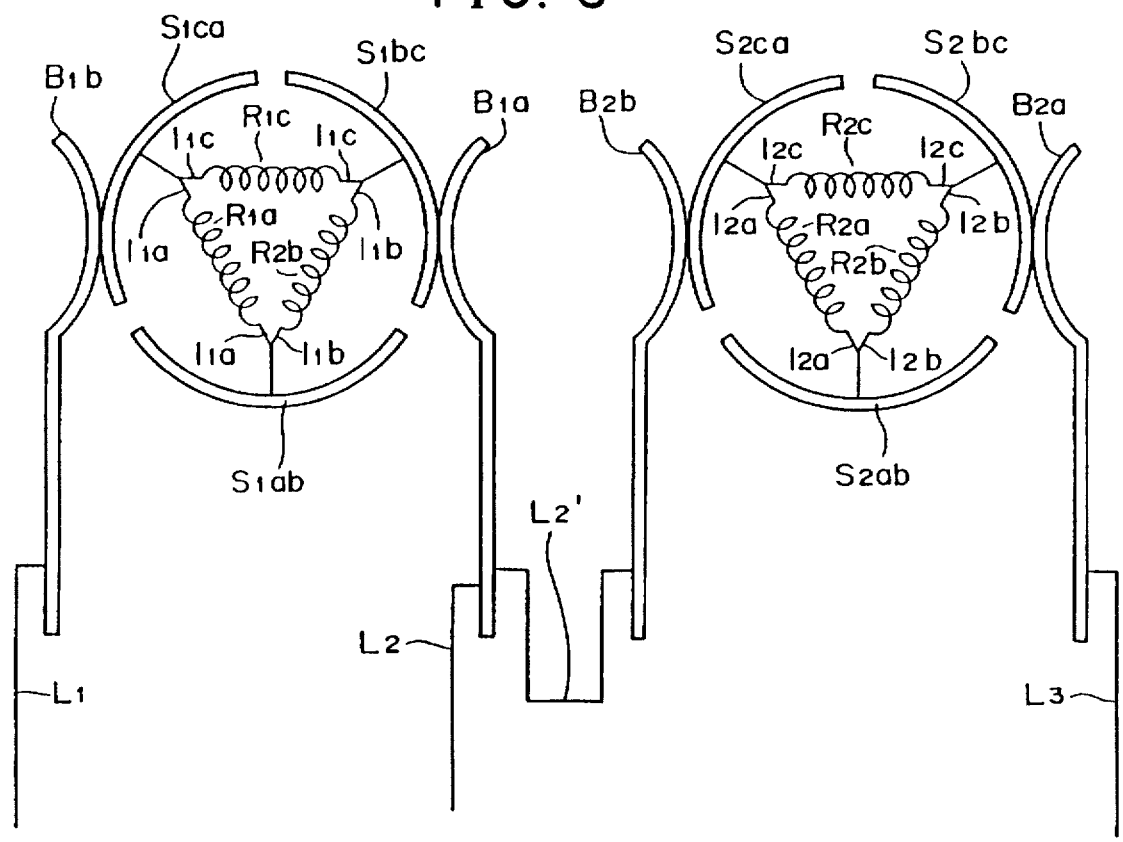
FIG. 8 is a diagrammatic representation illustrating electric connection of the motor of FIG. 3.
Figure 9:
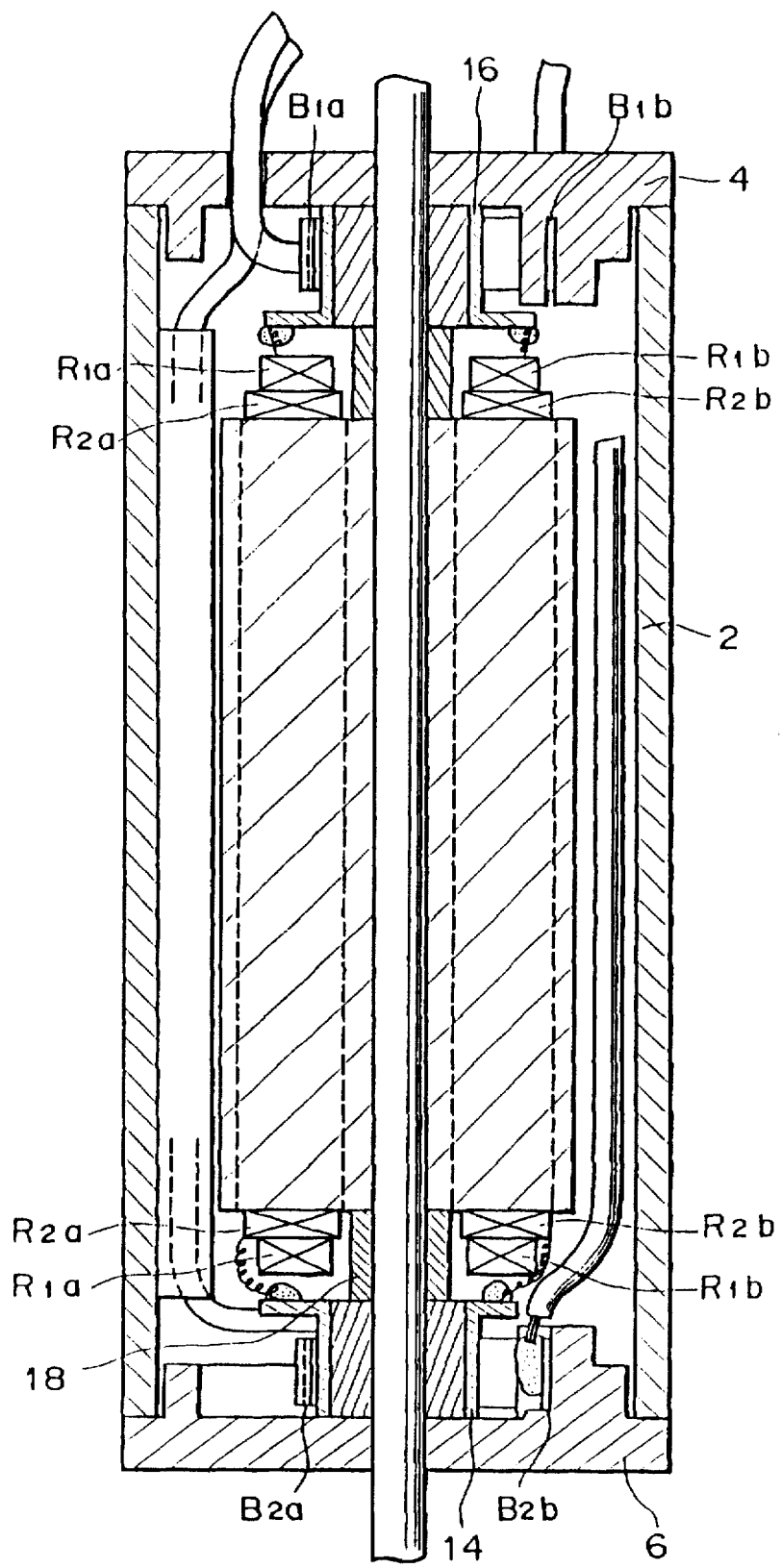
FIG. 9 is a longitudinal sectional view of a dc motor showing a second embodiment of the invention.
Figure 10:
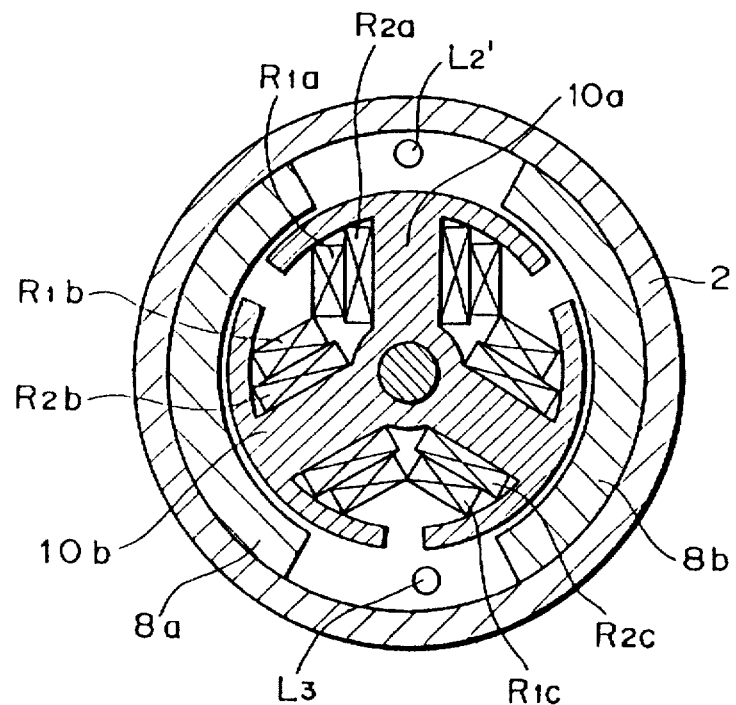
FIG. 10 is a transverse sectional view of the motor of FIG. 9.
Figure 12:
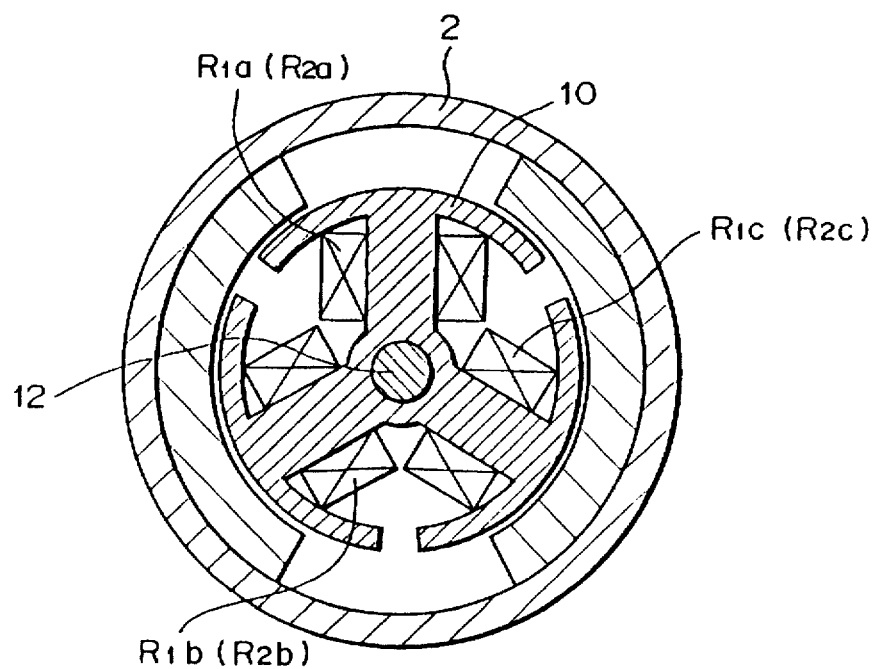
FIG. 12 is a transverse sectional view taken along line XII—XII and XII'—XII' of FIG. 11.
Figure 11:
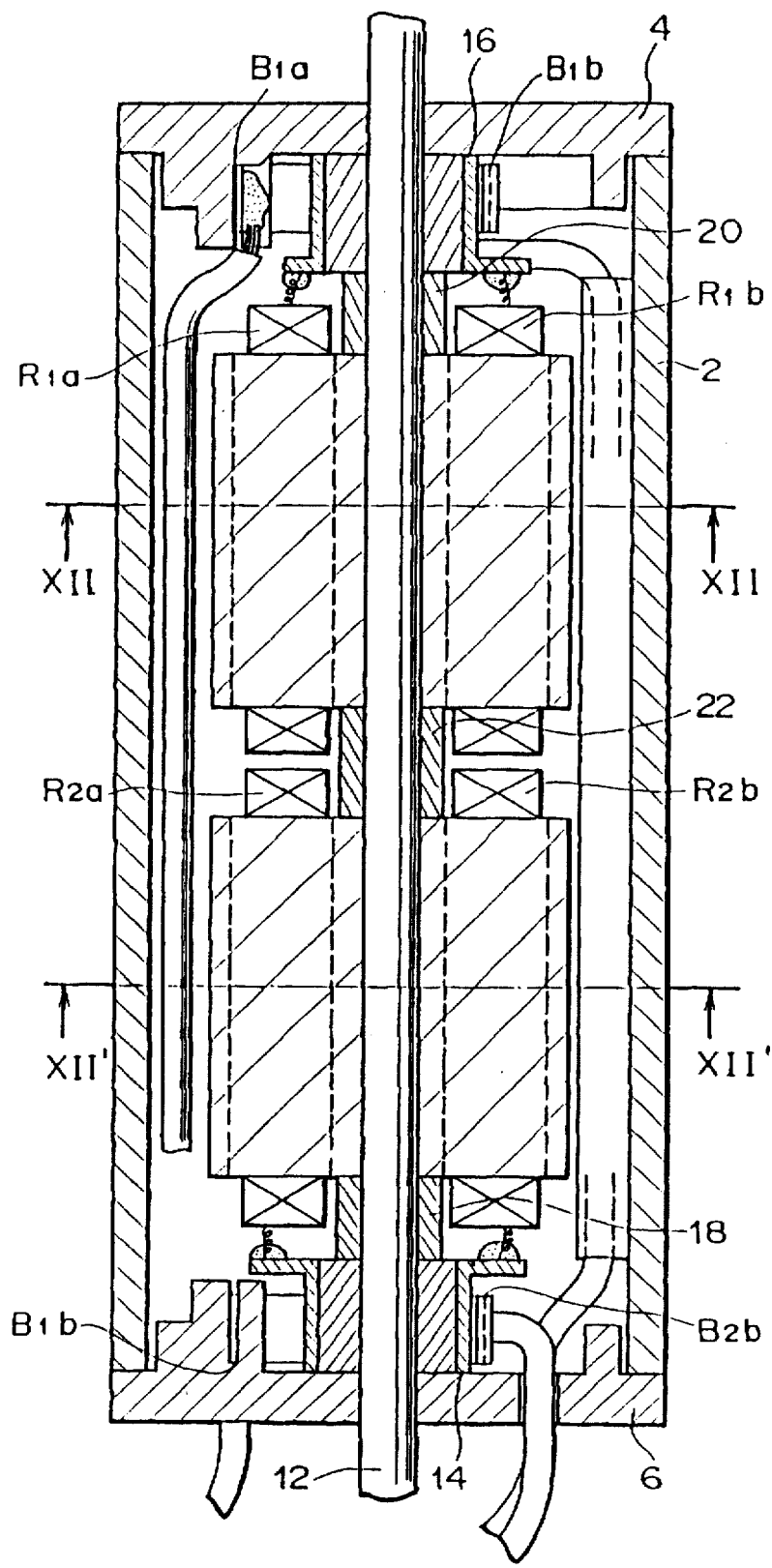
FIG. 11 is a longitudinal sectional view of a dc motor showing a third embodiment of the invention.

Now, electric connection of the motor of the embodiment will be described. Referring back to FIG. 3, the first coils $R_1a$, $R_1b$, $R_1c$ each have a pair of upwardly extending terminals $l_1a$, $l_1b$, $l_1c$, respectively, while the second coils $R_2$, $R_2b$, $R_2c$ each have a pair of upwardly extending terminal $l_2a$, $l_2b$, $l_2c$, respectively. As seen from a schematic representation of FIG. 8, one of the pair of terminals $l_1a$ of the first coil $R_1a$ is connected to the electrode $S_1ab$ while the other terminal $l_1a$ is connected to the electrode $S_1ca$. One of the second pair of terminal $l_1b$ of the first coil $R_1b$ is connected to the electrode $S_1ab$ and the other terminal $l_1b$ is connected to the electrode $S_1bc$. Further, one of the other pair of terminals $l_1c$ of the first coil $R_1c$ is connected to the electrode $S_1bc$ and the other terminal $l_1c$ is connected to the electrode $S_1ca$.

Meanwhile, one of the pair of terminals $l_2a$ of the second coil $R_2a$ is connected to the electrode $S_2ab$ while the other terminal $l_2a$ is connected to the electrode $S_2ca$. One of the second pair of terminals $l_2b$ of the second coil $R_2b$ is connected to the electrode $S_2ab$ and the other terminal $l_2b$ is connected to the electrode $S_2bc$. Further, one of the other pair of terminals $l_2c$ of the second coil $R_2c$ is connected to the electrode $S_2bc$ and the other terminal $l_2c$ is connected to the electrode $S_2ca$.

Further, the brush $B_1a$ secured to the upper cover 4 is electrically connected to the brush $B_2b$ secured to the lower cover 6 via the lead $L_2$' extending through the above described dead space $DS_1$ shown in FIG. 5. On the other hand, the lead $L_1$ is electrically connected to the brush $B_1b$ secured to the upper cover 4 and extends externally of the motor body. Meanwhile, the lead $L_3$ is electrically connected to the brush $B_2a$ secured to the lower cover 6 and extends externally through the dead space $DS_2$ shown in FIG. 5. Then, ends of the leads $L_1$, $L_2$, $L_3$ correspond to the terminal $T_1$, $T_{23}$, $T_4$, respectively, shown in FIG. 1.

It is to be noted that, in the first embodiment described above, the first coils $R_1a$, $R_1b$, $R_1c$ and the second coils $R_2a$, $R_2b$, $R_2c$ are mounted in a juxtaposed relationship in a diametrical direction from the motor axis X on the three arms $10a$, $10b$, $10c$ of the iron core 10 which serves as a rotor. However the present invention is not limited to such a specific arrangement of the embodiment, and various alternations and modifications can be made to the same.

Such modifications are shown in FIGS. 9 to 20, and it is to be noted that in those figures, like parts or components are denoted by like reference symbols to those of the first embodiment shown FIGS. 3 to 8. In particular, in a second embodiment shown in a longitudinal sectional view of FIG. 9 and a transverse sectional view of FIG. 10, first coils $R_1a$, $R_1b$, $R_1c$ and second coils $R_2a$, $R_2b$, $R_2c$ are mounted in an overlapping relationship in a direction of the thickness of the arms $10a$, $10b$, $10c$, respectively. Meanwhile, in a third embodiment shown in a longitudinal sectional view of FIG. 11 and a transverse sectional view of FIG. 12 taken along line XII—XII (XII'—XII') of FIG. 11, three arms $10a$, $10b$, $10c$ of an iron core 10 are each formed into two separate sections extending in a direction parallel to the motor axis X, and first coils $R_1a$, $R_1b$, $R_1c$ are mounted on the upper arm sections while second coils $R_2a$, $R_2b$, $R_2c$ are mounted on the lower arm sections. In the third embodiment, in order to allow the first and second coils to be arranged in an overlapping relationship in a direction parallel to the motor axis X, a spacer 22 may be interposed between the upper and lower sections of the arms 10a, 10b, 10c.

Figure 13:
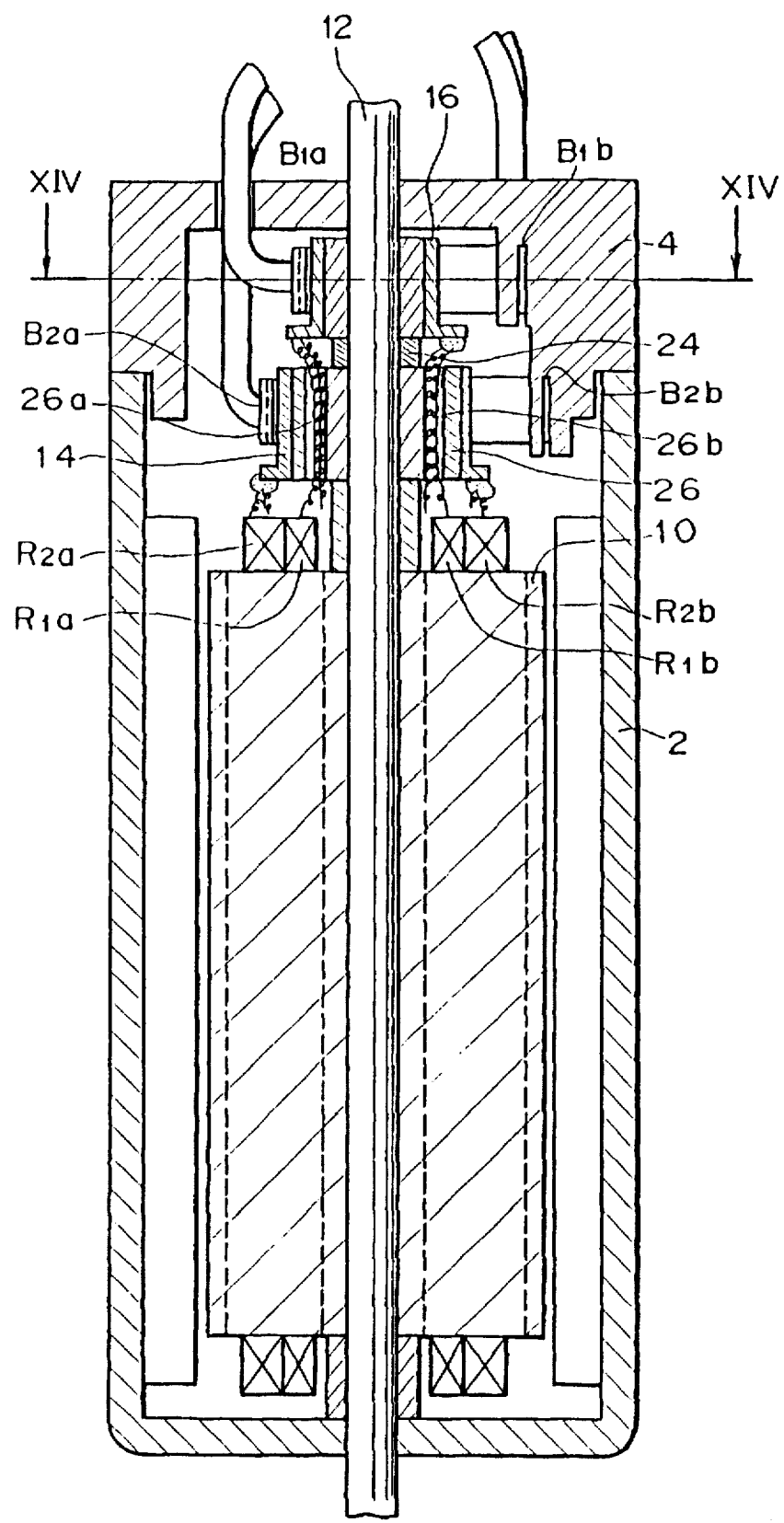
FIG. 13 is a longitudinal sectional view of a dc motor showing a fourth embodiment of the invention.
Figure 14:
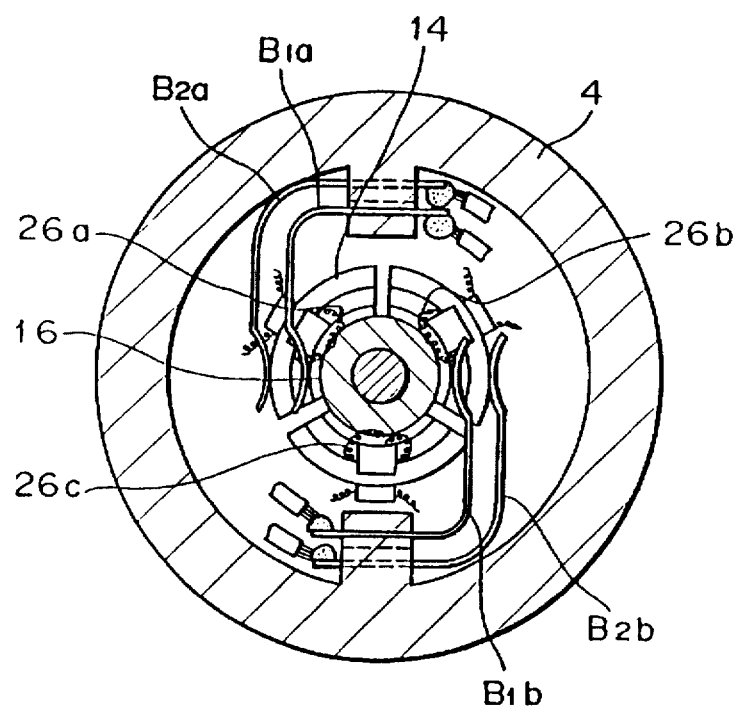
FIG. 14 is a transverse sectional view taken along line XIV—XIV of FIG. 13.

Further, while in the first embodiment described hereinabove the covers 4, 6, the electrodes 14, 16 and the brushes $B_1a$, $B_1b$, $B_2a$, $B_2b$ are disposed above and below the iron core 10, respectively, a fourth embodiment shown in a longitudinal sectional view of FIG. 13 is modified such that a cylinder 2 is formed in an integral relationship with a lower cover while emitting the lower cover 6 of the first embodiment as a separate component, and two electrodes 14, 16 and two pairs of brushes $B_1a$, $B_1b$, $B_2a$, $B_2b$ are located only on an upper cover 4 above an iron core 10. Thus, in order to prevent the two electrodes 14, 16 located above the iron core 10 from contacting with each other, a separate spacer 24 is interposed between the electrodes 14, 16. Six terminals $l_1a$, $l_1b$, $l_1c$ extending upwardly from first coils $R_1a$, $R_1b$, $R_1c$ located adjacent a motor shaft 12 extend through throughholes 26a, 26b, 26c, respectively, formed on a support ring 26 on which the electrode 14 is supported and the connected to the electrode 16. A transverse sectional view taken along line XIV—XIV of FIG. 13 is shown in FIG. 14. Thus leads may be easily individually drawn externally from the two pairs of brushes $B_1a$, $B_1b$, $B_2a$, $B_2b$ located above the iron core 10 so as to provide the motor with four input terminals as seen in FIG. 13.

Figure 15:
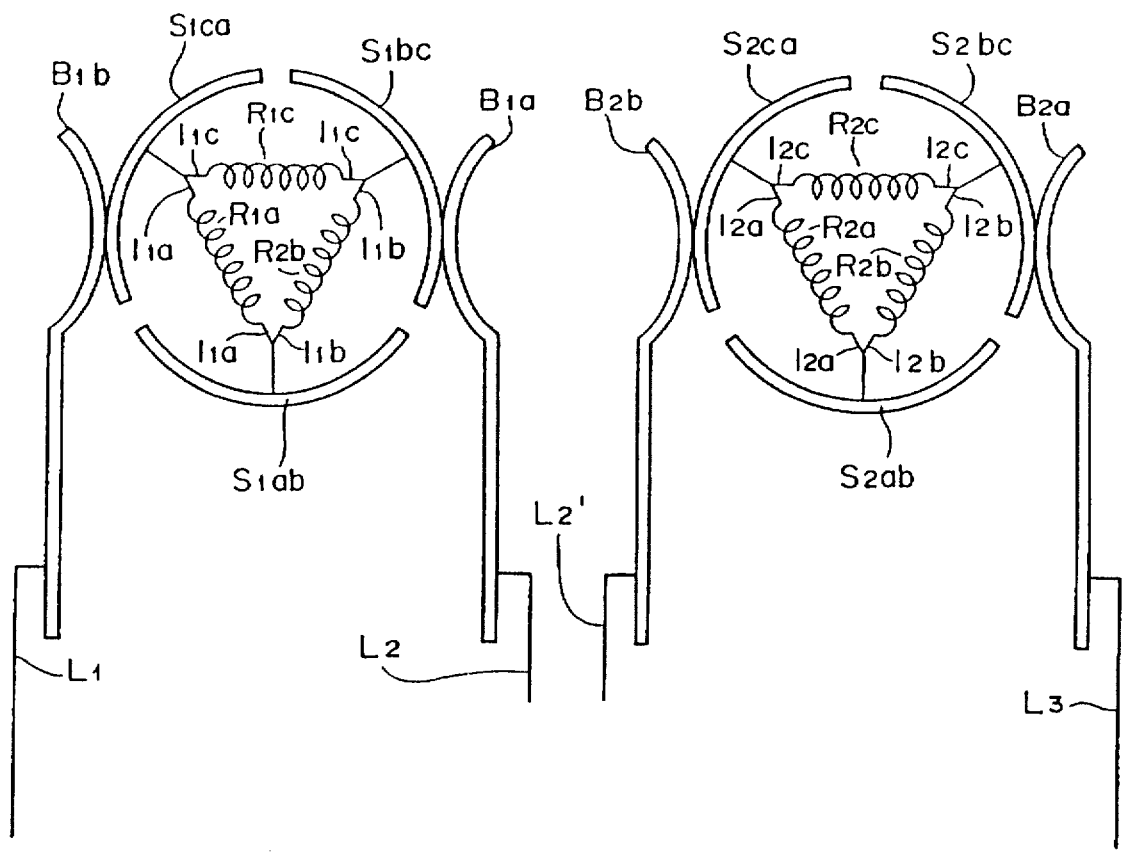
FIG. 15 is a diagrammatic representation illustrating electric connection of the motor of FIG. 13.

Electrical connection of the dc motor which has four input terminals is shown in a diagrammatic representation of FIG. 15. In particular, in the fourth embodiment, a lead $L_2$ is connected to the brush $B_1a$, another lead $L_1$ to the brush $B_1b$, a further lead $L_3$ to the brush $B_2a$, and a still further lead $L_2'$ to the brush $B_2b$. The four leads $L_1$, $L_2$, $L_2'$, $L_3$ are extended externally from the upper cover 4. Accordingly, an end of the lead $L_1$ shown in FIG. 15 corresponds to the terminal $T_1$ of FIG. 1, an end of the lead $L_2$ to the terminal $T_2$, an end of the lead $L_2'$ to the terminal $T_3$, and an end of the lead $L_3$ to the terminal $T_4$.

Figure 17:
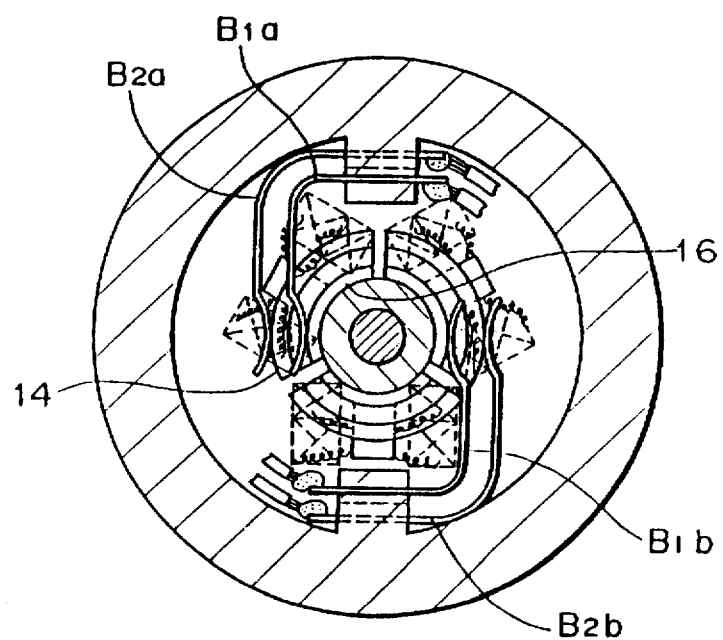
FIG. 17 is a transverse sectional view taken along line XVII—XVII of FIG. 16.
Figure 16:
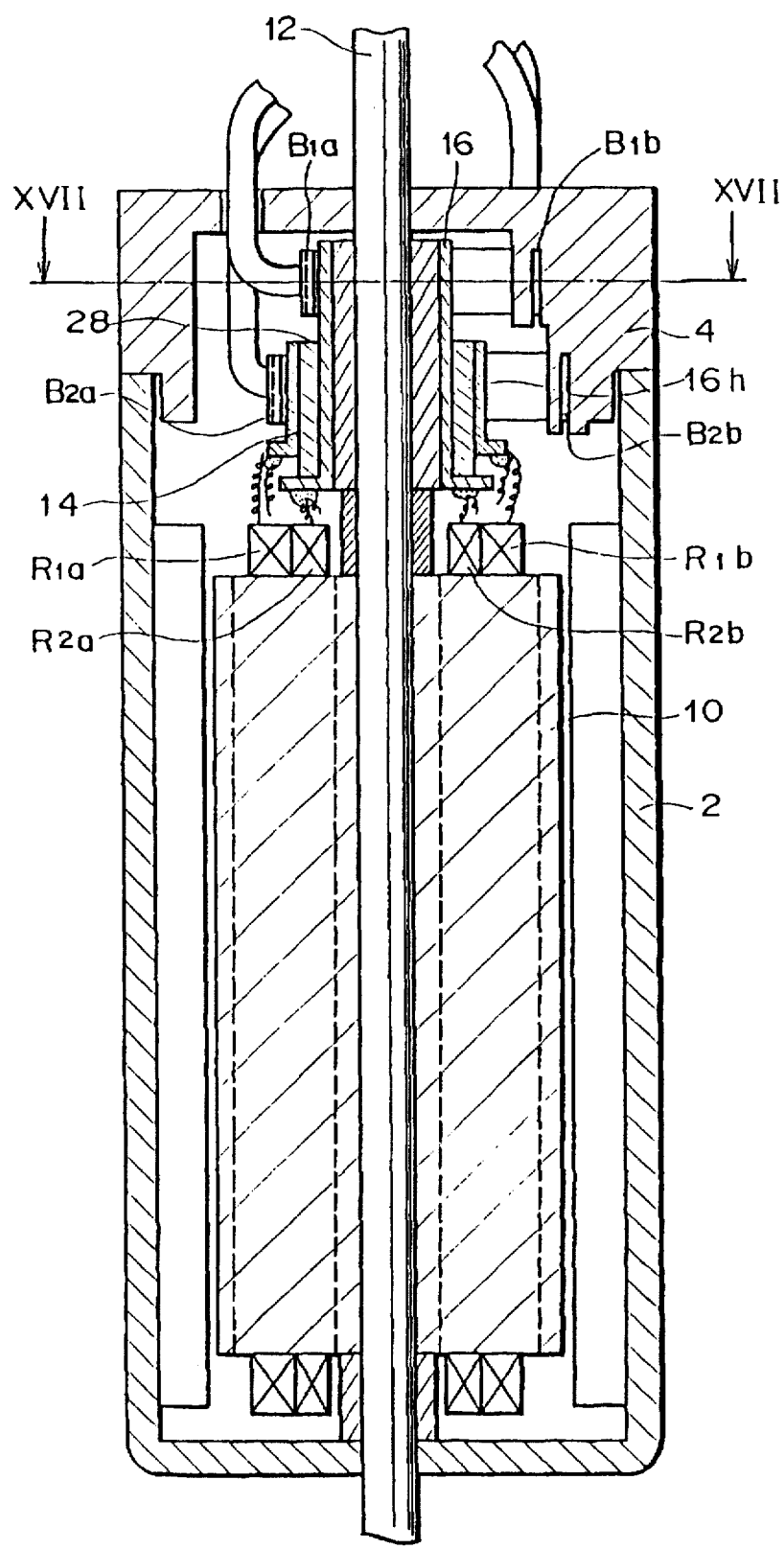
FIG. 16 is a longitudinal sectional view of a dc motor of a fifth embodiment of the invention.

Further, while in the fourth embodiment shown in FIG. 13 the two electrodes 14, 16 are located at different positions along a direction of the motor axis X, the present embodiment is not limited to the specific arrangement, and the two electrodes 14, 16 may be arranged in an overlapping relationship one around the other as shown in a longitudinal sectional view of FIG. 16 in which a fifth embodiment is shown. Referring to FIG. 16, the upper electrode 16 extends downwardly through the lower electrode 14, and an insulator ring 28 is interposed between the electrodes 14, 16 in order to prevent the electrodes 14, 16 from contacting with each other. Accordingly, the lower electrode 14 has a through-hole 16h formed therein for allowing the insulator ring 28 and the upper electrode 16 to extend therethrough. A transverse sectional view taken along line XVII—XVII of FIG. 16 is shown in FIG. 17.

Figure 18:
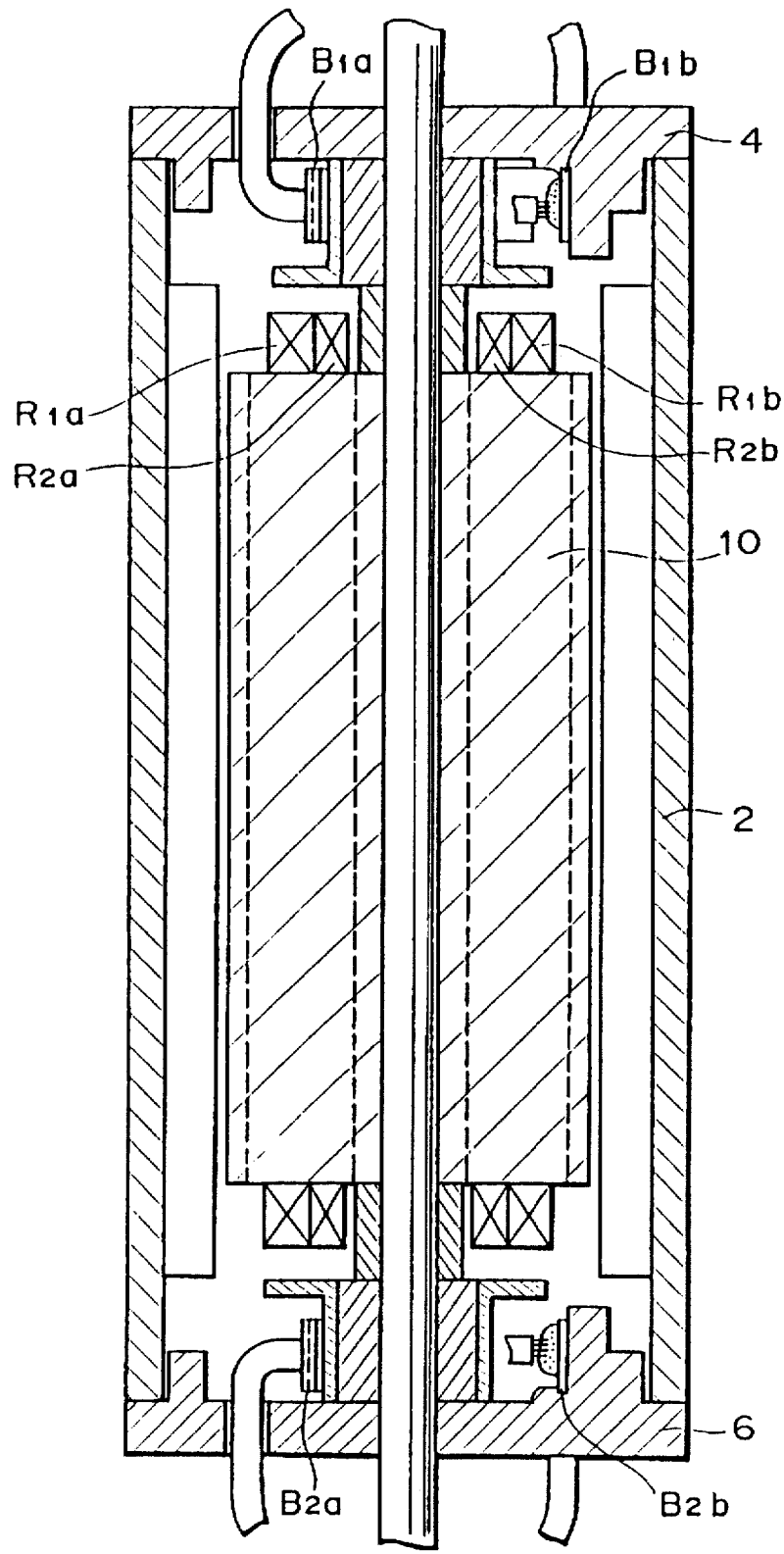
FIG. 18 is a longitudinal sectional view of a dc motor showing a sixth embodiment of the invention.

Further, while in the first embodiment the leads $L_2'$, $L_3$ connected to the lower brushes $B_2a$, $B_2b$ are threaded through the dead spaces $DS_1$, $DS_2$ so that all the leads may be drawn out from the upper cover 4, a sixth embodiment shown in a longitudinal sectional view of FIG. 18 is constituted such that lower brushes $B_2a$, $B_2b$ are connected to leads which extend downwardly through a lower cover 6. Such a construction will facilitate assembly of a dc motor because there is no necessity to thread leads through dead spaces such as the dead spaces $DS_1$, $DS_2$ of the first embodiment in order to connect the leads to brushes. Here, such a construction that some of a plurality of leads are drawn out from an upper cover while the remaining leads are drawn out from a lower cover as in the sixth embodiment can be applied not only to the first embodiment but also to any of the second to fifth embodiments described hereinabove.

Figure 20:
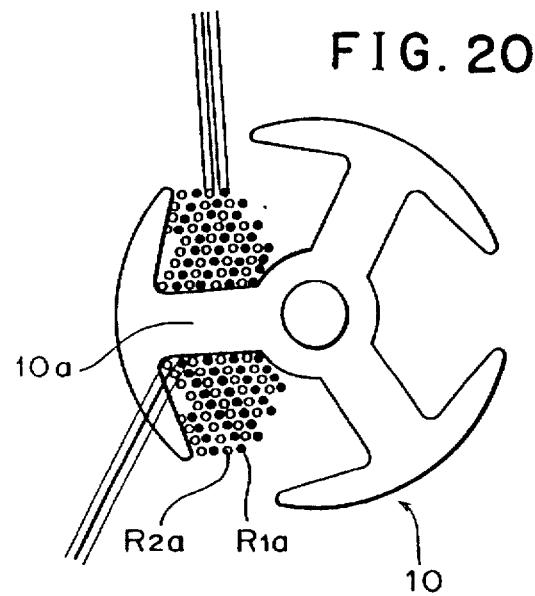
FIG. 20 is a transverse sectional view of the motor of FIG. 19.
Figure 19:
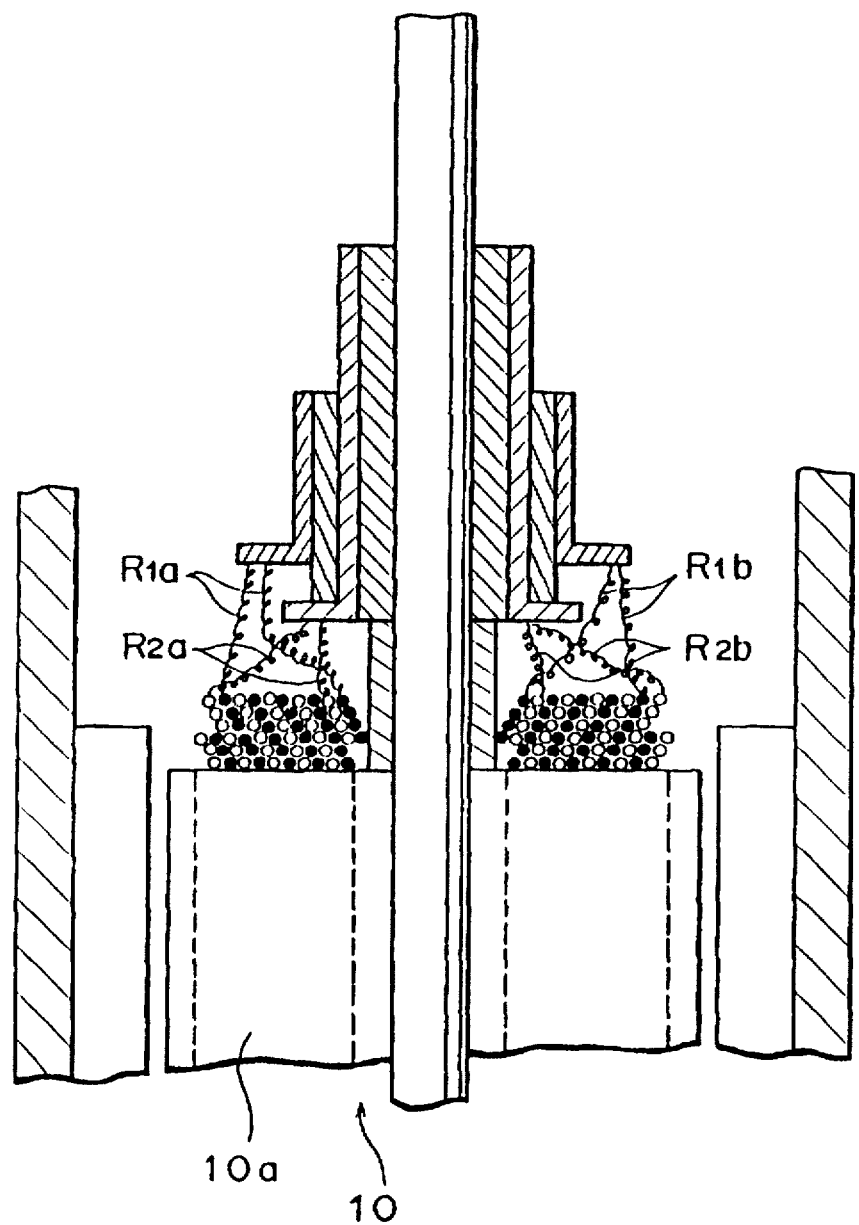
FIG. 19 is a partial longitudinal sectional view of a dc motor showing a seventh embodiment of the invention.

In addition, while in all of the first to sixth embodiments of dc motor of the present invention the first and second coils are wound separately on the iron core, they may otherwise be wound in an unseparable relationship to each other on the iron core. Such a modification is illustrated in a partial longitudinal sectional view of FIG. 19 and transverse sectional view of FIG. 20. Referring to FIGS. 19 and 20, two associated coils such as first and second coils $R_1a$, $R_2a$ are wound such that wound turns of conductors thereof are arranged in an alternate relationship about each of said arms. In assembly of the coils, a set of two conductors may be wound simultaneously in a juxtaposed relationship around an arm such as an arm 10a of the iron core 10. This arrangement of the coils is advantageous in that it will make the turn ratio of a motor constant and will reduce fluctuations among individual motors in output power, that is, in relationship between the torque and the rotational frequency or speed.

Further, while in all of the embodiments described hereinabove leads are connected to brushes within a motor body, the present invention is not limited to the specific construction, and thus leads may be connected, outside a motor body, to ends of brushes extended externally from the motor body.

Figure 21:
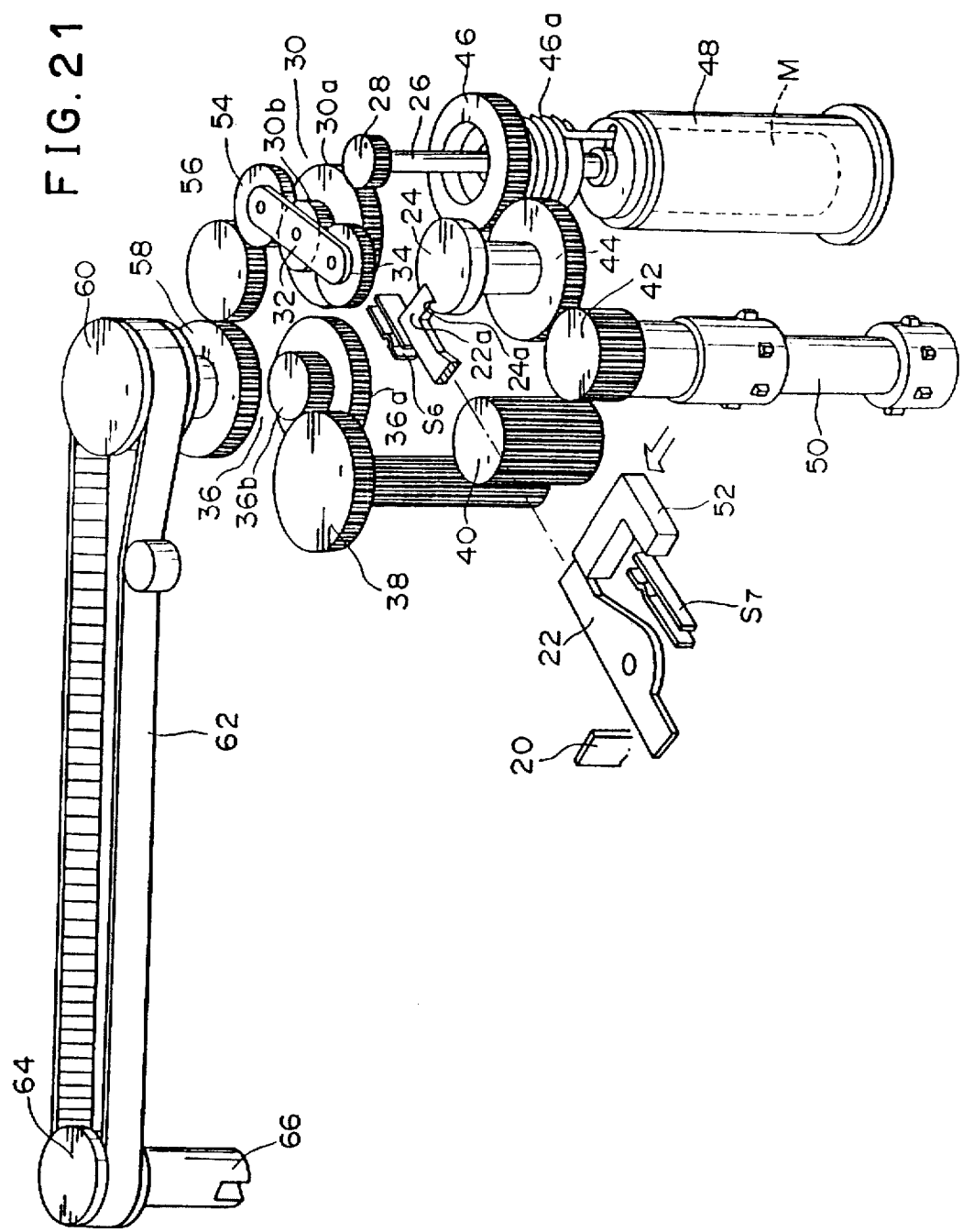
FIG. 21 is a perspective view of a film winding and rewinding mechanism of a camera showing a first embodiment of motor controlling system of the present invention.

Now, a motor controlling system according to the present invention which can efficiently control any of the dc motors of the preceding embodiments described above will be described in connection with preferred embodiments thereof. A first embodiment of motor controlling system of the invention is shown in FIG. 21 wherein the motor controlling system is applied to a film winding and rewinding mechanism of a camera.

At first, a film winding operation after photographing will be described with reference to FIG. 21. If a shutter not shown moves and thus exposure of a film frame is completed, an exposure completion signal lever 20 pushes a winding stopping lever 22 to pivot in a counter clockwise direction in FIG. 21 so that a projection 22a on the winding stopping lever 22 is moved out of engagement with a recess 24a formed in a winding stopping cam 24. Meanwhile, the counterclockwise pivotal motion of the winding stopping lever 22 in FIG. 21 closes a microswitch $S_6$ thereby to cause a motor M to be driven to rotate in a counterclockwise direction (forward direction) in FIG. 21. A gear 28 is coupled to a motor shaft 26 of the motor M and is held in meshed engagement with a large gear 30a of a speed reduction gear member 30. The speed reduction gear member 30 further includes a small gear 30b mounted for integral rotation with the large gear 30a, and a planetary gear 34 is held in meshed engagement with the small gear 30b. The planetary gear 34 is supported for rotation on a planetary gear lever 32 which is in turn supported for rotation in a coaxial relationship with the speed reduction gear member 30. The planetary gear 34 is located in an opposing relationship to a large gear 36a of another speed reduction gear member 36 but is not necessarily meshed with the large gear 36a immediately after a motion of the shutter. Thus, as the motor M rotates in the counterclockwise direction to rotate the speed reduction gear member 30 in the clockwise direction, the planetary gear lever 32 which frictionally engages with an upper face of the speed reduction gear member 30 is also rotated in the clockwise direction so that the planetary gear 34 thereon is brought into meshed engagement with the large gear 36a of the speed reduction gear member 36.

The speed reduction gear member 36 is connected to a sprocket gear 42 via a further gear 38 and a drive gear 40 so that as the planetary gear 34 is rotated in the counterclockwise direction and is meshed with the large gear 36a of the speed reduction gear member 36, the sprocket gear 42 is rotated in the counterclockwise direction. The sprocket gear 42 is held in meshed engagement with a winding stopping gear 44 which is mounted for integral rotation with the winding stopping cam 24. Thus, since here the recess 24a of the winding stopping cam 24 is out of engagement with the projection 22a of the winding stopping lever 22 and hence rotation of the winding stopping cam 24 and the winding stopping gear 44 is allowed, rotation of the sprocket gear 42 in the counterclockwise direction rotates a spool gear 46 in the counterclockwise direction via the winding stopping gear 44.

The spool gear 46 is connected to a spool 48 via a spool friction spring 46a. Thus, a film is wound by counterclockwise rotation of the spool 48 and a sprocket 50 connected to the sprocket gear 42.

Upon completion of winding of a film by one frame, the projection 22a of the winding stopping lever 22 is again brought into engagement with the recess 24a of the winding stopping cam 24 which is thus rotated by one complete rotation for winding of the film by one frame, and as the winding stopping lever 22 is thereupon pivoted in the clockwise direction, the microswitch $S_6$ is opened by the same to stop the motor M, thereby completing the winding of the film by one frame. It is to be noted that the exposure completion signal lever 20 is returned to its initial position in response to charging of a shutter mechanism not shown which is charged by an additional gear connected to the motor M.

Now, a film rewinding operation which is performed after completion of photographing of all the available frames of a film will be described. When the entire camera is brought into a halted condition after completion of photographing of an entire film, the sprocket 50 and the spool 48 are also halted. Then, if the halted condition continues for a predetermined interval of time or more, an interrupt signal is delivered to a controlling device for the motor M so that driving of the motor M is stopped in order to allow subsequent starting of a rewinding operation for the film.

Rewinding of the film is started by pushing a rewinding operating lever 52 in a direction of an arrow mark of FIG. 21. As the rewinding operating lever 52 is pushed in this manner, the winding stopping lever 22 is pivoted thereby in the counterclockwise direction in FIG. 21 so that it is brought out of engagement with the winding stopping cam 24. In this instance, another microswitch $S_7$ is closed by the operating lever 52 so that the motor controlling device enters a film rewinding routine which will be described hereinafter in detail.

In response to closing of the microswitch $S_7$, the motor M is rotated now in a rewinding direction (clockwise direction in FIG. 21) opposite to the film winding direction (counterclockwise direction in FIG. 21). Consequently, the speed reduction gear member 30 is rotated in the counterclockwise direction, and the planetary gear lever 32 is rotated also in the counterclockwise direction around the speed reduction gear member 30. As a result of such counterclockwise rotation of the planetary gear lever 32, a rewinding planetary gear 54 supported on the planetary gear lever 32 is brought into meshed engagement with a rewinding gear 56. The rewinding gear 56 is connected to a rewinding pulley 60 via a gear 58 so that as the rewinding planetary gear 54 is rotated in the clockwise direction and is meshed with the rewinding gear 58, the pulley 60 is rotated in the clockwise direction.

The pulley 60 is connected by a timing belt 62 to a rewinding fork pulley 64 secured to a rewinding fork 66 so that as the pulley 60 is rotated in the clockwise direction, the rewinding fork 66 is rotated also in the clockwise direction. The rewinding fork 66 thus attempts to mesh with a rotatable shaft of a film cartridge not shown and rotate the same in the clockwise direction to wind up the film into the cartridge. Here, since the winding stopping cam 24 is already out of engagement with the winding topping lever 22, the spool 48 around which the film is partially wrapped and the sprocket 50 are allowed to rotate in the clockwise direction. Accordingly, when the film is wound up into the cartridge, the sprocket 50 and the spool 48 are drawn by the film and thus rotated in the clockwise direction by the latter.

Upon completion of the rewinding operation, it is detected by a film detecting switch not shown and driving of the motor M is thus stopped. It is to be noted that the rewinding operating lever 52 is automatically returned to its initial position when a rear cover of the camera not shown is opened.

Figure 22:
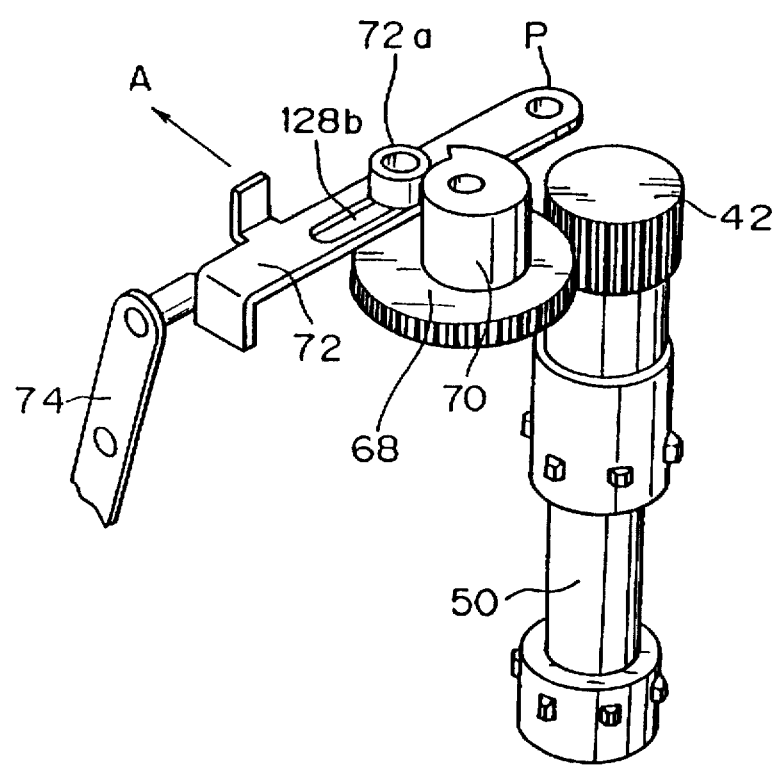
FIG. 22 is a perspective view showing a shutter charging mechanism of the camera of FIG. 21.

The shutter mechanism is energized by a mechanism shown in FIG. 22. Referring to FIG. 22, a gear 68 is held in meshed engagement with the sprocket gear 42 integrally mounted on the sprocket 50 and has a cam 70 formed on an upper face thereof. Thus, as the sprocket 50 is rotated in the counterclockwise direction in FIG. 22 for winding of a film by one frame, the gear 68 is rotated in the clockwise direction in an integral relationship with the cam 70 thereon. Upon such rotation of the cam 70, a cam follower 72a securely mounted on a lever 72 is pushed by the cam 70 to pivot the lever 72 in the clockwise direction (in a direction of an arrow mark A) around an axis P. As the lever 72 is pivoted in the direction A, another lever 74 is also pivoted in the direction A thereby to energize the shutter mechanism not shown.

Figure 23:
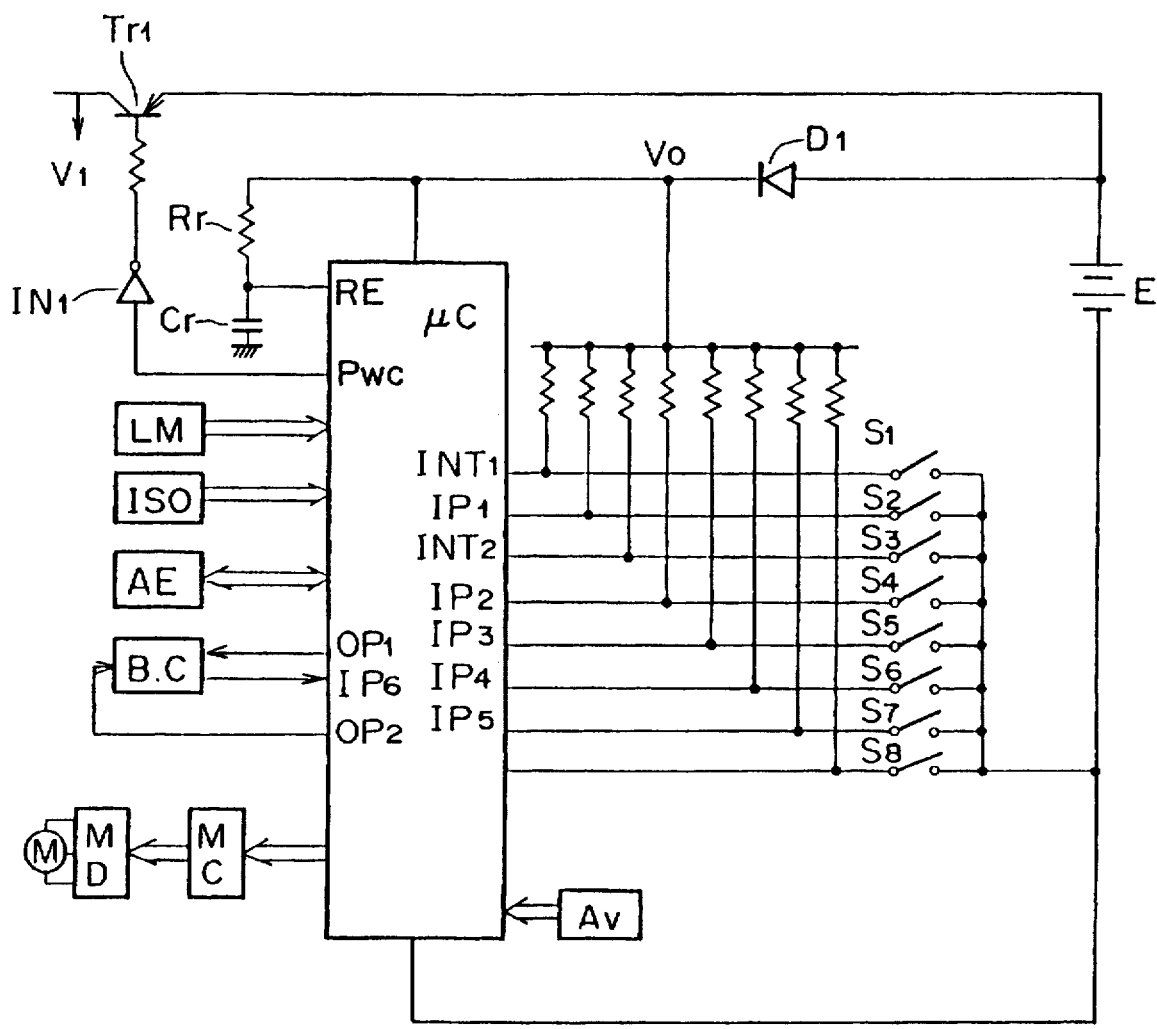
FIG. 23 is a block diagram showing an electric circuit of the motor controlling system of FIG. 21.

An electric circuit of the motor controlling system according to the invention described above is shown in FIG. 23. Referring to FIG. 23, the circuit shown includes a power source battery E, and a microcomputer μC for executing sequencing control and exposure calculation of the entire camera. The microcomputer μC is connected to the power source E via a diode $D_1$ so that power may be supplied thereto from the power source E. The circuit further includes a photometry circuit LM for receiving light transmitted through a photographing lens not shown to measure a brightness of an object, an automatic film sensitivity reading circuit ISO for automatically reading a sensitivity of a film loaded in the camera, and an open F-number reading circuit AV for reading an open F-number of a photographing lens mounted on the camera body. Those circuits LM, ISO, AV are connected to deliver signals Bvo, Sv, Avo of digital A.P.E.X. values as output information to the microcomputer μC.

The circuit shown in FIG. 23 further includes an exposure controlling circuit AE for controlling operation of an aperture diaphragm and a shutter in response to an aperture value signal Av and a shutter speed value signal Tv delivered from the microcomputer μC. The circuit further comprises a battery checking circuit BC for checking an electric current and a voltage when a current is flowed through a resistor corresponding to an actual load. Thus, the microcomputer μC judges in accordance with a checked voltage value from the battery checking circuit BC whether or not change-over between the coils of the motor M is to be allowed. The circuit further includes a motor controlling circuit MC for decoding a 3-bit controlling signal delivered from the microcomputer μC to produce a controlling signal to be delivered to a motor driver circuit MD for driving the motor M. Those circuits AE, BC, MC, MD are all connected to the power source E via a power supply transistor $Tr_1$ so that power may be supplied to the circuits from the power source E. Here, the base of the power supply transistor $Tr_1$ is connected to an output terminal Pwc of the microcomputer μC via an inverter $IN_1$ so that supply of power to the circuits AE, BC, MC, MD may be controlled by the microcomputer μC. A resistor Rr and a capacitor Cr are connected to an input terminal RE of of the microcomputer μC and produces a reset signal to be delivered to the input terminal RE of the microcomputer μC when a battery is set in position in the camera.

The circuit shown in FIG. 23 includes various switches including a photographing preparing switch $S_1$ which is turned on by depression of a shutter release button not shown to a first extent or depth. Upon turning on of the switch $S_1$, a signal which changes from a high ("H") level to a low ("L") level is delivered to an interrupt terminal $INT_1$ of the microcomputer μC, and consequently an interrupt routine "$INT_1$" which will be hereinafter described will be executed by the microcomputer μC. A release switch $S_2$ is turned on by depression of the shutter release button to a second extent or depth which is greater than the first extent or depth, and exposure controlling operation is thus initiated in response to turning on of the release switch S2. A rear cover closed switch $S_3$ is turned on when a rear cover of the camera is closed, and upon turning on of the rear cover closed switch $S_3$, a signal changing from an "H" level to an "L" level is delivered to another interrupt terminal $INT_2$ of the microcomputer μC, and consequently the microcomputer μC executes an interrupt routine "$INT_2$" which will be hereinafter described. A manually selecting switch $S_4$ is turned on or off by manual selecting operation thereof between an automatic change-over mode wherein the driving speed of the motor M is changed over automatically and a low speed mode wherein the driving speed of the motor M is compulsorily set to a low driving speed. The switch $S_4$ is constituted such that it is off for the automatic change-over mode and on for the low speed mode.

A film detecting switch $S_5$ is located at a film magazine receiving portion of a camera body in an opposing relationship to a plane along which a film travels for detecting a film drawn out from the film cartridge. An exposure completion switch $S_8$ is turned on upon completion of movement of trailing curtain of a focal plane shutter by completion of exposure operation and is turned off by a mechanism not shown when a film is wound by one frame. A one frame winding completion detecting switch $S_6$ corresponds to the microswitch $S_6$ of FIG. 21 and is thus turned on upon starting of winding of a film and then tuned off upon completion of the winding of the film by one frame. A rewinding switch $S_7$ corresponds to the microswitch $S_7$ of FIG. 21 and is thus closed by depression of the rewinding operating lever 52 in order to effect rewinding of a film.

Now, operation of the camera having the construction described above will be described with reference to flow charts shown in several figures. If a battery E is first mounted in position in the camera, a reset signal which changes from an "L" level to an "H" level is delivered to the reset terminal RE of the microcomputer μC. Consequently, the microcomputer μC enters a reset routine "RESET" of FIG. 24 which illustrates general operation of the microcomputer μC.

Figure 24:
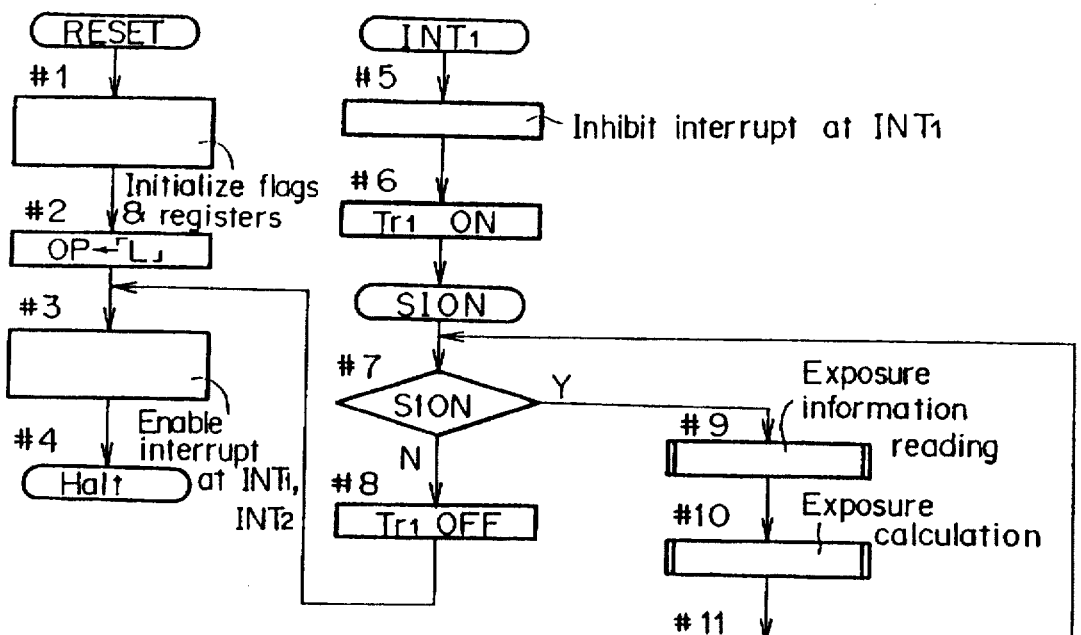
FIG. 24 is a flow chart illustrating general operation of the circuit of FIG. 23.

Referring to FIG. 24, at first at step #1, the microcomputer μC initializes internal flags and registers which will be hereinafter described, and then at step #2, the microcomputer μC changes output terminals $OP_1$, $OP_2$ to an "L" level. After then, the microcomputer μC enables, at step #3, interruption thereof by an interrupt signal which is to be received at either of the interrupt terminals $INT_1$, $INT_2$, and then at step #4, it stops operation of itself and enters a halted state.

In this condition, the shutter release button not shown may be depressed. Thus, when the shutter release button is depressed to the first extent or depth, the photographing preparing switch $S_1$ is turned on so that a signal changing from the "H" level to the "L" level is delivered to the interrupt terminal $INT_1$ of the microcomputer μC. Consequently, the microcomputer μC executes the interrupt routine "$INT_1$". In the interrupt routine "$INT_1$", the microcomputer μC inhibits, at first at step #5, interruption for execution of the interrupt routine "$INT_1$", and then at step #6, it turns the power, supply transistor $Tr_1$ on in order to start supply of power to the exposure controlling circuit AE, the battery checking circuit BC, the motor controlling circuit MC AND THE MOTOR DRIVING CIRCUIT MD via a power supply line $V_1$ (refer to FIG. 23). Then at step #7, the microcomputer μC determines whether or not the photographing preparing switch $S_1$ is on, and in case the switch $S_1$ is not on, the microcomputer μC turns the power supply transistor $Tr_1$ off at step #8 and the advances the program to step #3.

Figure 25:
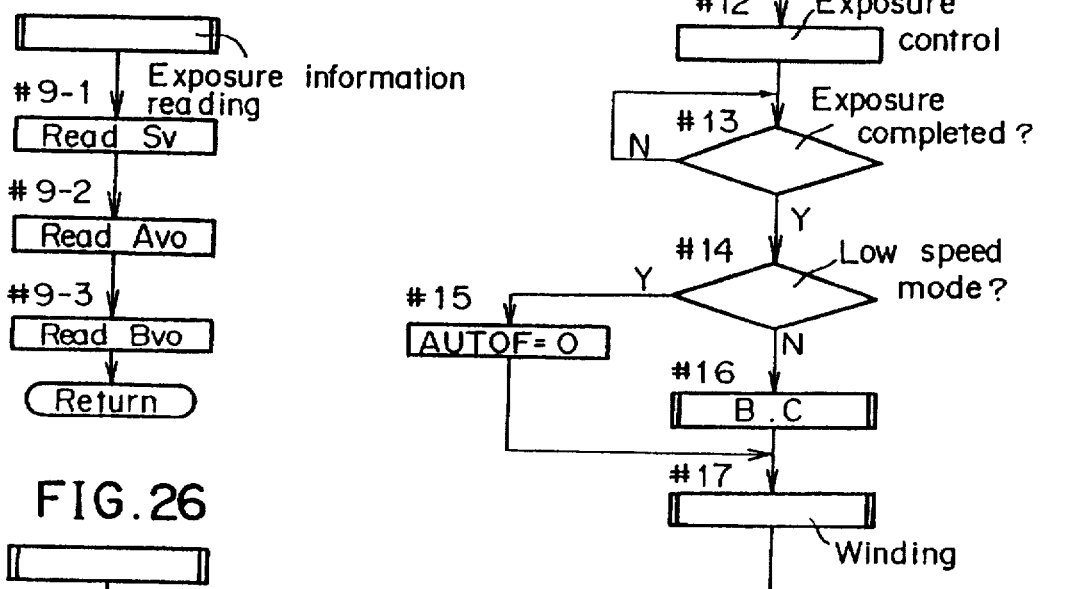
FIG. 25 is a flow chart illustrating an exposure information reading subroutine.
Figure 26:
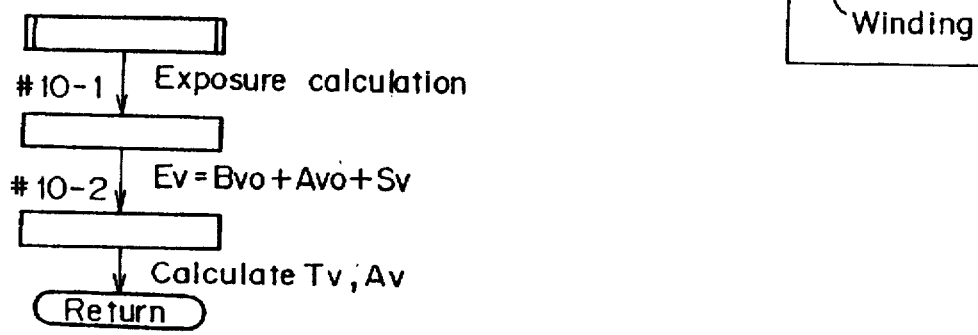
FIG. 26 is a flow chart illustrating an exposure calculation subroutine.

To the contrary, in case the photographing preparing switch $S_1$ is on at step #7, exposure information is received at step #9 and then calculations for exposure are performed at step #10. Flow charts of subroutines illustrating detailed operations of the steps #9 and #10 are shown in FIGS. 25 and 26, respectively. At first, in the exposure information reading routine of FIG. 25 illustrating detailed operation of step #9, film sensitivity information (speed value) Sv is read at step #9-1 from the automatic film sensitivity reading circuit ISO, and then at step #9-2, open F-number value information (aperture value) Avo is read from the open F-number value reading circuit AV. Then at #9-3, the microcomputer μC reads from the photometry circuit LM information (luminance value) Bvo regarding a brightness of an object measured from light passing through the photographing lens and received by the photometry circuit LM. After then, the program returns to the routine of FIG. 24.

Meanwhile, in the exposure calculation subroutine of FIG. 26 illustrating detailed operation of step #10, at first an exposure value Ev is calculated at step #10-1 from the photographing information Sv, Avo, Bvo read at step #9, and then at step #10-2, a controlling aperture value Av and a controlling shutter speed (time value) Tv are calculated from the exposure value Ev in accordance with a predetermined program chart not shown, whereafter the program returns to the routine of FIG. 24.

Referring back to FIG. 24, after completion of the operations of steps #9 and #10 illustrated in FIGS. 25 and 26, the microcomputer μC checks at step #11 whether or not the shutter release button is depressed to the second extent or depth to turn the release switch $S_2$ on, and if the shutter release button is not depressed to the extent, the program returns to step #7. On the contrary, in case the shutter release button is depressed to the extent, the program advances to step #12 at which the microcomputer μC executes exposure controlling operation. Then at step #13, the microcomputer μC waits until after completion of the exposure controlling operation. Thus, after movement of the trailing curtain of the shutter to complete the exposure controlling operation, a film must subsequently be wound by one frame. However, in the present embodiment, it is detected at step #14 before such film winding operation whether the motor M is in the automatic change-over mode or in the low speed high torque rotation mode. Here at step #14, the microcomputer μC determines from the state of the manually selecting switch $S_4$ whether or not the low speed high torque rotation mode is selected, and then where the low speed high torque rotation mode is selected, the program advances to step #15 at which an auto flag AUTOF indicating the automatic change-over mode is reset to zero. On the contrary, where the automatic change-over mode is selected, the program advances to step #16 at which a battery checking subroutine is executed for determining whether or not the battery E can stand power consumption upon high speed rotation of the motor M by energizing a resistor corresponding to a load of the motor M and by measuring a voltage drop across the resistor.

In prior to description of detailed construction of the battery checking circuit which actually checks the power source battery and of flow charts illustrating battery checking operation of the battery checking circuit, a relationship between a driving speed of the motor and a voltage of the battery will be described. Reference is now had to a graph of FIG. 27 wherein the axis of abscissa indicates a time for feeding a film and the axis of ordinate indicates a voltage of a power source battery.

Figure 27:
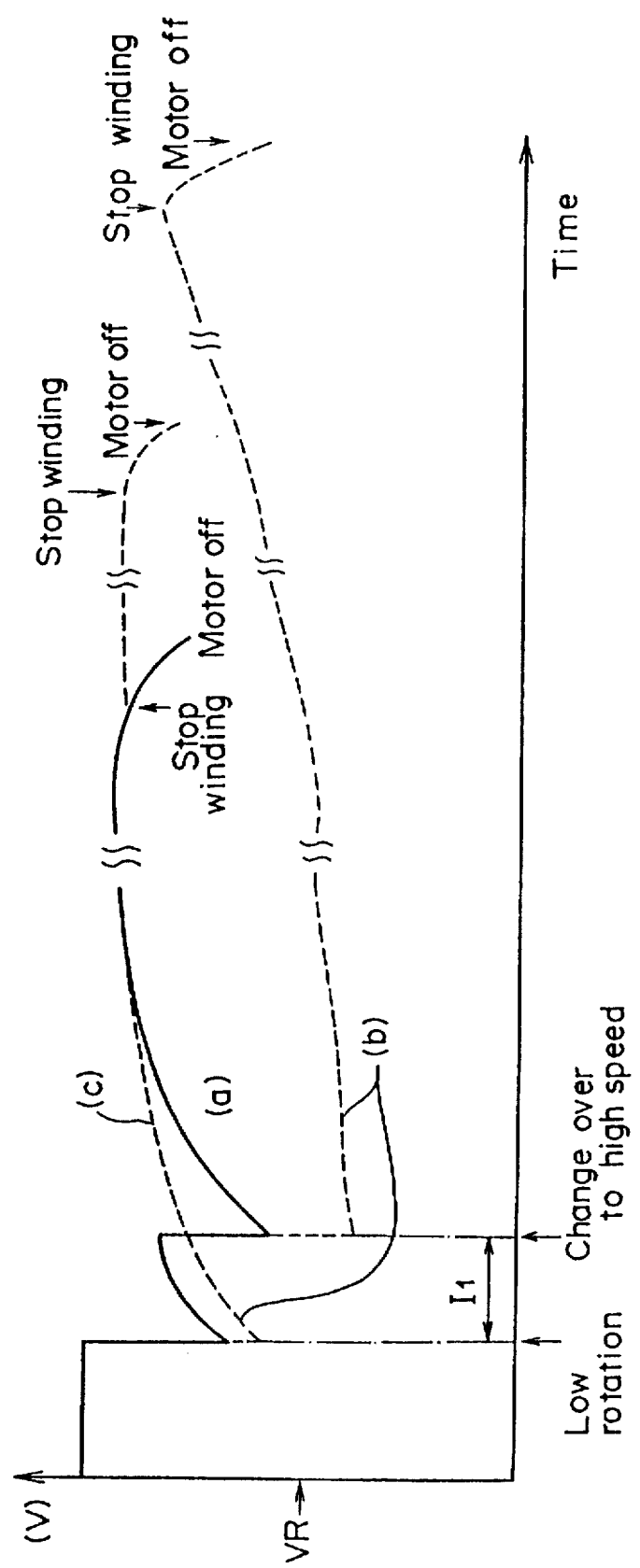
FIG. 27 is a graph illustrating a relationship between the time and the voltage of a power source upon starting of a motor which is controlled by the circuit of the motor controlling system of FIG. 23.

At first upon starting of winding of a film, a voltage is applied across a serial circuit of the first and second coils in order to attain low speed high torque rotation of the motor because a high torque is required in order to start winding of the film. This corresponds switching of the switch Sw to the contact $t_1$ in FIG. 1 which illustrates a concept of the present invention. Then, after lapse of a predetermined interval of time $I_1$, the motor M is changed over to the high speed low torque rotation side. In particular, the switch Sw in FIG. 1 is switched to the contract $t_2$. The time $I_1$ is determined such that the output rotational frequency of the motor M may reach, within the time $I_1$, a value around a point in FIG. 2 at which two characteristic lines (T-N)α and (T-N)β intersect each other. When the motor M is changed over to the high speed low torque rotation side in this manner, the voltage may sometimes become lower than that at the time of starting of the low speed high torque rotation (particularly where the capacity of the battery is low) due to the fact that the internal resistance of the motor M reduces comparing with the internal resistance upon low speed high torque rotation of the motor M. Here, if the voltage of the power source reduces, the current flow through the coil will be reduced, and hence a required torque may not be obtained. Consequently, the film may not be wound as seen from a curve (b) of FIG. 27, which will make such change-over of rotation of the motor M to the high speed low torque rotation side ineffective. Therefore, in the present embodiment, a predetermined voltage level such as indicated at VR in FIG. 27 is determined in order to obtain a current flow and hence a voltage required in order to obtain a torque necessary for winding of the film. Thus, in case the power source voltage when the resistor corresponding to the actual load is energized is higher than the predetermined voltage level VR, it is considered that the motor M can be driven efficiently and accordingly the motor M is changed over to the high speed low torque rotation side in order to raise the winding speed of the film. To the contrary, in case the open voltage is lower than the predetermined voltage level VR, the low speed high torque rotation of the motor is maintained as seen from a curve (c) of FIG. 27 in order to obtain a high torque to assure winding of the film.

Figure 28:
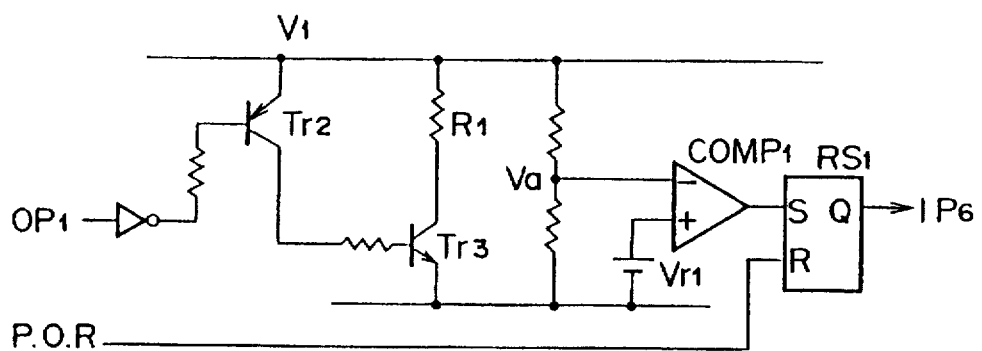
FIG. 28 is a circuit diagram showing detailed construction of a battery checking circuit of the circuit of FIG. 23.
Figure 29:
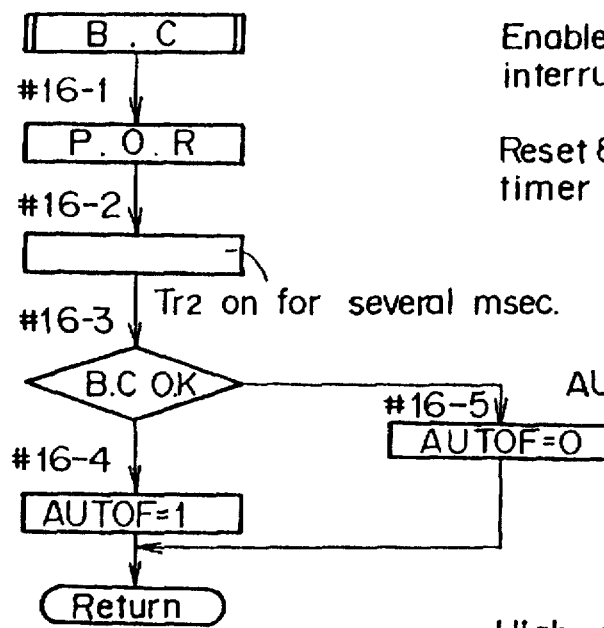
FIG. 29 is a flow chart illustrating a battery checking subroutine.

FIG. 28 shows detailed construction of the battery checking circuit BC for checking a battery, and FIG. 29 illustrates the battery checking subroutine of step #16 of FIG. 24. Now, operation of the battery checking circuit BC will be described with reference to a circuit diagram of FIG. 28 and a flow chart of FIG. 29. At first at step #16-1 of the flow chart of FIG. 29, the microcomputer μC delivers from the output terminal $OP_2$ thereof a power-on reset signal POR which momentarily presents an "H" level. Consequently, an RS-type flip-flop $RS_1$ shown in FIG. 28 is reset. Subsequently at step #16-2, the output terminal $OP_1$ of the microcomputer μC is held at the "H" level for several milliseconds (for example, 2 to 3 milliseconds) to turn on transistors $Tr_2$, $Tr_3$ shown in FIG. 28 in order to flow an electric current through a resistor $R_1$ corresponding to a load to the motor M (a load to the motor M upon driving at a high speed). Then at step #16-3, the microcomputer μC determines whether or not a voltage Va obtained by division of a voltage when the current is flowed through the resistor $R_1$ is lower than a predetermined reference voltage $Vr_1$ of a reference voltage source $Vr_1$ (which is a voltage corresponding to the voltage level VR of FIG. 27). In case the voltage Va is lower than the reference voltage $Vr_1$, a comparator $COMP_1$ delivers a signal changing to an "H" level to set the RS flip-flop $RS_1$. Consequently, the RS flip-flop produces an "H" level. To the contrary, in case the divided voltage Va of the power source voltage is equal to or higher than the reference voltage $Vr_1$, the RS flip-flop maintains its reset state and thus continues to deliver the "L" level. Accordingly, the "H" level of the output of the RS flip-flop $RS_1$ indicates that the voltage of the power source has lowered to a voltage lower than the predetermined level, and on the contrary the "L" level indicates that the power source provides a sufficiently high voltage to drive the motor at a high speed.

In this manner, the microcomputer μC controls, at step #16-2, the transistors $Tr_2$, $Tr_3$ to turn on and continue its on state for several milliseconds and then checks, at step #16-3, output of the RS flip-flop $RS_1$ in order to check the battery. Then, in case it is determined as a result of such battery checking that the voltage of the battery is sufficiently high, that is, in case the output of the RS flip-flop $RS_1$ is at the "L" level, the auto flag AUTOF indicating the automatic change-over mode is set to "1" at step #16-4. On the contrary, in case it is determined at step #16-3 that the output of the RS flip-flop $RS_1$ is not sufficiently high, that is, in case the output of the RS flip-flop $RS_1$ is at the "H" level, the auto flag AUTOF is reset to "0". After either of the steps #16-4 and #16-5, the program returns to the routine of FIG. 24.

Figure 30:
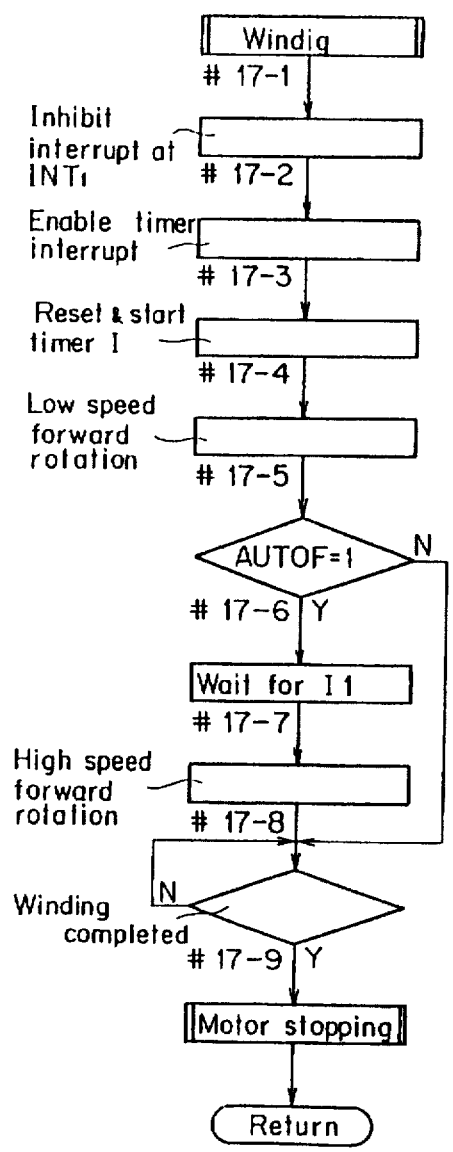
FIG. 30 is a flow chart illustrating a winding subroutine.

Referring back again to FIG. 24, after the driving speed of the motor M has been selected in this manner, the microcomputer μC controls a film winding operation. Referring now to FIG. 30 which shows a subroutine indicating the film winding operation, the microcomputer μC inhibits, at first at step #17-1, interruption for execution of the interrupt routine $INT_1$ by turning on of the photographing preparing switch $S_1$, and then enables, at step #17-2, timer interrupt which will be hereinafter described, whereafter a timer I which will be hereinafter described is reset and started at step #17-3. The timer interrupt is provided in order to perform a film rewinding operation when photographing of a photographable number of frames of a film is completed and the film cannot be wound any more. It should be considered here that the timer I is a hardware timer provided within the microcomputer μC.

here, a relationship between a 3-bit signal ($b_2$, $b_1$, $b_0$) transmitted from the microcomputer μC to the motor controlling circuit MC and a 6-bit controlling signal (a, b, c, d, e, f) delivered from the motor controlling circuit MC to the motor driving circuit MD is illustrated in Table 1 below.

TABLE 1

| Signal from Microcomputer | | | Contents of | Control Signal | | | | | |
|---|---|---|---|---|---|---|---|---|---|
| b2 | b1 | b0 | Signals | a | b | c | d | e | f |
| 1 | 0 | 0 | Low speed Forward R. | L | O | O | H | O | O |
| 1 | 0 | 1 | Low Speed Reverse R. | O | H | L | O | O | O |
| 0 | 1 | 0 | HIGH SPEED Forward R. | O | O | O | H | L | O |
| 0 | 1 | 1 | HIGH SPEED Reverse R. | O | O | L | O | O | H |
| 0 | 0 | 1 | STOP | O | H | O | H | O | H |
| 0 | 0 | 0 | OFF | O | O | O | O | O | O |
| 0 | 0 | 1 | STOP | O | H | O | H | O | O |

In Table 1, a character "L" represents an "L" level, "H" an "H" level, and "O" an open state.

Subsequently at step #17-4 of FIG. 30, a film winding operation is (started). In this instance, however, the (microcomputer) μC delivers a 3-bit signal (1, 0, 0) shown in Table 1 to the motor controlling circuit MC in order to rotate the motor M in a low speed high torque condition at an initial stage of the film winding operation. Upon the 3-bit signal, the motor controlling circuit MC delivers a 6-bit signal (L, O, O , H, O, O) as controlling signal (a, b, c, d, e, f) to the motor driving circuit MD.

Here, the motor controlling circuit MC and the motor driving circuit MD will be described. The microcomputer μC sends a selected one of 6 3-bit signals to the motor controlling circuit MC in accordance with a manner or mode in which the motor M is to be driven. One of the 6 kinds of 3-bit signals are shown in Table 1 above. Thus, where the motor M is to be driven to rotate in the forward direction at a low speed, the microcomputer μC delivers a signal of ($b_2$, $b_1$, $b_0$)=(1, 0, 0). As the motor controlling circuit MC receives the signal, it decodes the received signal into a 6-bit signal (L, O, O, H, O, O) as a controlling signal (a, b, c, d, e, f) and delivers the 6-bit signal to the motor driving circuit MD.

Figure 31:
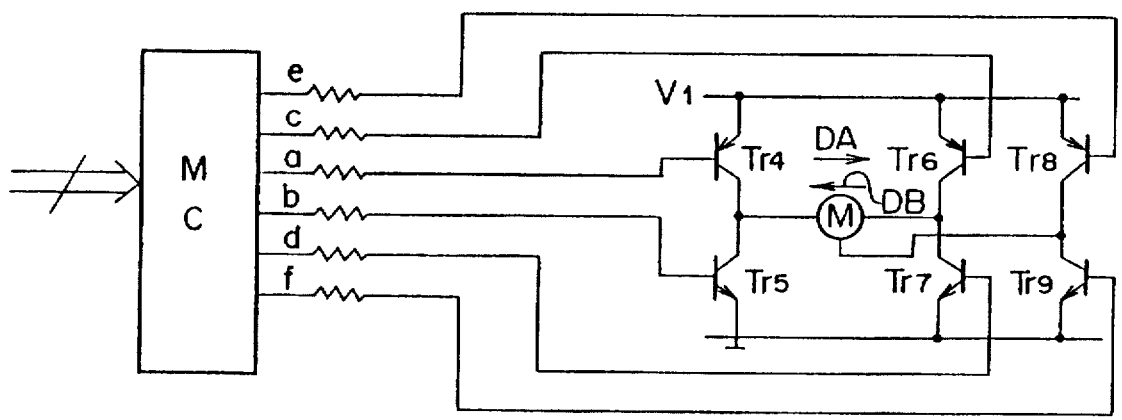
FIG. 31 is a circuit diagram showing detailed construction of a motor driving circuit of the circuit of FIG. 23.

The motor driving circuit MD has such a construction as shown in FIG. 31. Thus, when the motor M is to be driven to rotate in the forward direction in a low speed high torque condition, transistors $Tr_4$, $Tr_7$ are both turned on while the remaining transistors $Tr_5$, $Tr_6$, $Tr_8$, $Tr_9$ are turned off. Accordingly, electric current flows through the transistor $Tr_4$, the motor M (in a direction of an arrow mark DA) and then the transistor $Tr_7$ thereby to drive the motor M to rotate in the forward direction in a low speed high torque condition. Similarly, for reverse rotation of the motor M in a low speed high torque condition, signals are ($b_2$, $b_1$, $b_0$)=(1, 0, 1) and (a, b, c, d, e, f)=(O, H, L, O, O, O), and electric current flows through the transistor $Tr_6$, the motor M (in a direction of an arrow mark DB) and then the transistor $Tr_5$ thereby to drive the motor M to rotate in the reverse direction in a low speed high torque condition. For high speed low torque forward rotation of the motor, signals are ($b_2$, $b_1$, $b_0$)=(0, 1, 0) and (a, b, c, d, e, f)=(O, O, O, H, L, O) and electric current flows through the transistor $Tr_8$, the motor M and the transistor $Tr_7$ to drive the motor M in the forward direction in a high speed low torque condition. Here, it is to be noted that a signal line extending from the lower center of the motor M in FIG. 31 is extracted from a tap of the motor M. Finally for high speed low torque reverse rotation of the motor M, signals are ($b_2$, $b_1$, $b_0$)=(0, 1, 1) and (a, b, c, d, e, f)=(O, O, L, O, O, H) and electric current flows through the transistor $Tr_6$, the motor M and then the transistor $Tr_9$.

In order to stop the motor M, the NPN type transistors $Tr_5$, $Tr_7$, $Tr_9$ are all turned on to short the entire motor M irrespective of the speed and the direction of rotation of the motor. The reason is given now. In the case of rotation of the motor M in a low speed high torque condition, the two coils are both energized, and hence the two coils must naturally be shorted upon stopping of the motor M. To the contrary, in the case of rotation at a high speed low torque condition, only one of the two coils is energized, and accordingly it may seem advisable to short only the energized coil. However, this is not practically advantageous because of a following reason. In particular, the two coils are wound on the coaxial iron core, and accordingly the other coil which is not energized rotates around the axis of the iron core similarly as the energized coil. Consequently, an electromotive force is generated in the coils. This will be described briefly with reference to FIG. 1. It is assumed now that the switch Sw in FIG. 1 is connected to the contact $t_2$. Thus, since the coils $R_1$, $R_2$ are both rotating, a predetermined electromotive force (energy) is generated in each of the coils. If supply of power to the motor M is stopped while the coils are rotating, the motor M will continue its rotation for a little while due to its inertia. In this instance, if only the coil $R_2$ is shorted, the motor M is electromagnetically braked by the coil $R_2$ while the energy of inertial is consumed to attempt to step rotation of the motor M, but the generated energy of the other coil $R_1$ does not contribute to such electromagnetic braking, which may result in failure in production of a sufficient braking force to stop the motor M. Accordingly, the shorting only of the coil $R_2$ may not cause the motor M to stop its rotation rapidly with a high efficiency. This principle naturally applies also where the motor is rotating in the opposite direction. Therefore, the entire coils are shorted when rotation of the motor M is to be stopped irrespective of the direction and the speed of rotation of the motor M. In a possible modification, only the transistors $Tr_5$, $Tr_7$ may be turned on in order to attain a similar effect (this is shown in the lowermost line in Table 1 above).

Referring back to the film winding subroutine of FIG. 30, after the microcomputer μC has delivered the controlling signal for low speed high torque forward rotation of the motor M, it detects at step #17-5 whether or not the auto flag AUTOF is "1", and when the flag AUTOF is "1", the microcomputer μC waits for the predetermined time $I_1$ at step #17-6 and then delivers, at step #17-7, a signal for changing over the motor M to high speed low torque forward rotation. On the contrary, when the flag AUTOF is not "1" at step #17-5, the motor M is continuously driven to rotate in the low speed high torque condition. In either case, the microcomputer μC then waits at step #17-8 until the switch $S_6$ indicating completion of the winding of the film by one frame is turned off. Thus, after turning off of the switch $S_6$, the microcomputer μC controls at step #17-9 to stop rotation of the motor M whereafter the program returns to the original routine of FIG. 24.

Figure 32:
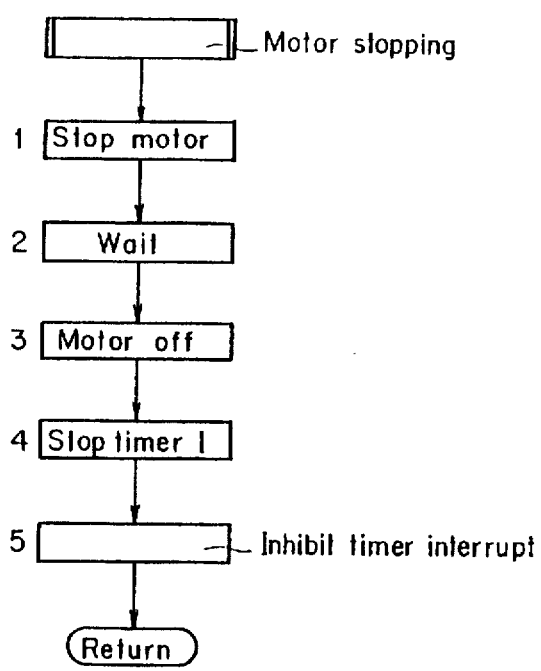
FIG. 32 is a flow chart illustrating a motor stopping subroutine.

Now, a subroutine illustrating detailed operation of the motor stopping step #17-9 of FIG. 30 will be described with reference to a flow chart of FIG. 32. At first at step ①, the microcomputer μC delivers a motor stopping signal, and then waits at step ② for an interval of time sufficient for the motor M to stop its rotation completely. After then, the microcomputer μC delivers a signal for deenergizing the motor M (a signal for turning on all the transistors $Tr_4$ to $Tr_9$ of the motor driving circuit MD). Subsequently, the microcomputer μC stops the timer I at step ④ and then inhibits timer interrupt at step ⑤ whereafter the program returns to the subroutine of FIG. 30 and then to the routine of FIG. 24.

Referring back to FIG. 24 again, after completion of the film winding operation, the program returns to step #7 so that a similar sequence of operations will be repeated.

Figure 33:
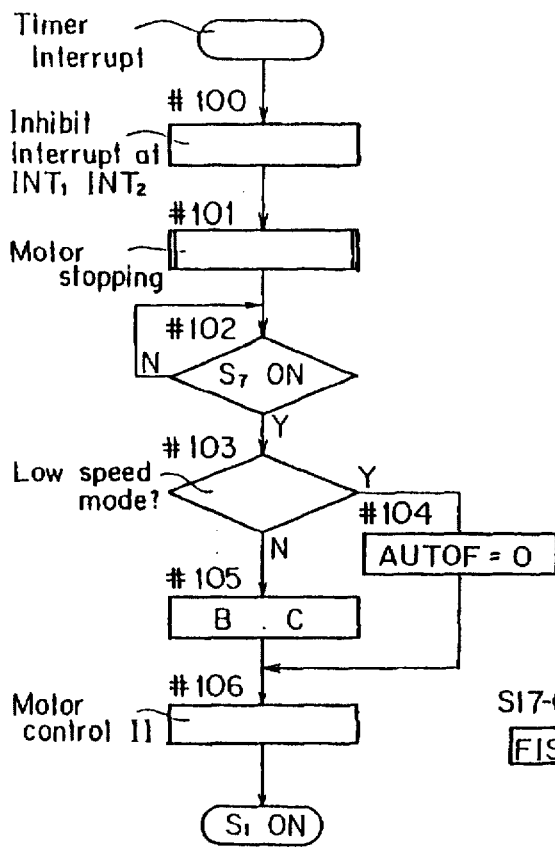
FIG. 33 is a flow chart illustrating a timer interrupt routine.

Now, description will be given of the timer interrupt which is provided to perform rewinding of a film when photographing of a photographable number of frames of a film is completed and the film cannot be wound any more during such a film winding operation as described above. As described hereinabove, when a predetermined time (for example, 1.5 seconds) elapses from starting of the timer I upon starting of the winding operation, the microcomputer μC executes a timer interrupt routine illustrated in FIG. 33 in order to perform a film rewinding operation. In the routine of FIG. 33, at first at step #100, the microcomputer μC inhibits interruption at the interrupt terminals $INT_1$, $INT_2$ thereof, and then at #102, the motor stopping subroutine illustrated in FIG. 32 is executed. Since the motor stopping subroutine has been described hereinabove, description thereof is omitted here to avoid redundancy.

Subsequently at step #102, the microcomputer μC waits until the rewinding switch $S_7$ is turned on, and upon turning of the rewinding switch $S_7$, the microcomputer μC determines at step #103 whether or not the switch $S_4$ for compulsorily changing over the motor M to a low speed high torque rotation condition is on. Thus, when the switch $S_4$ is on and hence the low speed high torque driving mode is selected, the auto flag AUTOF indicating the automatic change-over mode is reset to "0" at step #104. To the contrary, when the switch $S_4$ is not on, the program advances to step #105 at which a battery checking subroutine for determining whether the voltage of the power source battery is sufficiently high to allow automatic change-over of the motor driving mode is executed. In either case, the microcomputer μC controls, at step #106, the motor M to rewind a film in accordance with the selected speed control of the motor.

Figure 34:
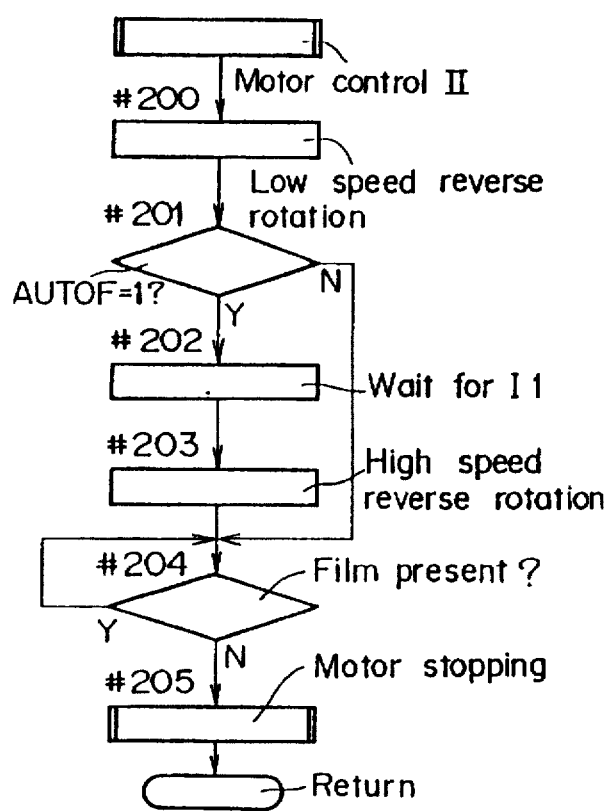
FIG. 34 is a flow chart illustrating a motor control II subroutine.

A subroutine for the motor control is illustrated in a flow chart of FIG. 34. Referring to FIG. 34, at first at step #200, the microcomputer μC delivers a signal instructing low speed high torque reverse rotation of the motor M, and then at step #201, it is determined whether or not the auto flag AUTOF is in the set ("1") state. Here, if the auto flag AUTOF is not in the set state, the program advances to step #204, but on the contrary if the flag AUTOF is in the set state, the program advances to step #202 at which the microcomputer μC waits for the predetermined interval of time $I_1$ and then to step #203 at which the driving of the motor M is changed over to high speed low torque reverse rotation, whereafter the program advances to step #204. At step #204, the film detecting switch $S_5$ is checked to determine whether or not the film has been completely taken into the film cartridge to complete the rewinding operation. Thus, in case the film has not completely been taken into the cartridge, the microcomputer μC waits for completion of the rewinding operation. Thus, when it is determined at step #204 that the film has been completely taken into the cartridge, the microcomputer μC controls at step #205 to stop rotation of the motor M and then returns the program to step #7 of the routine of FIG. 24.

Subsequently, control of the motor M upon initial winding of a film when the film is mounted in position in the camera will be described. It is to be noted however that since a film is wound by a plurality of, 3 in the following description, frames for initial winding thereof, it is advantageous to determine, just before completion of each winding of the film by one frame, whether or not the film should be wound continuously thereafter. To this end, a switch may be provided which is turned on directly before completion of winding of a film by one frame. Such a switch may be located, for example, for operation by the winding stopping cam 24 shown in FIG. 21. While such a switch may be additionally provided, the following description proceeds under an assumption that the rewinding switch $S_7$ of the circuit of FIG. 23 is omitted and such a switch $S_7$ is inserted instead that is turned on directly before completion of winding of a film by one frame.

Figure 35:
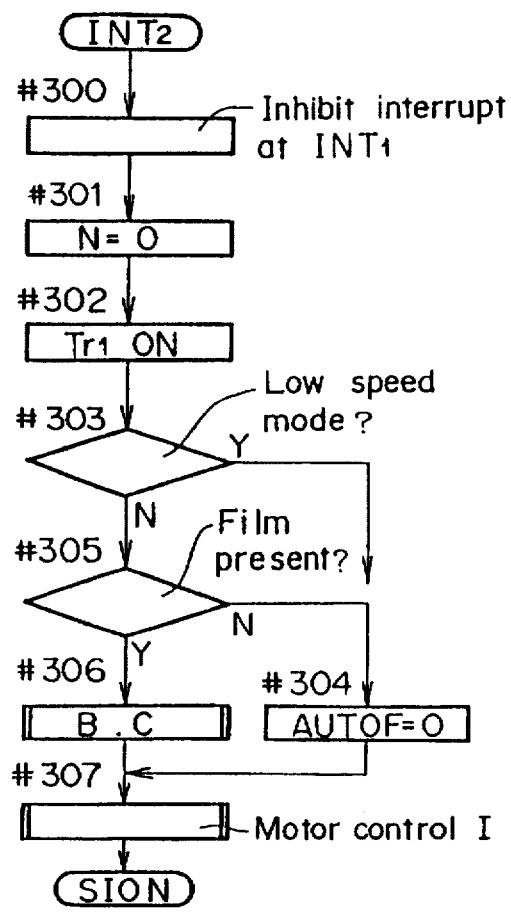
FIG. 35 is a flow chart illustrating an interrupt routine.

When a rear cover not shown of the camera is closed, the switch $S_3$ is turned on. Thereupon, the microcomputer μC receives at the interrupt terminal $INT_2$ thereof a signal which changes from an "H" level to an "L" level and thus executes an interrupt routine "$INT_2$," a flow chart of which is illustrated in FIG. 35. In the interrupt routine $INT_2$, the microcomputer μC inhibits, at first at step #300, execution of the interrupt routine "$INT_1$" by turning on of the photographing preparing switch $S_1$. Subsequently, a variable N is initially reset to "0" at stop #301 and then the power supply transistor $Tr_1$ is turned on at step #302. Then at step #303, it is detected whether or not the mode in which the motor M is compulsorily driven to rotate at a low speed is selected, and when it is detected that the low speed mode is selected, or when it is detected at subsequent step #305 that no film is mounted in the camera, the auto flag AUTOF indicating the automatic change-over mode is reset to "0" at step #304. On the other hand, when it is determined at step #303 that the low speed mode is selected and then it is determined at step #305 that a film is mounted in position in the camera, the battery is checked at step #306 to selectively determine a driving speed of the motor M. After the step #304 or step #306, the program advances to step #307 at which the motor M is controlled for initial winding at the film.

A subroutine of controlling the motor M for initial winding of a film is illustrated in a flow chart of FIG. 36. Referring to FIG. 36, the microcomputer μC controls at first at step #400 for low speed high torque forward rotation of the motor M, and then determines at step #401 whether or not the auto flag AUTOF indicating the automatic change-over mode is in the set state. Here, when the auto flag AUTOF is not in the set state, the program skips to step #404, but on the contrary when the auto flag AUTOF is in the set state, the microcomputer μC waits for a predetermined interval of time at #402 and then controls at step #403 to change over the driving of the motor M to high speed low torque forward rotation.

After then, the program advances to step #404 at which the microcomputer μC waits until the switch $S_7$ which is arranged to be turned on directly before completion of a film winding operation by one frame. Thus, when the switch $S_7$ is turned on, the microcomputer μC controls the motor M for low speed high torque forward rotation at step #405. Then at step #406, the microcomputer μC waits until the winding completion switch $S_6$ is turned off, and after turning off of the switch $S_6$, the variable N is incremented by one at step #407, and then at step #408, it is determined whether or not the variable N is equal to 3. If the variable N is not equal to 3 here at step #408, then it is determined at step #409 whether or not the auto flag AUTOF is in the set state, and if the auto flag AUTOF is in the set state, the program advances to step #403 in order to drive the motor in the forward direction in a high speed low torque condition to wind the film. On the contrary when it is determined at #409 that the auto flag AUTOF is not in the set ("1") state, the program advances to step #404 in order to perform winding of the film by low speed high torque rotation of the motor. Thus, when it is determined finally at step #408 that the variable N is equal to 3 and accordingly the film has been wound up by three frames, the motor M is stopped at step #410 in order to terminate the initial winding operation, whereafter the program returns to step #7 of FIG. 24.

It is to be noted that where the rewinding switch is replaced by the switch which is turned on directly before completion of winding of a film by one frame, the timer interrupt routine of FIG. 33 must be modified. In particular, the step #102 at which the microcomputer μC waits until the rewinding switch S7 must be omitted. Accordingly, after stopping of the motor M at step #101, the program advances directly to step #103.

Various possible modifications of the electric circuits of the camera shown in FIGS. 20 to 32 will be described below.

Figure 37:
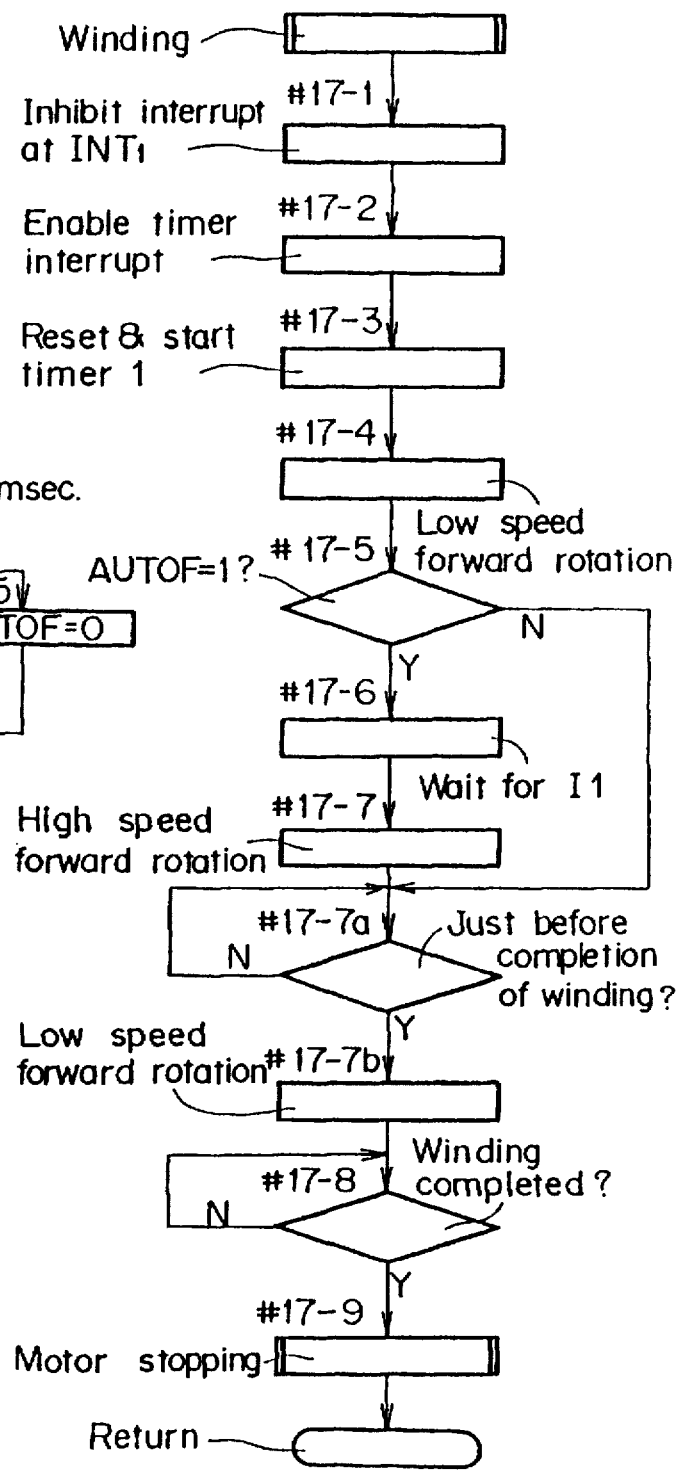
FIG. 37 is a flow chart illustrating a modified winding subroutine.

FIG. 37 shows a modification to the winding subroutine of the flow chart of FIG. 30 where the rewinding switch S7 is replaced by the switch S7 which is turned on directly before completion of winding of a film by one frame. In the winding subroutine of FIG. 37, two steps #17-7a and #17-7b are added after step #17-7. In particular, the microcomputer μC waits at step #17-7a until the switch S7 is turned on. After then, the microcomputer μC changes over the motor M to low speed high torque forward rotation at step #17-7b.

The two steps are provided by the following reason. In the film winding and rewinding mechanism shown in FIG. 21, the winding stopping cam 24 is stopped positively after one complete rotation thereof by the winding stopping lever 22. Accordingly, the torque will increase when such winding of the film by one frame is completed. Consequently, when the motor M is rotating at a high speed with a low torque, the motor M may not provide a force sufficient to continue the rotation thereof. Therefore, the motor M is changed over, at steps #17-71 and #17-7b, to the low speed high torque rotation just before completion of winding of the film by one frame in order to assure rotating of the motor M.

Meanwhile, in the embodiment shown in FIGS. 24 to 36, in case it is determined that the rotational speed of the motor M can be changed over upon initial winding of a film similarly as in normal winding of the film by one frame, it is changed over to high speed rotation after lapse of the predetermined interval of time after starting of low speed rotation. This is because when the film is to be wrapped around the spool 48 upon initial winding of the film, the low speed high torque rotation of the motor M will allow the film to be wrapped around the spool more readily than the high speed low torque rotation.

Accordingly, a following modification may be recommended. In particular, a switch for detecting that a film has been wrapped around a spool (hereinafter referred to as SLS switch) is provided such that when the SLS switch is on (the film is not yet wrapped around the spool), the motor M may be rotated in a low speed high torque condition, and when the SLS switch is turned off (when the film is wrapped around the spool), the motor may be changed over to high speed low torque rotation. Here, the SLS switch may be constituted from a conductive pressing member which is projected from the camera body for contacting with the spool which is in turn formed, for example, from conductive rubber such that when a film is wrapped around the spool, electric connection between the conductive spool and the conductive pressing member is interrupted by the film thereby to turn the switch off.

In order to match operation of the microcomputer μC with the modified arrangement, the subroutine of the flow chart of FIG. 35 itself need not be modified but the subroutine of the flow chart of FIG. 36 should be modified, for example, to such as shown in a flow chart of FIG. 38. In particular, the step of #402 of FIG. 36 at which the microcomputer μC waits for the predetermined interval of time is replaced by a modified step #402' of FIG. 38 at which it is determined whether or not the SLS switch is on and, when the SLS switch is on, the microcomputer μC waits until the SLS switch is turned off whereupon the program advances to step #403 in order to drive the motor M to rotate in a high speed low torque condition. In this instance the SLS switch and an input terminal of the microcomputer μC for receiving a signal from the SLS switch must be added to the block diagram of FIG. 19.

By the way, if it is assumed that initial winding and rewinding operations of a film have no direct relation with photographing, they need not be performed particularly at a high speed, if such operations are performed at a far lower speed, then following advantages will be forecast.

(a) Electric current is reduced.

(b) Noise production is reduced comparing with that in high speed rotation.

In order to mach operation of the microcomputer μC with the low speed high torque rotation of the motor, the pertinent motor controlling routines must only be modified such that any step having to do with change-over of the motor driving mode or with high speed rotation of the motor is omitted. Accordingly, detailed description is omitted herein.

Further, in the construction shown in FIGS. 24 to 36, change-over of the driving speed of the motor M from the low speed high torque rotation to the high speed low torque rotation and change-over from the high speed low torque to the low speed high torque rotation are performed upon lapse of a predetermined time. However, according to the construction, there is no parameter in connection with the capacity of the power source battery. Accordingly, an optimum timing at which the speed is to be changed over with respect to the capacity of a given battery cannot be determined for the given battery. Therefore, in a following modified form described below, change-over from the low speed high torque rotation to the high speed low torque rotation is performed in response to a voltage of the battery which is monitored after starting of low speed high torque rotation of the motor M. However, in the following modification, the driving speed of the motor M is once changed over to the high speed low torque rotation and then to the low speed high torque rotation because, in following cases, the winding efficiency is low, and hence, for example, much time is required for winding.

(a) When the voltage at an instant at which the motor M is changed over to the high speed low torque rotation is lower than a predetermined level.

(b) When the voltage at an instant at which the motor M is changed over to the high speed low torque rotation is higher than a predetermined voltage $V_2$ but is not restored to another predetermined voltage $V_1$ within a predetermined time (although this may not be necessary depending upon a level of the voltage $V_2$). Here, $V_1 > V_2$. Further, since high speed low torque rotation of the motor M by a battery of a low capacity will make the efficiency low when the load increases suddenly, the degree of dropping of the voltage of the power source is monitored also in this case in order to change over the motor M from the high speed low torque rotation to the low speed high torque rotation.

This is described more in detail with reference to FIG. 39 wherein the axis of abscissa indicates the time when a film is wound and the axis of ordinate indicates the voltage with the capacity of the battery taken as a parameter. It is assumed that capacities of batteries indicated by curves A, B, C, D in FIG. 34 have a relationship A>B>C>D. Now, if it is intended to make the actual torque of the motor M have a magnitude at an optimum point at which the motor M is to be changed over from the low speed high torque rotation to the high speed low torque rotation, it is known that the time until the required torque is reached varies depending upon the capacity of the battery (current flow which can be derived from the battery). Conversely, if the capacity of the battery is known, then the time required until the necessary torque is reached can be found. Then, the capacity of the battery can be found by detecting a time until a predetermined voltage is restored after the motor M is engagized, and by changing the predetermined voltage, the restoration time in accordance with a capacity of each battery can be changed. Accordingly, if the predetermined voltage is determined for the respective capacity of each battery such that the time until the predetermined voltage is restored and the time until the necessary torque is reached may coincide with each other, then an optimum point for change-over of the speed can be obtained for a change of the capacity of the battery. However, since the individual predetermined voltages will vary more or less by the capacities of the batteries, if an average of them is calculated to determine a single predetermined voltage, then a speed change-over point which is optimum for most cases can be obtained. In FIG. 39, such a predetermined voltage is represented at $V_1$, and thus it can be seen that the change-over time varies for each of batteries of various capacities (indicating that the necessary torque is substantially constant). When the driving speed of the motor M is changed over from the low speed high torque condition to the high speed low torque condition, a battery having a low capacity such as shown by the curve D of FIG. 39 will exhibit a lower voltage than the voltage level $V_2$ so that the torque produced by the motor will be too low. Consequently, a longer time will be required than when the driving speed of the motor is not changed over. Accordingly, in this case, the driving speed of the motor is changed over from the high speed low torque rotation to the low speed high torque rotation.

On the other hand, also in the case of a battery as indicated by a curve C of FIG. 39, that is, in the case of a battery the voltage of which is not restored to a predetermined voltage within a predetermined time after the driving speed of the motor has been changed over, because a longer time is required than when the motor driving speed is not changed over, the driving speed of the motor is changed over from the high speed low torque rotation to the low speed high torque rotation after lapse of the predetermined time. Further, in case the load increases suddenly as described above, for example, in case the load increases suddenly after the winding stopping mechanism has been rendered operative, where a battery having such a capacity that does not provide the required torque during high speed low torque rotation of the motor is used, the motor must necessarily be changed over to the low speed high torque rotation in order to obtain a high torque. In the present modification, this is detected by dropping of the voltage of the battery. Accordingly, the switch $S_5$ which is turned on directly before completion of winding of a film by one frame can be omitted. Further, since the voltage of the battery is normally detected upon winding of a film, no battery checking circuit is required in the following modification. Part of an exemplary electric circuit necessary to attain this is shown in FIG. 41.

Figure 40:
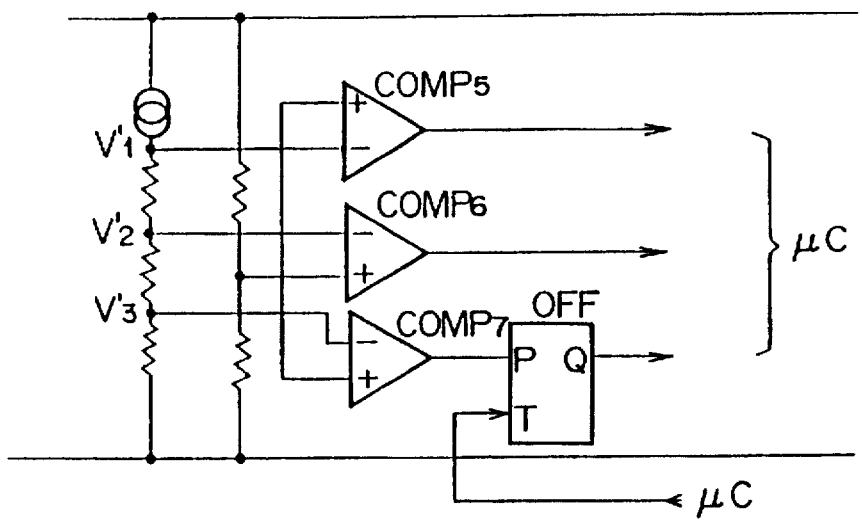
FIG. 40 is a circuit diagram showing part of an electric circuit of the modified motor controlling system which attains the relationship of FIG. 39.

Referring to FIG. 40, comparators $COMP_5$, $COMP_6$, $COMP_7$ are connected to compare a divided voltage of a voltage of the power source with respective reference voltages $V'_1$, $V'_3$, $V'_2$ (corresponding to $V_1$, $V_3$, $V_2$ of FIG. 39, respectively) and each provide an "L" level when the reference voltage is higher than the divided voltage. A D-type flip-flop DFF latches an output of the comparator $COMP_7$ in response to a latching signal from the microcomputer μC. It is to be noted that the microcomputer μC has additional terminals for receiving signals from the comparators $COMP_5$, $COMP_6$ and the D-type flip-flop DFF and an additional output terminal for delivering a latching signal to the D-type flip-flop DFF.

Figure 41:
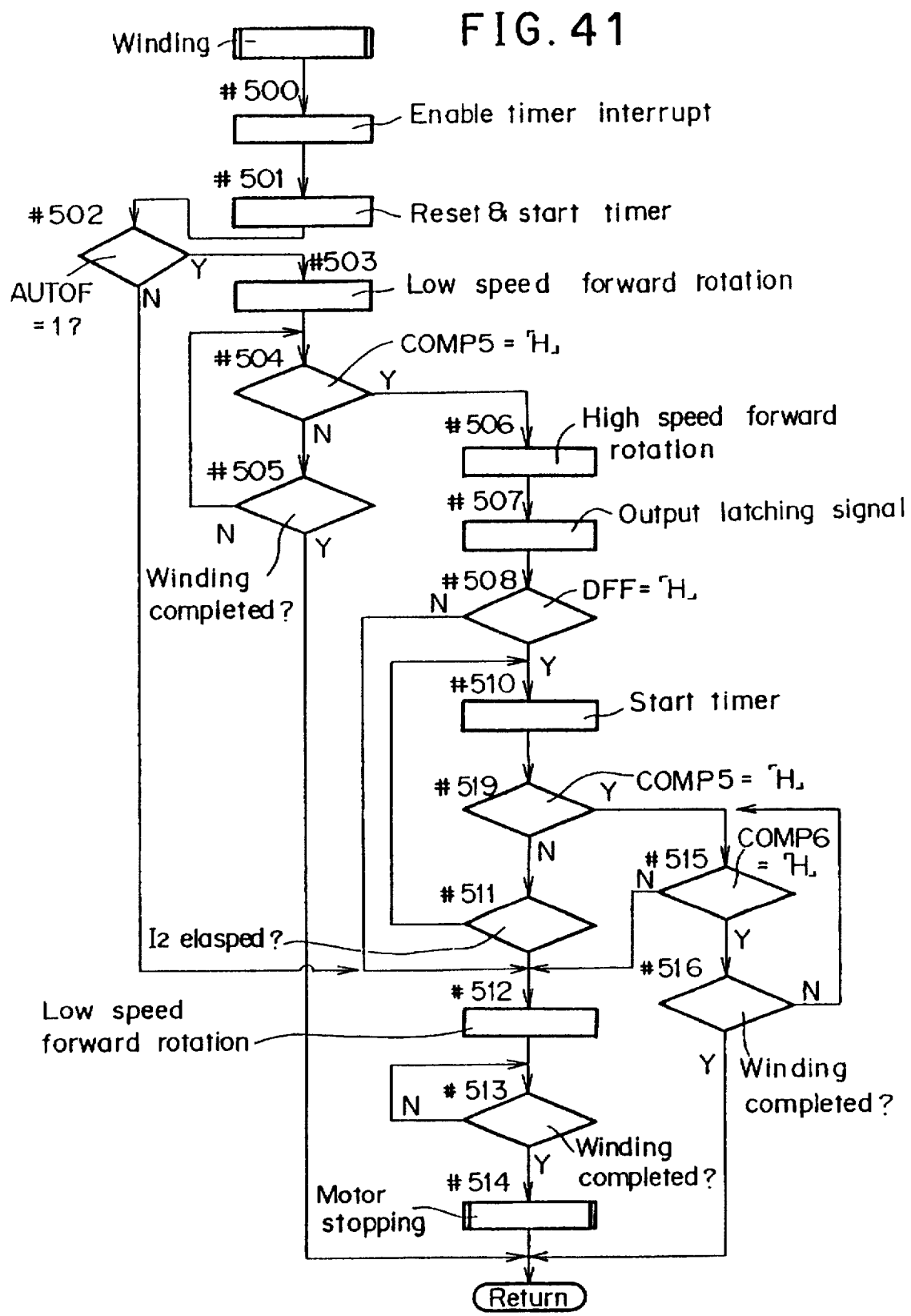
FIG. 41 is a flow chart illustrating a winding subroutine of operation of the circuit of FIG. 40.

A modification to the winding subroutine of FIG. 30 or to that of FIG. 37 for controlling a film winding operation where the modified circuit of FIG. 40 is employed is shown in FIG. 41. Referring to FIG. 41, at first at step #500, the microcomputer μC enables timer interrupt, and then at step #501, resets and re-starts a timer. Subsequently at step #502, the microcomputer μC detects a state of an auto flag AUTOF indicating the automatic change-over mode of the motor driving speed, and then when the flag is not in the set state, the program advances to step #512 at which the motor is controlled to rotate in the forward direction in a low speed high torque condition and then waits at step #513 until the winding of the film is completed.

On the contrary, when the flag AUTOF is in the set state at step #502, the program advances to step #503 at which the motor M is controlled to rotate in the forward direction in a low speed high torque condition. Then at step #504, output of the comparator $COMP_5$ is checked to determine whether or not the power source voltage is higher than the predetermined voltage $V_1$, and when the determination is affirmative, the program advances to step #506. To the contrary, when the power source voltage is not higher than the predetermined voltage $V_1$, the program advances to step #505 at which the microcomputer μC determines whether or not winding of the film is completed, and in case the film winding is not yet completed, the program returns to step #504. On the other hand, in case of completion of the film winding at step #505, the program advances to step #514 at which a motor stopping subroutine is executed to stop the motor M.

At step #506, the motor M is changed over to the high speed low torque forward rotation, and then at step #507, a latching signal is delivered to the D-type flip-flop DFF in order to cause the latter to latch a signal which indicates whether the current power source voltage is lower than the predetermined voltage $V_2$ shown in FIG. 39 or not. Subsequently at step #508, output of the D-type flip-flop DFF is received in order to check whether or not the output signal is at the "H" level, and if it is at the "L" level, then the program advances to step #512 at which the motor is changed over again to the low speed high torque rotation in order to improve the efficiency of the motor. To the contrary, when the latched signal is at the "H" level at step #508, the program advances to step #509 at which the microcomputer μC checks output of the comparator $COMP_5$ in order to determine whether or not the power source voltage has become higher than the reference voltage $V_1$ within the predetermined time $I_2$ shown in FIG. 39 lapse of which is checked at step #511, and in case the determination is negative, the microcomputer μC determines that the capacity of the battery is too low for high speed low torque rotation of the motor M and thus advances, passing steps #510 and #511, to step #512 in order to change over the motor M to the low speed high torque forward rotation.

On the other hand, when it is determined at step #509 that the power source voltage has become higher than the reference voltage $V_1$ within the fixed time $I_2$, the program advances to step #515 at which it is determined whether or not the power source voltage is now higher than the reference voltage $V_3$, and if the former is higher than the latter, the program advances to step #516 at which a film winding operation is performed until completion of the winding. Upon completion of the winding operation, the program advances to step #514 at which the motor stopping subroutine is performed in order to stop the motor. On the contrary, in case the load has been increased by the winding stopping mechanism before completion of the winding of the film so that the power source voltage is lower than the reference voltage $V_3$, the program advances from step #515 to step #512 in order to change over the motor M to the low speed high torque forward rotation. Then at step #513, the microcomputer μC waits until the winding of the film is completed, and upon completion of the film winding, it controls the motor M to stop at step #512, whereafter the program returns to the original routine. It is to be noted that while in the present modification the reference voltage when the motor is changed over from the low speed high torque rotation to the high speed low torque rotation and the reference voltage when it is to be determined whether change-over to the high speed low torque rotation is suitable for not are equal to the same voltage $V_1$, they may be different voltages if necessary.

Figure 42:
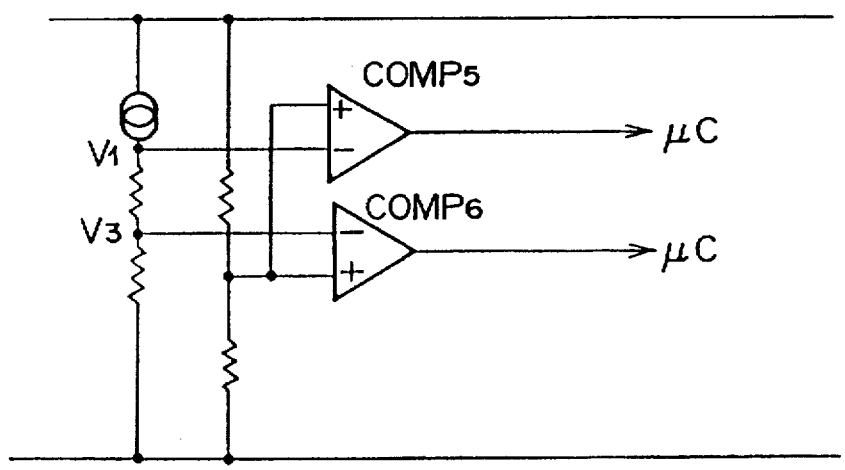
FIG. 42 is a circuit diagram showing a modified form of the circuit of FIG. 40.
Figure 43:
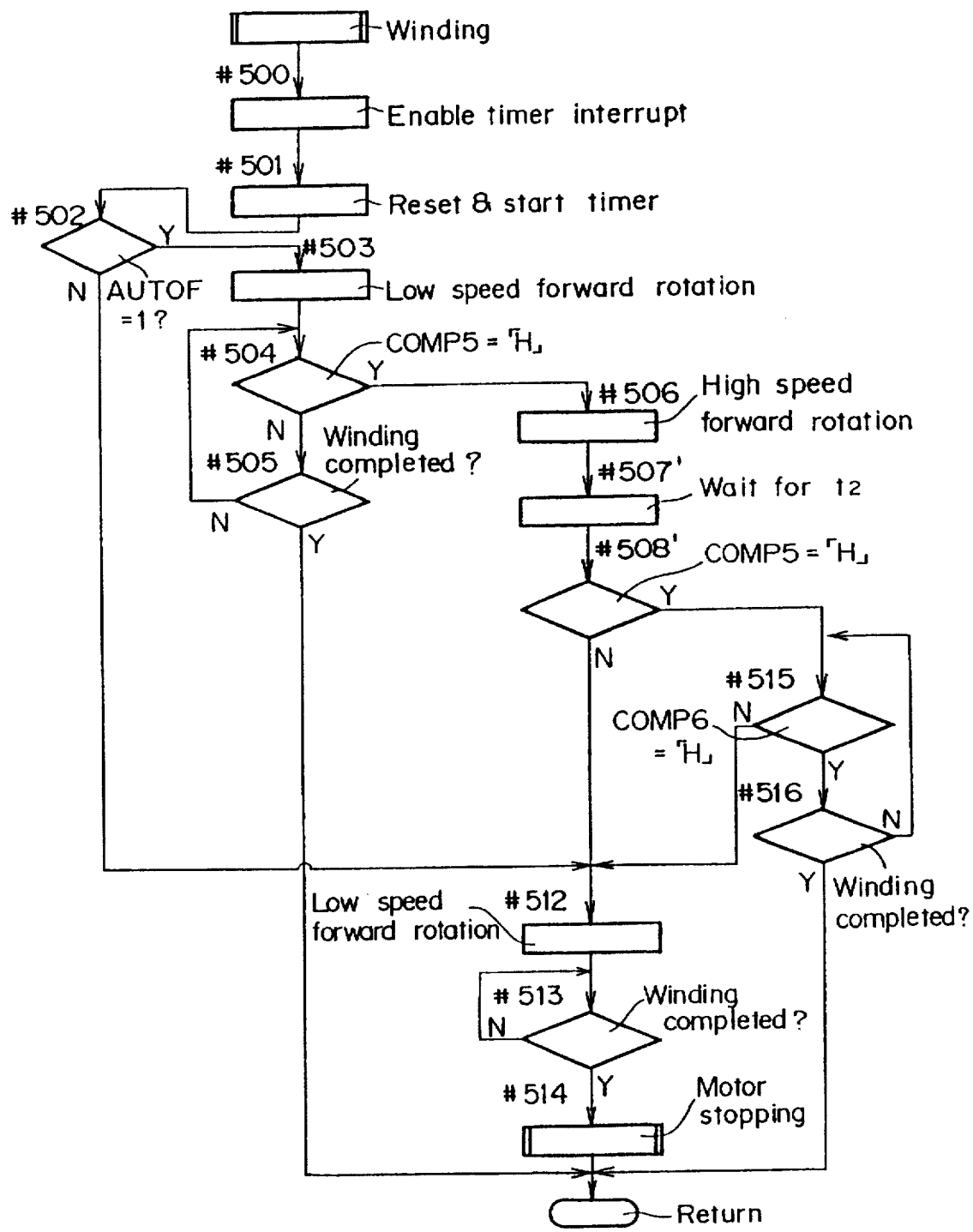
FIG. 43 is a flow chart illustrating a winding subroutine of operation of the circuit of FIG. 42.

A following modification is made to the modification of FIGS. 40 and 41 and is only different from the latter in that when it is to be determined whether another reverse change-over to the low speed high torque rotation after change-over from the low speed high torque rotation to the high speed low torque rotation is necessary or not, the power source voltage is not detected normally but otherwise it is detected only after lapse of a predetermined time after change-over to the high speed low torque rotation in order to check the power source voltage only at the point of time. An electric circuit constructed to attain this shown in FIG. 42. Comparison of the circuit shown in FIG. 42 with the circuit shown in FIG. 40 will reveal that they are similar in construction except that the comparator $COMP_7$ and the D-type flip-flop DFF of the latter are omitted in the former. A modified flow chart of operation of the microcomputer μC for controlling the circuit of FIG. 42 is shown in FIG. 43. In the flow chart of FIG. 43, the steps #507 and #508 of the flow chart of FIG. 41 are replaced respectively by a step #507' at which a predetermined time $I_2$ is counted and a step #508' at which it is checked whether or not output of the comparator $COMP_5$ is at the "H" level such that when output of the comparator $COMP_5$ is at the "H" level, the program may advance to step #515 but on the contrary when output of the comparator $COMP_5$ is at the "L" level, the program may advance to step #512. Meanwhile, the steps #509 to #511 of FIG. 41 are omitted. The remaining steps of operation are same as those of the flow chart of FIG. 41.

It is to be noted that while the two modifications shown in FIGS. 40 to 43 make use of change-over of the driving speed of the motor only for winding of a film, they may naturally be used for initial winding or rewinding of a film.

A following embodiment of motor controlling system of the present invention is constituted such that the rotational frequency or speed of a motor is monitored so that when an optimum rotational frequency for intended change-over of the speed of the motor is detected, the motor is changed over from a low speed high torque rotational condition to a high speed low torque rotational condition or vice versa. Such detection of the optimum rotational frequency to change over the driving speed of the motor is advantageous in that it will substantially normally assure efficient change-over of the speed of the motor because the cross point between the straight lines (T-N)α, (T-N)βin FIG. 2 is experimentally substantially constant with respect to the rotational frequency or speed of the motor even if the capacity of a battery varies.

Figure 44:
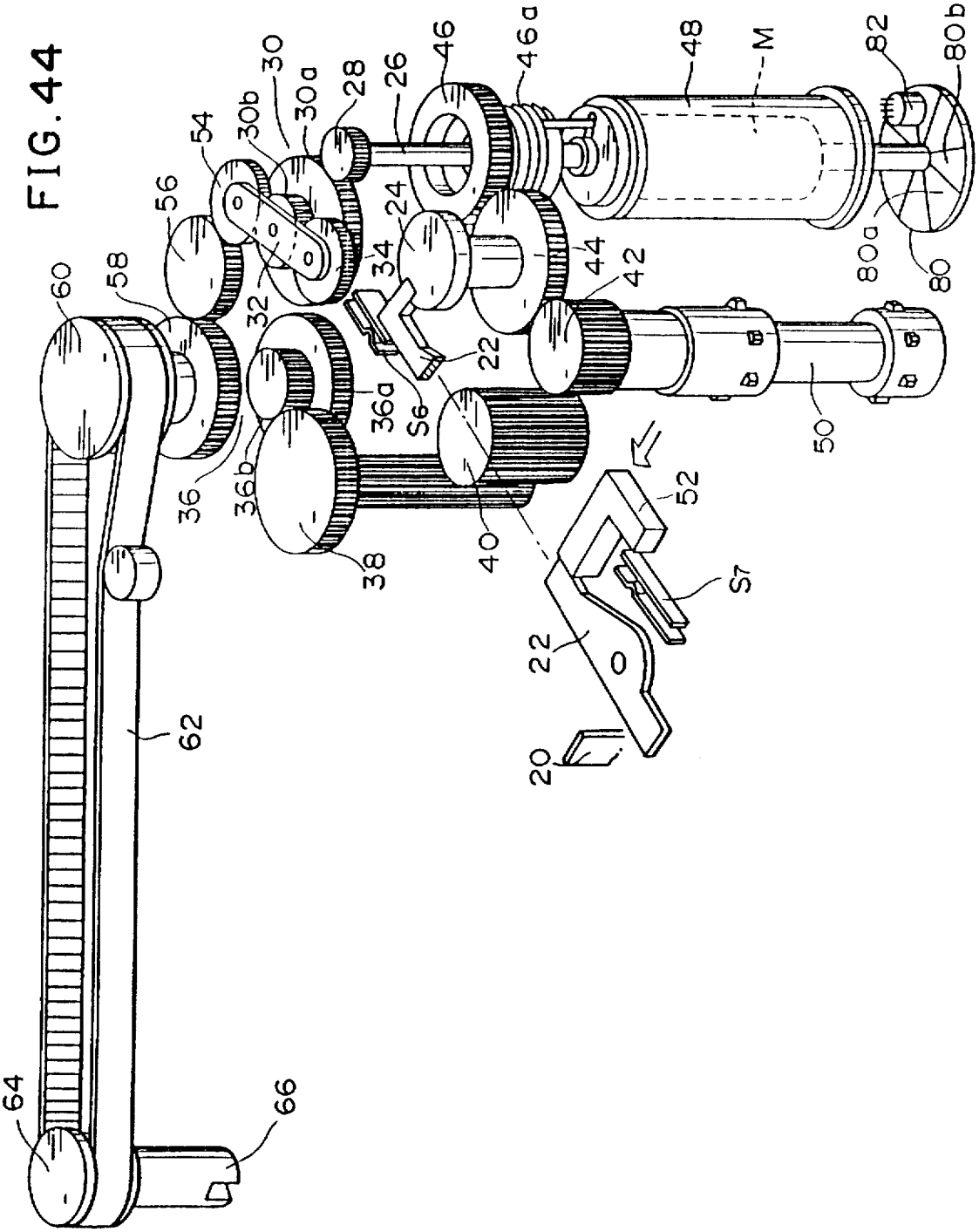
FIG. 44 is a perspective view of a film winding and rewinding mechanism of a camera showing a second embodiment of motor controlling system of the invention.

In the embodiment shown in FIG. 44, an encoder disk 80 is mounted on a motor shaft 26 of such a motor M as shown in FIG. 21 which is used for winding and rewinding of a film, and a reflective photocoupler 82 is located in an opposing relationship to the encoder disk 80. A pattern of alternate reflecting portions 80a and non-reflecting portions 80b is formed on the encoder disk 80, and the photocoupler 82 converts reflected light from the pattern of the seconder disk 80 into an electric signal which is transmitted to a microcomputer μC in order to monitor the rotational frequency of the motor M.

Figure 45:
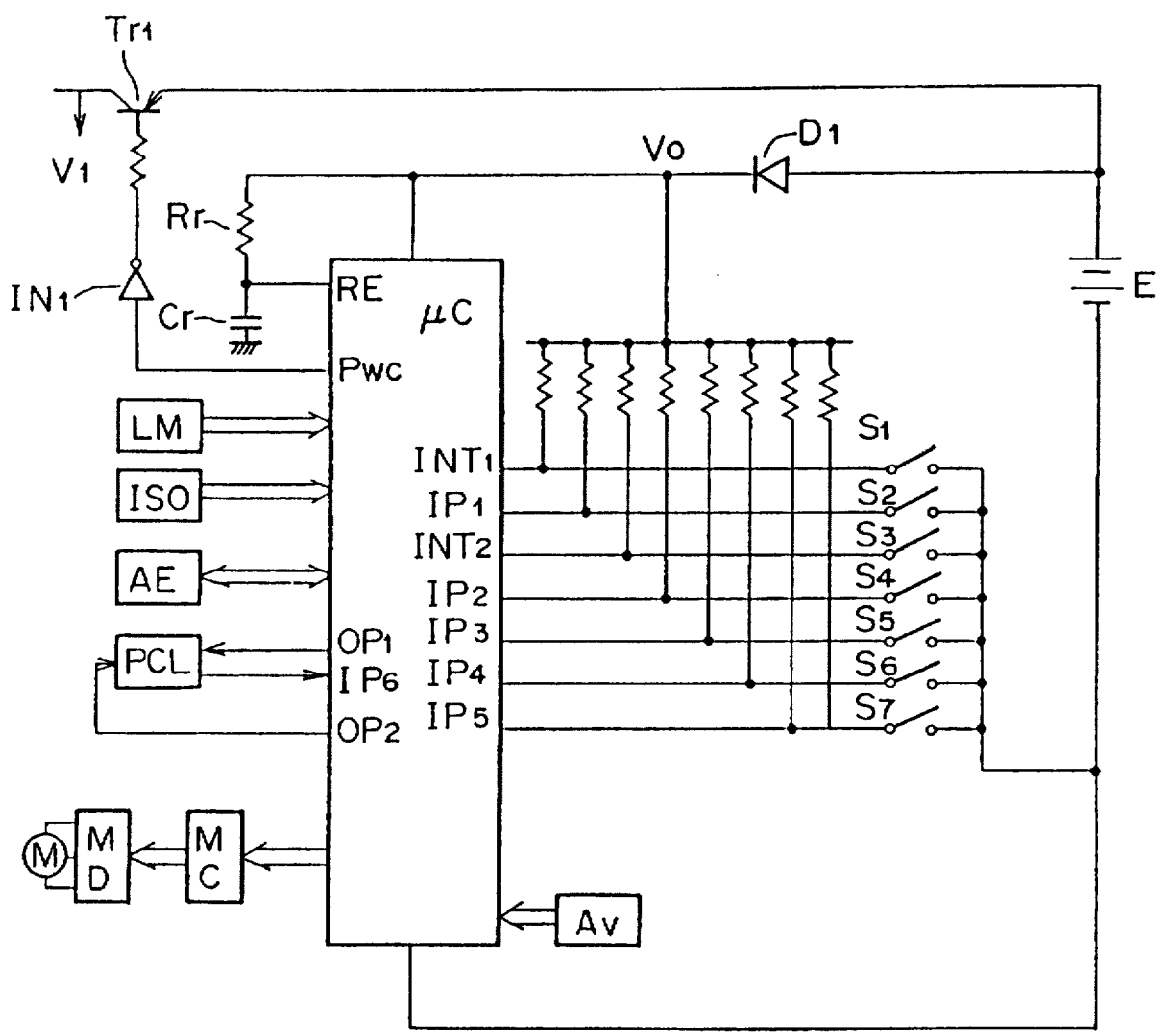
FIG. 45 is a block diagram showing an electric circuit of the motor controlling system of FIG. 44.

An electric circuit of the motor controlling system of the embodiment of FIG. 44 is shown in FIG. 45. Referring to FIG. 45, the circuit shown is only different from the circuit of FIG. 23 in that the battery checking circuit BC of the latter is replaced by a photocoupler circuit PCL. However, the program of the microcomputer μC is modified such that a predetermined interrupt routine is executed in response to a signal when the photocoupler PCL receives light reflected from any of the reflecting portions 80a of the pattern of the encoder disk 80. As to flow charts indicating operation of the microcomputer μC, those of the winding subroutine shown in FIG. 30 and the motor control II subroutine for rewinding shown in FIG. 34 are modified and the interrupt routine mentioned above is additionally provided. Further, the step #16 of FIG. 24 is omitted and a step for setting an auto flag AUTOF is inserted in place.

Figure 46:
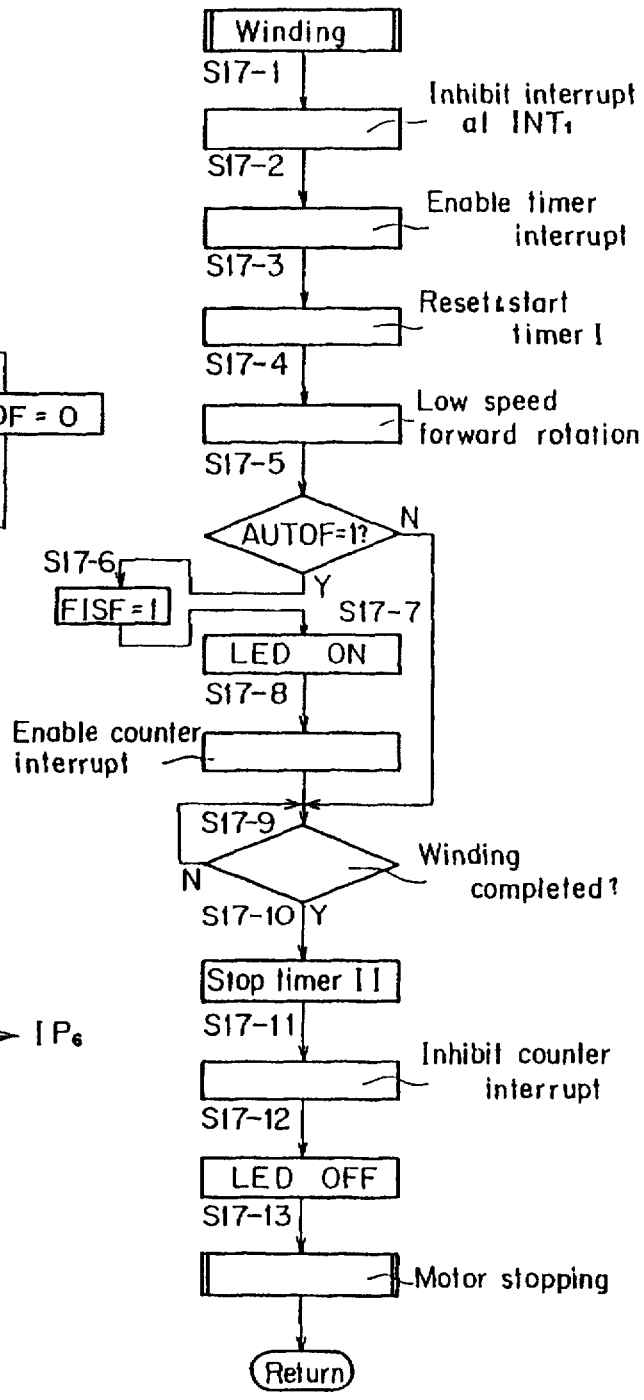
FIG. 46 is a flow chart illustrating a modified winding subroutine of operation of the electric circuit of FIG. 45.

A modified winding subroutine is shown in FIG. 46. Referring to FIG. 46, the microcomputer μC first inhibits interruption at an interrupt terminal $INT_1$ thereof at step S17-1, and then enables, at step S17-2, timer interrupt for detecting a taut condition of a film. Subsequently at step S17-3, the timer I is reset and started, and then at step S17-4, the microcomputer μC delivers data for controlling the motor to rotate in the forward direction at a low speed with a high torque. The steps mentioned just above are quite same as the steps #17-1 to #17-4 of FIG. 30.

Subsequently at step S17-5, the microcomputer μC determines whether the auto flag AUTOF for automatically changing over the rotational frequency of the motor is in the set state or not, and where it is in the set state, a flag FISF for ignoring reading of a timer II for the first time when the rotational frequency of the motor is to be detected is set at step S17-6, and then a signal for turning on a light emitting diode LED of the photocoupler circuit PCL is delivered to the photocoupler circuit PCL at step S17-7. Upon reception of the signal, the photocoupler circuit PCL causes the light emitting diode LED of the photocoupler to be lit. The microcomputer μC then enables counter interrupt at step S17-8.

Here, when light emitted from the light emitting diode LED and reflected from a reflecting portion 80a of the encoder disk 80 is received by a light receiving element of photocoupler, the photocoupler circuit PCL delivers to the microcomputer μC a signal which changes from an "H" level to an "L" level. Upon reception of such a signal changing from the "H" level to the "L" level from the photocoupler circuit PCL, the counter interrupt which will be hereinafter described occurs at the microcomputer μC to detect the rotational frequency of the motor M. The photocoupler circuit PCL produces a signal of the "H" level if the amount of incident light to the receiving element decreases below a predetermined level. Accordingly, each time a point on the encoder disk 80 at which it receives light emitted from the light emitting diode of the photocoupler moves from a non-reflecting portion 80b to a reflecting portion 80a of the encoder disk 80, the counter interrupt routine is executed in order to detect the rotational frequency (rotational speed) of the motor M.

Subsequently, the microcomputer μC waits at step S17-9 until winding of the film by one frame is completed whereupon the switch S6 is turned off. It is to be noted that where the auto flag AUTOF for automatically changing over the rotational speed of the motor M is not in the set state at step S17-5, the steps S17-6 to S17-8 are skipped and accordingly the program advances directly to step S17-9.

When completion of the winding of the film is detected at step S17-9, the program advances to step S17-10 at which the timer II is stopped, and then to step S17-11 at which counter interrupt is inhibited. Then at step S17-12, the light emitting diode LED of the photocoupler circuit PCL is turned off, and then at step S17-13, the motor stopping subroutine as illustrated in FIG. 32 is executed, whereafter the program returns to the initial routine from which the initial subroutine of FIG. 46 is entered.

Figure 47:
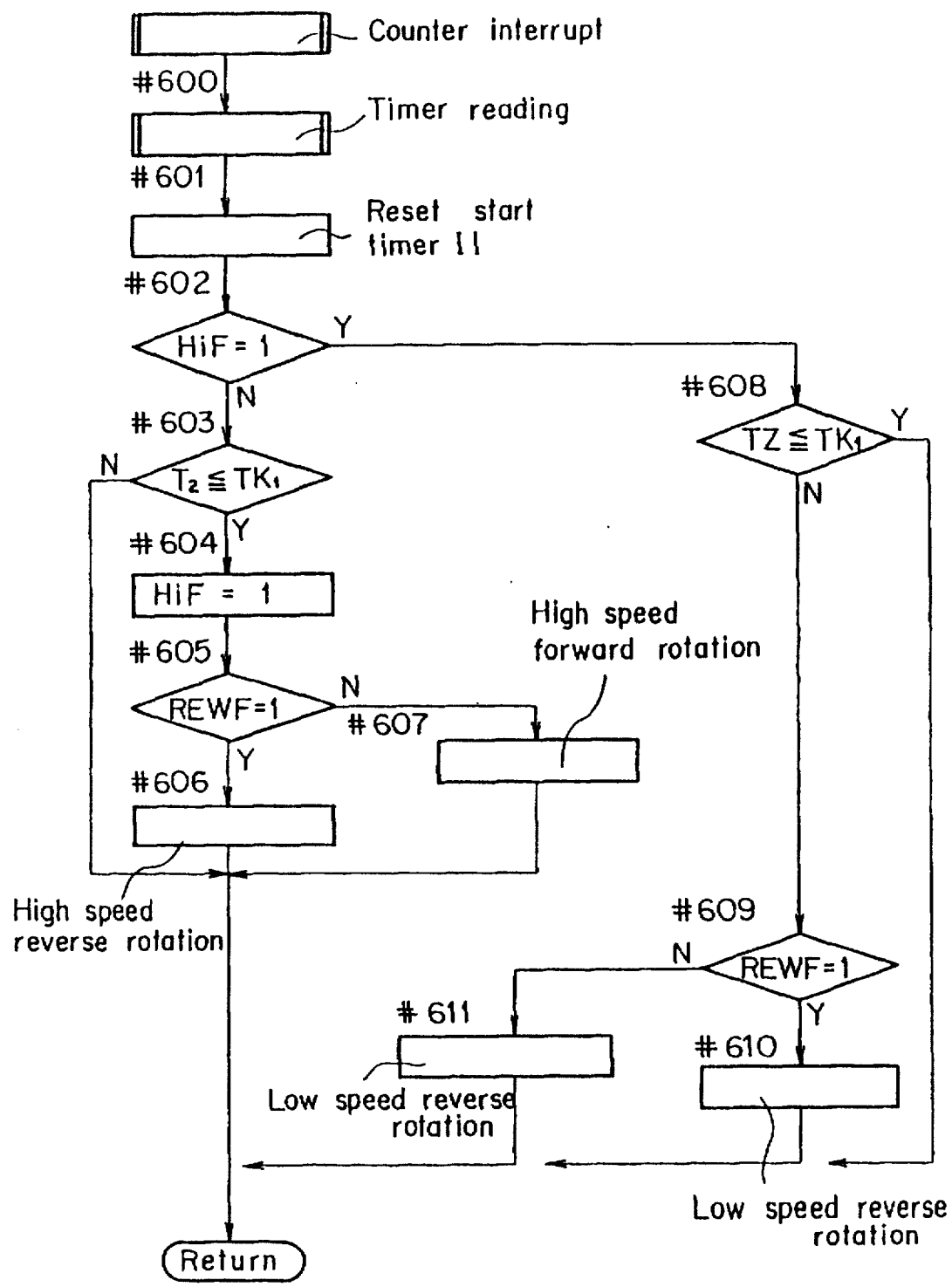
FIG. 47 is a flow chart illustrating a counter interrupt subroutine.

NOW, the counter interrupt routine which is entered in response to a signal from the photocoupler circuit PCL will be described with reference to a flow chart of FIG. 47. Here, detection of the rotational frequency of the motor M in the present embodiment is effected by reading a time required for rotation of the motor M by a predetermined angle.

Figure 48:
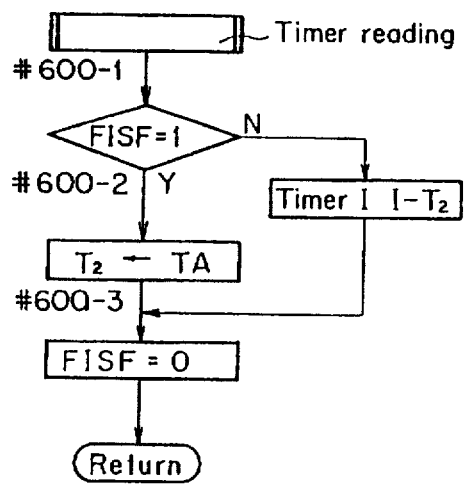
FIG. 48 is a flow chart illustrating a timer reading subroutine.

At first at step #600, the microcomputer μC executes a timer reading subroutine which is illustrated in FIG. 48. Referring to FIG. 48, the microcomputer μC determines at first at step #600-1 whether or not the flag FISF for ignoring reading of the timer for the first time is in the set state, and if the flag FISF is in the set state, a predetermined value TA is set to a timer register T2 at step #600-2. Here, TA>TK1, and accordingly the rotational frequency of the motor M is inhibited from being changed over from a low speed high torque rotational condition to a high speed low torque rotational condition. This is because, due to the fact that the initial position of the encoder disk 80 relative to the photocoupler 82 is not fixed and cannot be foreseen, the angle (distance) over which the motor M has rotated by a point of time at which the timer is read for the first time is not, in most cases, equal to one complete cycle of rotation of the motor and accordingly, if a rotational frequency of the motor is calculated from a value thus read for the first time from the timer, perhaps it will be different from an actual rotational speed of the motor M. Therefore, the step #600-2 is provided in order to prevent the motor M from being changed over in error from the high speed low torque rotational conditions to the low speed high torque rotational condition in response to a detected rotational speed where the detected rotational speed may possibly be different from an actual rotational speed. Then at step #600-3, the flag FISF is reset to "0" and then the program returns to the initial routine of FIG. 47. On the other hand, in case the flag FISF is not in the set state at step #600-1, the program advances to step #600-4 at which a counted value of the timer II operation of which was started upon the preceding execution of the counter interrupt routine is stored into the timer register T2, whereafter the program returns to the initial routine of FIG. 47.

Referring back to FIG. 47, after return from the subroutine of FIG. 48, the timer II for detecting a rotational speed of the motor M is reset and started at step #601, and then at step #602, the microcomputer μC determines whether a flag HiF for controlling the motor M to rotate in a high speed low torque rotational condition is in the set state or not. Here, if the flag HiF is not in the set state, that is, if the motor is rotating in a low speed high torque rotational condition, then the program advances to step #603 at which it is determined whether or not the interval of time T2 which was read at step #600-4 of FIG. 48 and after lapse of which subsequent counter interrupt is to occur is equal to or smaller than the predetermined time TK1.

Here, in case the read time T2 is equal to or smaller than the predetermined time T1, the microcomputer μC determines that the actual rotational speed of the motor is higher than a predetermined level (a rotational speed corresponding to a rotational frequency at a cross point between the straight lines (T-N)α and (T-N)β shown in FIG. 2) and thus changes over the controlling condition of the motor M to the high speed low torque rotational condition. More in detail, at first at step #604, the flag HiF indicating the high speed low torque rotational condition is set to "1". Then, in order to determine the rotational direction of the motor M, it is determined at step #605 whether or not a rewinding flag REWF indicating a film rewinding condition is in the set state, and where the rewinding flag REWF is in the set state, the program advances to step #606 at which the motor M is caused to rotate at a high speed in the reverse direction, but on the contrary where the rewinding flag REWF is not in the set state, the program advances otherwise to step #607 at which the motor M is controlled to rotate at a high speed in the forward direction. After the step #606 or #607, the program returns to the original routine from which the counter interrupt routine was entered.

Meanwhile, where the time TK2 read at step #600-4 of FIG. 48 is greater than the predetermined time TK1 at step #603, the program returns to the same original routine without changing over the speed of the motor M because operation at a higher speed can be attained if the rotational speed of the motor M is not changed over.

On the other hand, where the flag HiF is already in the set state at step #602 and accordingly the motor M is already in the high speed low torque rotational condition, the program advances to step #608 at which it is determined whether or not the read time T2 is equal to or smaller than the predetermined time TK1. Then, if the read time T2 is equal to or smaller than the predetermined time TK1, then the program returns to the original routine without changing over the speed of the motor M because operation at a higher speed can be attained if the rotational speed of the motor M is not changed over.

On the contrary, if the read time T2 is greater than the predetermined time TK1 at step #608, the motor M is changed over to the low speed high torque rotational condition because operation at a higher speed can be attained by the low speed high torque rotation of the motor M. Thus, at step #609, it is determined whether or not the rewinding flag REWF is in the set ("1") state, and if the flag REWF is in the set state, then the motor M is controlled at step #610 to rotate in the reverse direction in a low speed high torque condition in order to wind the film, but on the contrary if the flag REWF is not in the set state at step #609, the program advances to step #611 at which the motor M is rotated in the forward direction in a low speed high torque condition, whereafter the program returns to the original routine.

Now, operation of the microcomputer μC when a film is to be rewound will be described with reference to a flow chart of FIG. 49.

Figure 49:
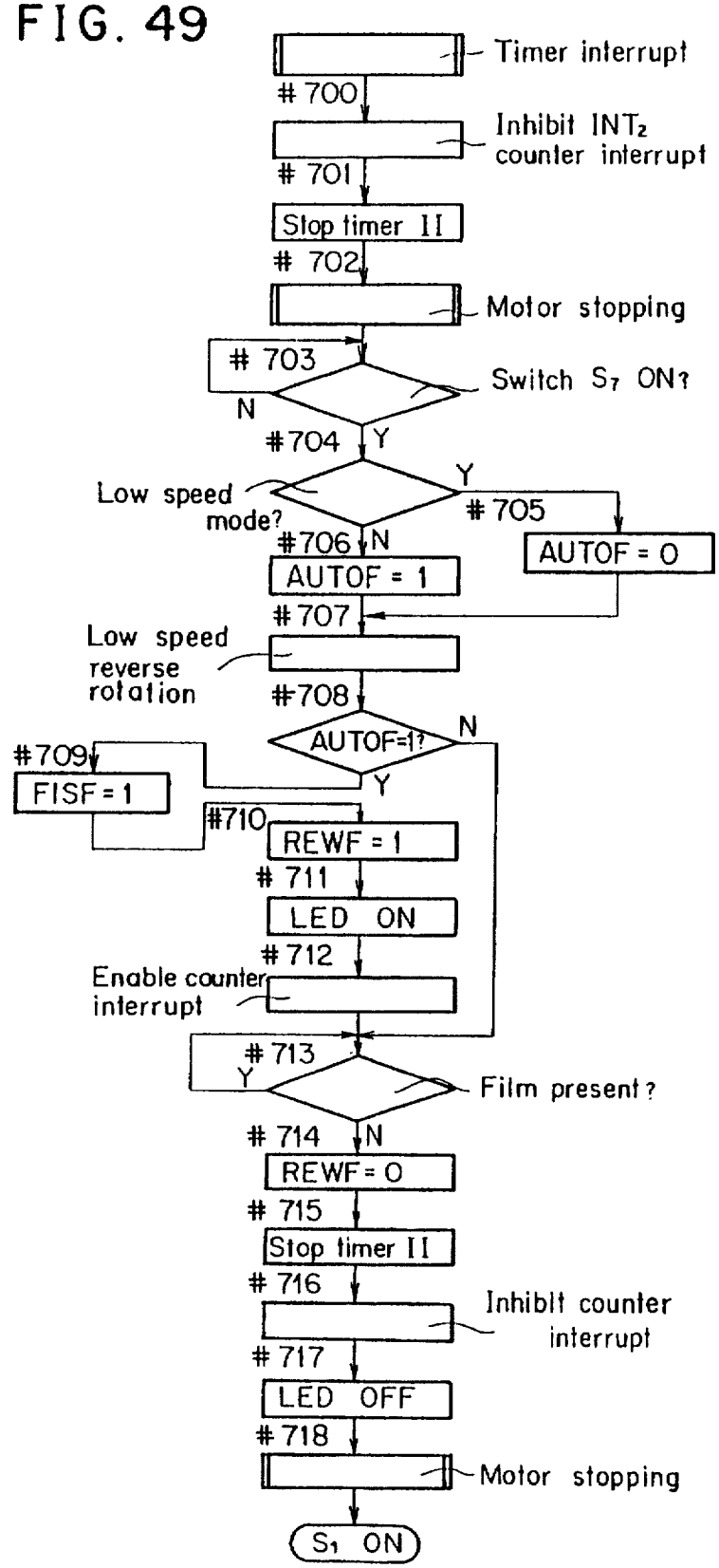
FIG. 49 is a flow chart illustrating a timer interrupt routine of operation of the electric circuit of FIG. 45.

When a predetermined value is reached by a counted value of a timer I which is counting the time during winding of a film, the microcomputer μC executes a timer interrupt subroutine illustrated in FIG. 49. After the subroutine of FIG. 49 is entered, the microcomputer μC first inhibits, at step #700, interrupt at the interrupt terminal INT₁ thereof and counter interrupt, and then at step #701, the timer II for such counter interrupt is stopped. Then at step #702, the microcomputer μC executes the motor stopping subroutine shown in FIG. 32, and then waits, at step #703, until the switch S₇ which is turned on in order to start rewinding of a film is turned on. Thus, upon turning on of the switch S₇ after completion of winding of the film, the microcomputer μC determines at step #704 whether or not the low speed high torque rotational condition is selected, and where it is already selected, the auto flag AUTOF is reset to "0" at step #705, but on the contrary where the low speed high torque rotational condition is not selected, the auto flag AUTOF is set to "1" at step #706. In either case the program then advances to step #707 at which the microcomputer μC delivers to the motor controlling circuit MC a control signal for rotating the motor M in the reverse direction (in the direction to rewind the film) in the low speed high torque condition.

Subsequently at step #708, the microcomputer μC determines whether or not the auto flag AUTOF is in the set ("1") state, and if it is not in the set state, the program jumps to step #713. To the contrary, if the auto flag AUTOF is in the set ("1") state, the program advances to step #709 at which the flag FISF for ignoring reading of the timer for the first time is set to "1", and then the rewinding flag REWF is set to "1" at step #710. Then at step #711, the microcomputer μC delivers a signal for turning on the light emitting diode LED of the photocoupler circuit PCL in order to cause the light emitting diode LED to emit light, whereafter the microcomputer μC enables counter interrupt at step #712.

Then at step #713, the microcomputer μC waits until the film rewinding operation is completed so that the film is entirely taken up into a film cartridge, whereafter the program advances to step #714 at which the rewinding flag REWF is reset to "0" and to step #715 at which counting of the timer II is stopped. Subsequently, the microcomputer μC inhibits counter interrupt at step #716, and then at step #717, delivers a signal for turning off the light emitting diode LED of the photocoupler circuit PCL to extinguish the same. Then at step #718, the microcomputer μC executes the motor stopping subroutine shown in FIG. 32, whereafter the program returns to step #7 of FIG. 24.

While here in the present modification the encoder disk and the photocoupler of the reflective type are used to detect the rotational speed of the motor M, they may be replaced by a pattern member having a conductive coded pattern thereon and a switch having a contact or contacts for slidably contacting with the coded pattern of the pattern member, respectively.

Figure 51:
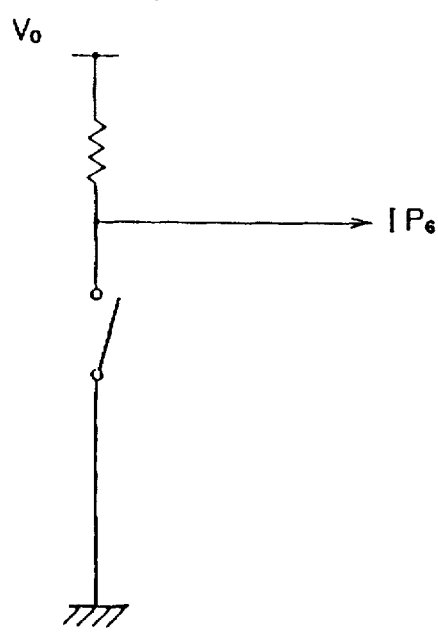
FIG. 51 is a circuit diagram showing an equivalent circuit of a rotational speed detecting device of the mechanism of FIG. 50.
Figure 50:
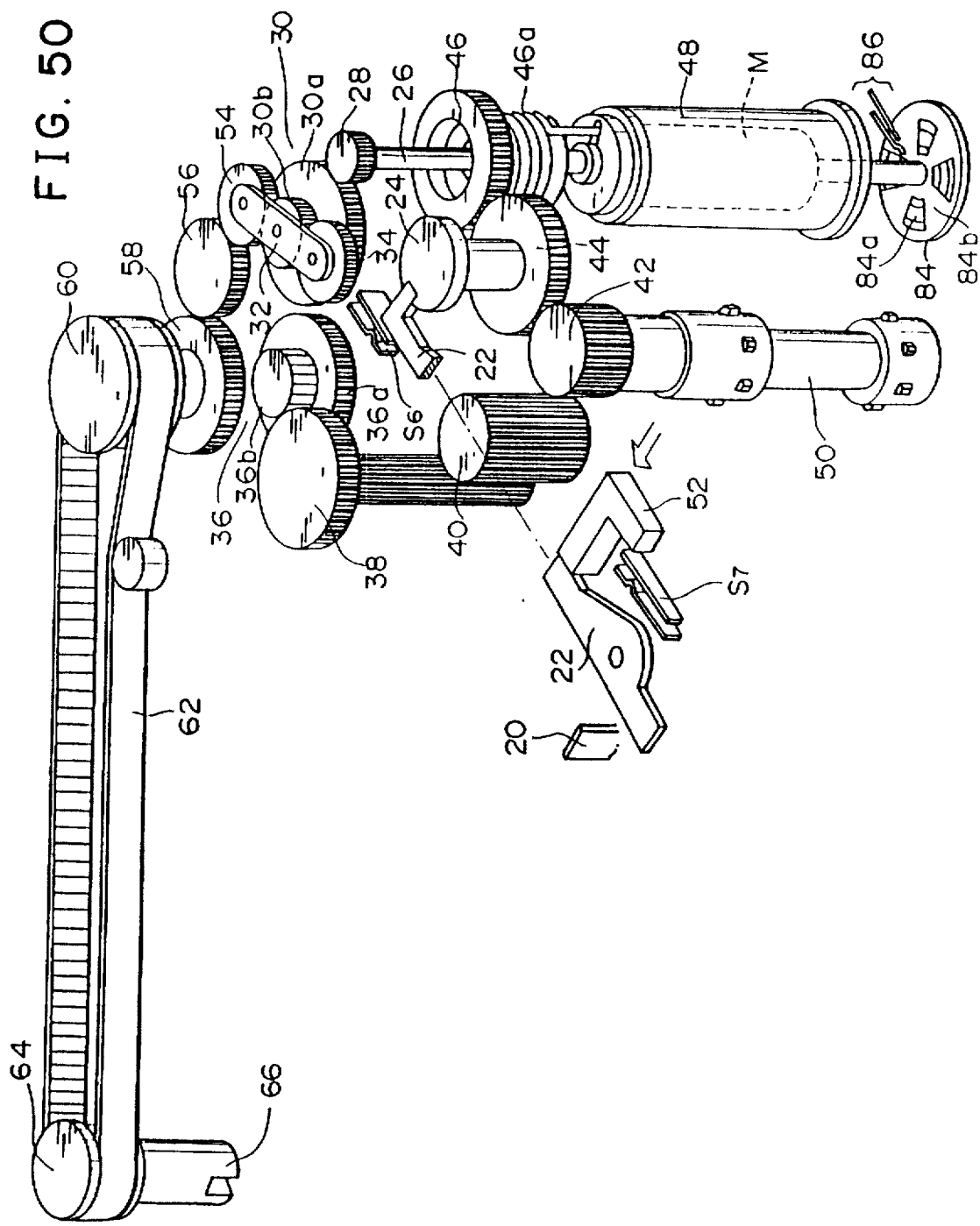
FIG. 50 is a perspective view of a film winding and rewinding mechanism of a camera showing a modification to the embodiment of FIG. 44.

An arrangement of a modified form of the construction just described is shown in FIG. 50. Referring to FIG. 50, a pattern disk 84 is securely mounted on a motor shaft 26 of a motor M and has two concentrical separate conductive patterns each having conductive portions 84a and non-conductive portions 84b arranged in an alternate relationship therein. A pair of contacts 86 are mounted for slidably contacting with the individual coded patterns on the pattern disk 84. An equivalent circuit of the detecting device having such a construction as described above for detecting the rotational frequency of the motor is illustrated in FIG. 51. As will be appreciated from FIG. 51, the microcomputer μC receives at an input terminal IP₆ thereof a signal changing from an "H" level to an "L" level each time the contacts 86 are brought into contact with any of the conductive portions 84a of the coded patterns on the pattern disk 84. Accordingly, the microcomputer μC may use such a signal in place of a signal from the photocoupler circuit PCL.

Thus, where the rotational speed of the motor M is detected to successively and automatically change over the motor M between the high speed low torque rotational condition and the low speed high torque rotational condition in this manner, high speed operation is assured even if the torque of the motor M fluctuates while winding or rewinding of a film or energizing of the shutter is to be performed, and even if the capacity of the power source battery decreases, the number of times at which winding or rewinding of a film or energizing of the shutter can be performed can be increased by selection of the low speed high torque rotational condition in which power consumption is low.

Figure 53:
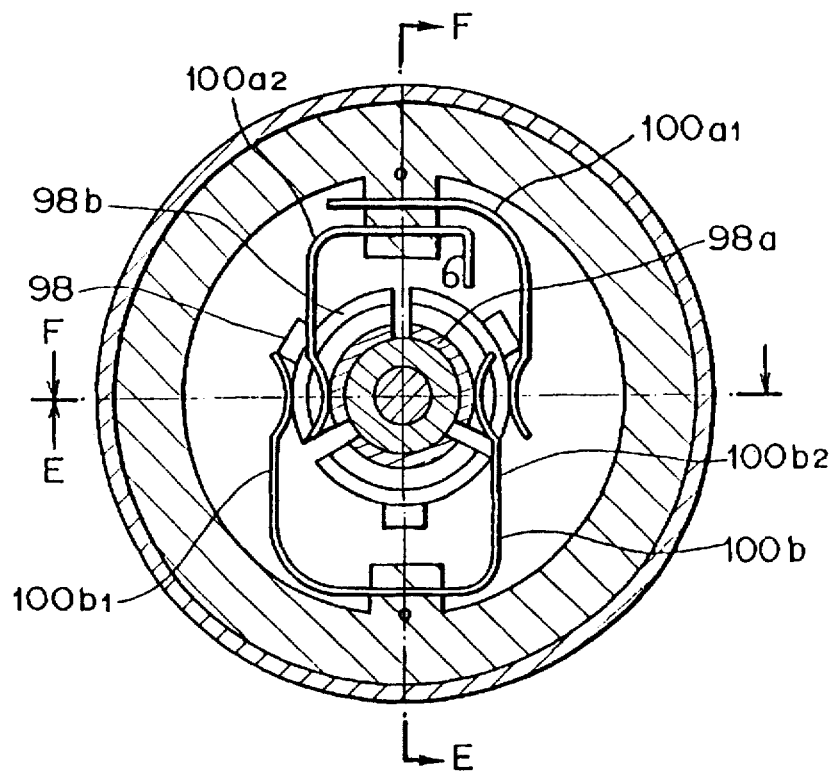
FIG. 53 is a transverse sectional view of a dc motor which is used to drive the film winding and rewinding mechanism of FIG. 52.
Figure 54:
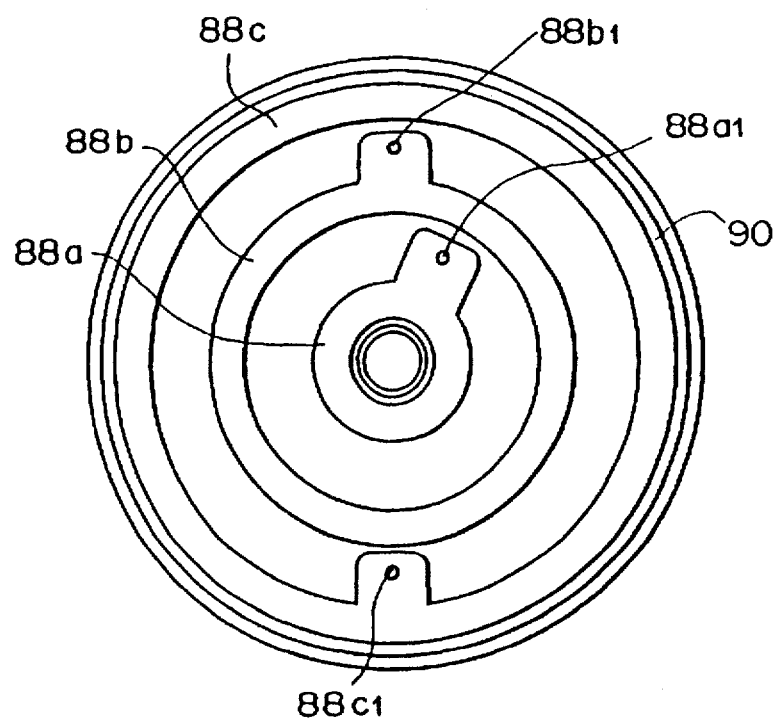
FIG. 54 is a bottom plan view of the motor of FIG. 53.
Figure 55:
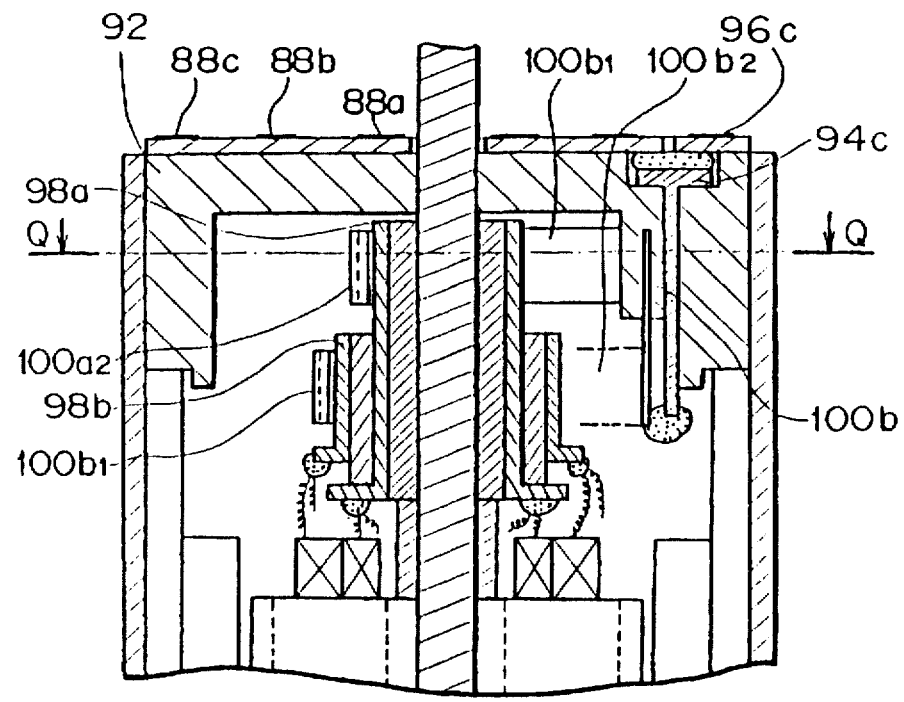
FIG. 55 is a longitudinal sectional view taken along line E-P-E of FIG. 53.

FIGS. 52 to 57 show a further embodiment of motor controlling system of the present invention wherein it is applied to a film winding and rewinding mechanism of a camera. In the present embodiment, a body of a motor which is used for winding of a film is located within a chamber of a spool such that a motor cylinder is rotated together with the spool. FIG. 52 is a perspective view of the film winding and rewinding mechanism. FIG. 53 is a transverse sectional view of the spool and corresponds to a transverse sectional view taken along line Q-Q of FIG. 55, FIG. 54 is a bottom plan view of the spool of FIG. 53, FIG. 55 a partial longitudinal sectional view taken along line E-P-E of FIG. 53, FIG. 56 a partial longitudinal sectional view taken along line F-P-F of FIG. 53, and FIG. 57 a partial fragmentary perspective view of the spool of FIG. 53 as viewed from the bottom side.

Referring to FIG. 52, a spool 48 is formed as an integral member with an outer cylinder of the motor M and has a conductive pattern 88 formed on a bottom face thereof. Three contacts 86a, 86b, 86c are located in a concentrical relationship around a motor shaft 26 on a stationary member for slidably contacting with the conductive pattern 88 on the spool 48.

As shown in FIG. 52, an electric base plate 90 is mounted on a holder 92 which forms a lower wall of the motor M, and three concentrical conductive coded patterns 88a, 88b, 88c are formed on a lower face of the electric base plate 90. The three contacts 86a, 86b, 86c are located particularly for slidably contacting with the conductive coded patterns 88a, 88b, 88c, respectively. Thus, power is supplied to the motor via the conductive coded patterns 88a, 88b, 88c. As seen from the bottom plan view of the electric base plate 90 and hence of the spool 48 of FIG. 54, through-holes 88a, 88b₁, 88c₁ are formed through the conductive coded patterns 88a, 88b, 88c, respectively. Meanwhile, as seen from FIG. 57, three perforations 92a, 92b, 92c are formed in the holder 92, and metal shafts 94a, 94b, 94c are fitted in the perforations 92a, 92b, 92c, respectively.

Figure 56:
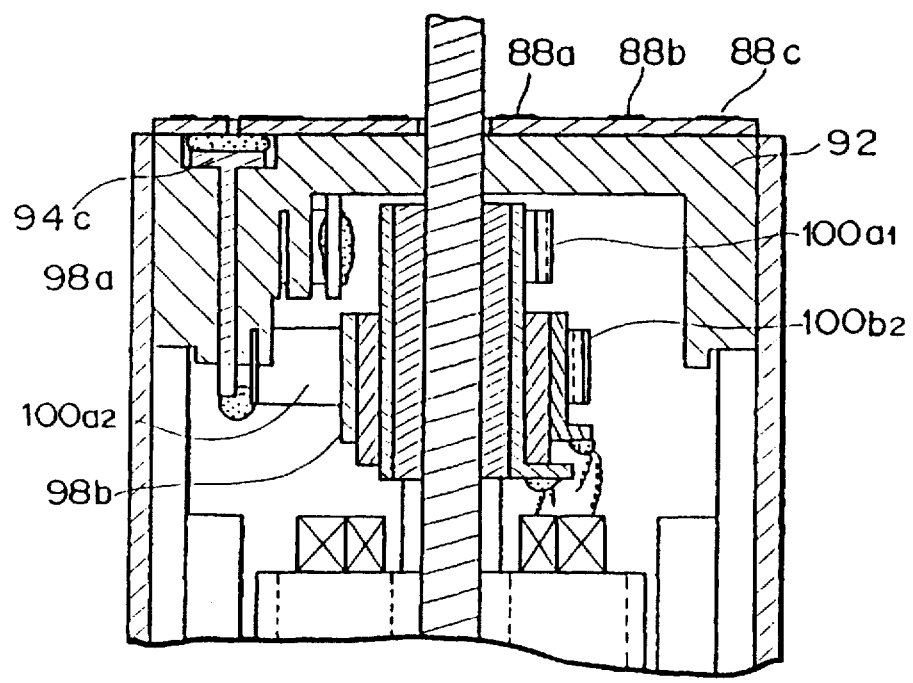
FIG. 56 is a longitudinal sectional view taken along line F-P-F of FIG. 53.
Figure 57:
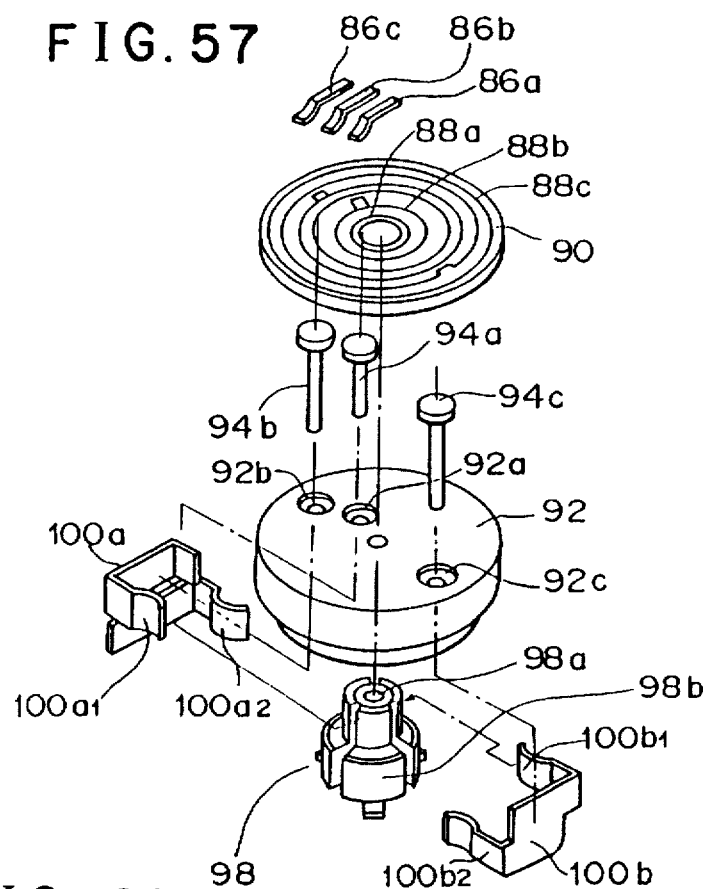
FIG. 57 is a fragmentary perspective view of part of the motor of FIG. 53 as viewed from the bottom side.

The conductive coded patterns 88a, 88b, 88c and conductive coded patterns 96a, 96b, 96c (only the conductive coded pattern 96c is shown in FIG. 55) formed on a reverse face of the electric base plate 90 are electrically connected to each other via the through-holes 88a₁, 88b₁, 88c₁ of the conductive coded patterns 88a, 88b, 88c, respectively. As shown in FIGS. 55 and 56, head portions of the metal shafts 94a, 94b, 94c are soldered to the conductive coded patterns 96a, 96b, 96c on the reverse face of the electric base plate 90. Accordingly, power supplied from the contacts 86a, 86b, 86c is transmitted to the metal shafts 94a, 94b, 94c, respectively.

A commutator 98 of the motor M includes integrally rotatable portions 98a and 98b. A pair of brushes 100a, 100b are secured to the holder 92 for contacting with the portions 98a, 98b of the rotating commutator 98, respectively. Each of the brushes 100a, 100b has a contact $100a_1$ or $100b_1$ for engagement with the portion 98a of the commutator 98 and another contact $100a_2$ or $100b_2$ for engagement with the lower portion 98b of the commutator 98, respectively. Further, foot portions of the metal shafts 94a, 94b are soldered to the brush 100a while the remaining metal shaft 94c is soldered to the brush 100b. Accordingly, power is supplied to the commutator 98 of the motor M via the brushes 100a, 100b.

It is to be noted that the motor may otherwise be of a different type wherein a brush and a commutator are arranged at axially opposite positions of the motor. In such a case, two electric base plates each having double concentrical patterns thereon may be arranged at such axially opposite positions of the motor.

Further, while in the embodiment described just above the brushes $100b_1$, $100b_2$ corresponding to a center tap are formed in an integral relationship, they may otherwise be formed as separate members while quadruple concentrical patterns may be provided on the base plate.

It will be appreciated here that the motor controlling systems of the first to third embodiments and possible modifications and variations of the same described above can be applied in any combination to the dc motors of the first to seventh embodiments and possible variations and modifications of the same described above.

Figure 61:
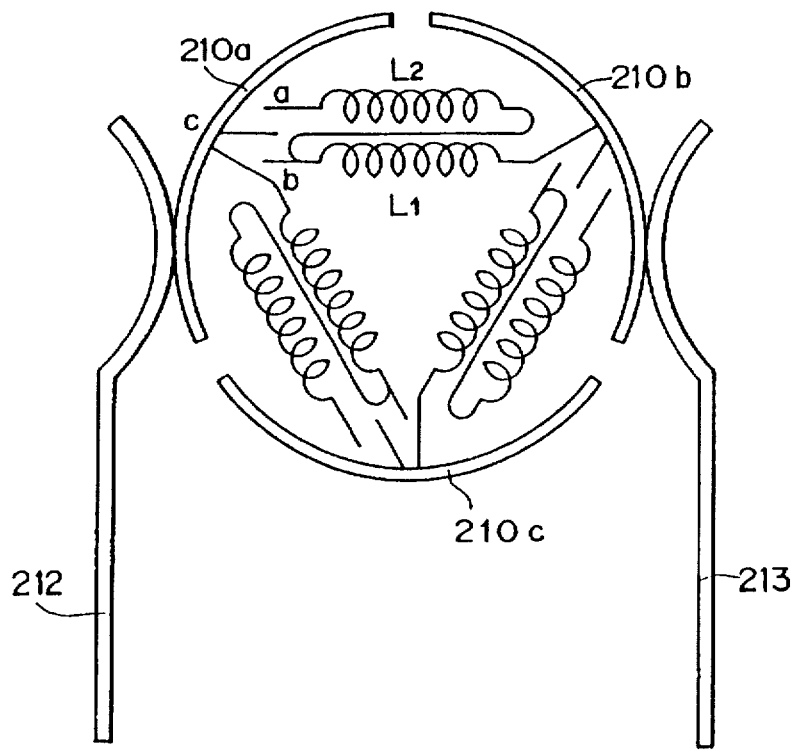
FIG. 61 is a diagrammatic representation illustrating electric connection of the motor of FIG. 58.
Figure 58:
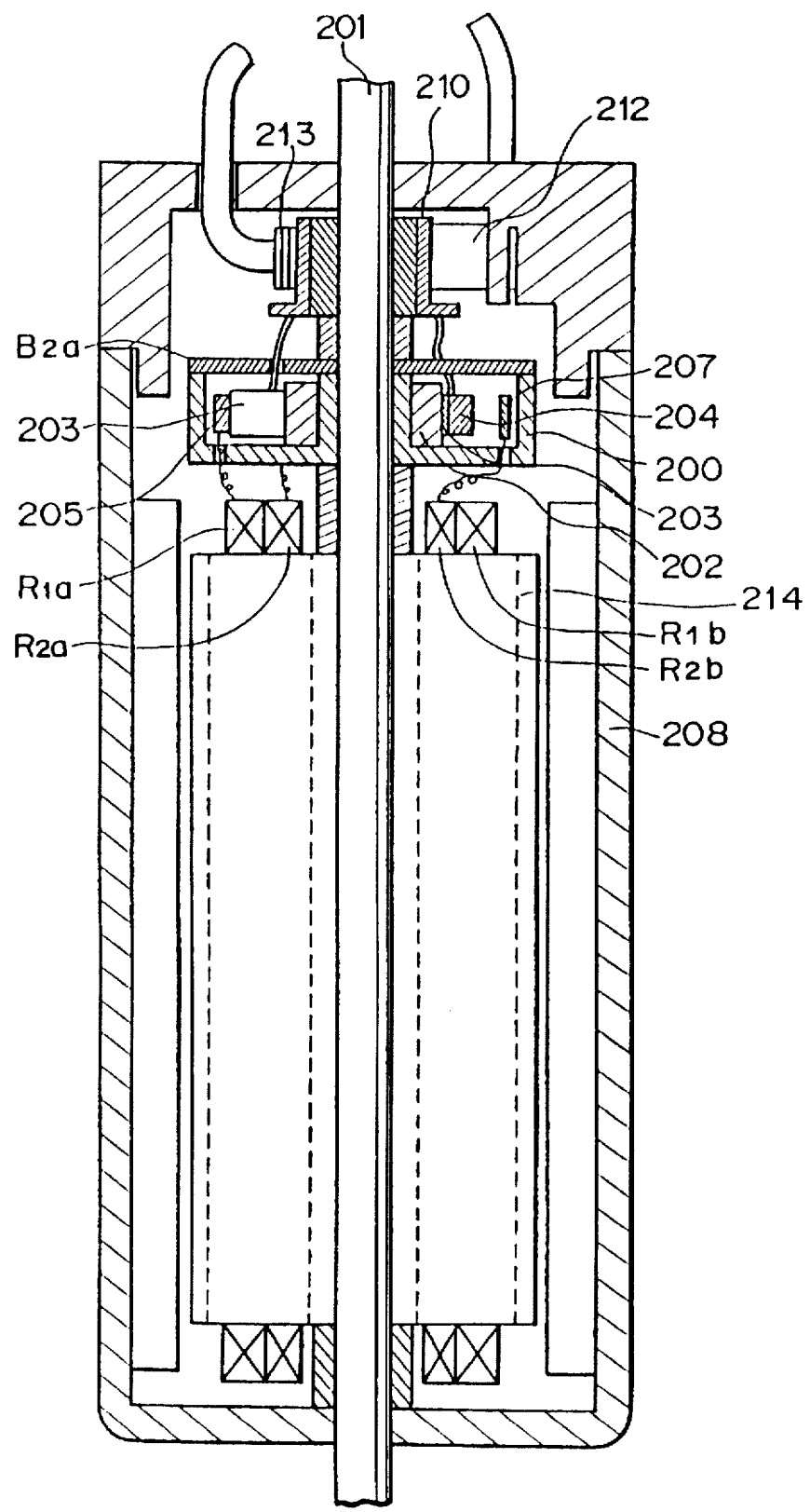
FIG. 58 is a longitudinal sectional view of a dc motor showing a fourth embodiment of motor controlling system of the invention.
Figure 59:
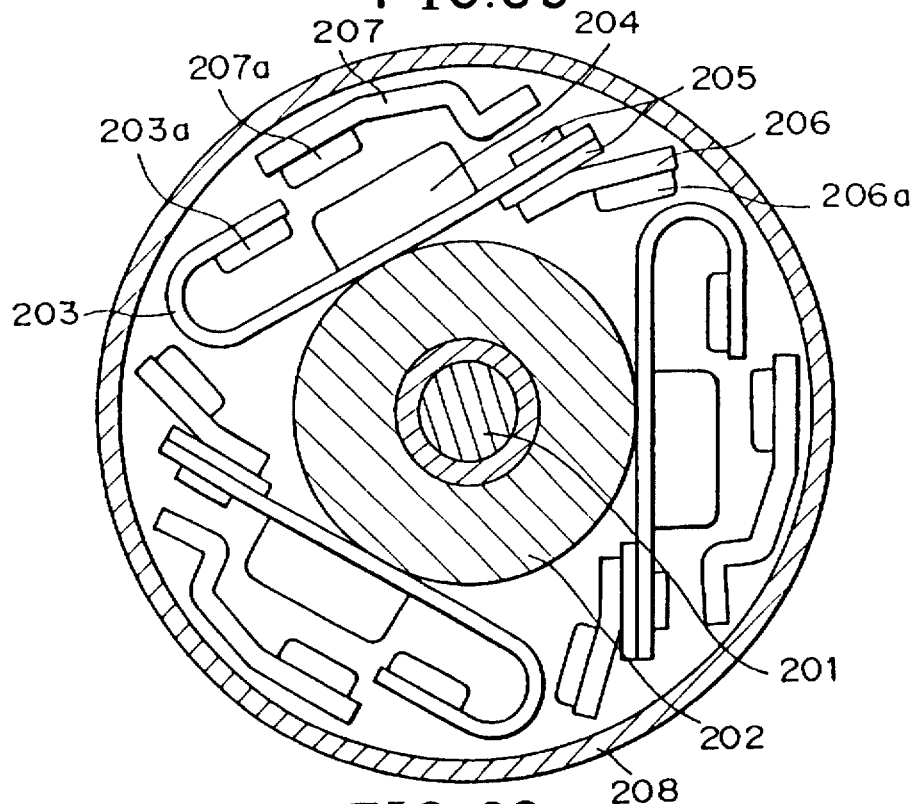
FIG. 59 is a transverse sectional view of the motor of FIG. 58 showing a centrifugal switch at a normal inoperative position.
Figure 60:
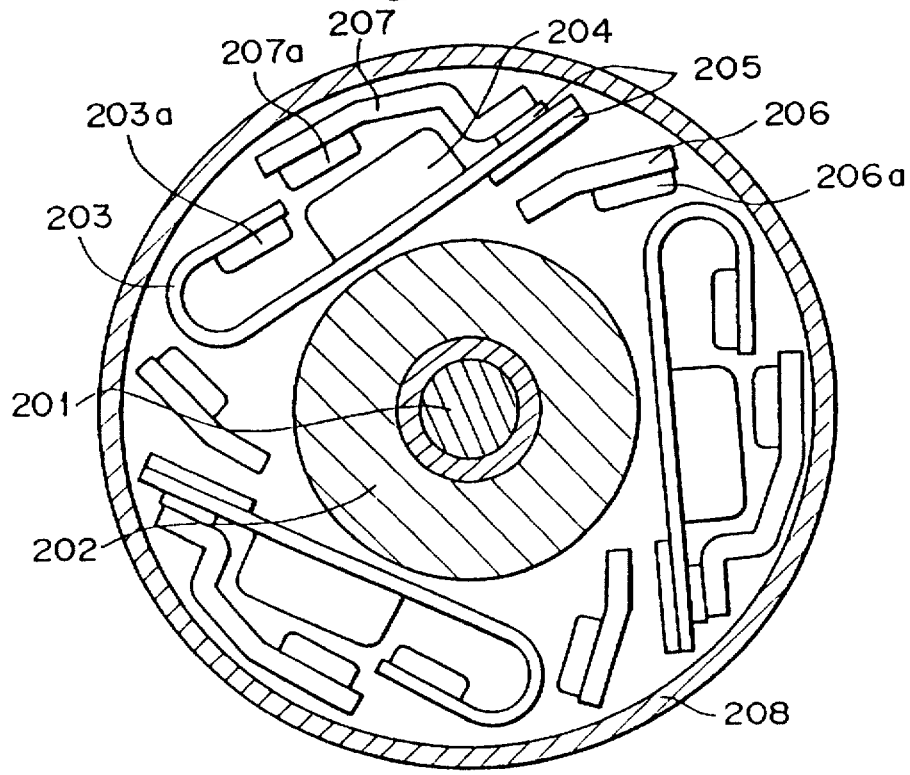
FIG. 60 is a similar view but showing the centrifugal switch at an actuated operative position.

FIGS. 58 to 61 show a still further embodiment of motor controlling system of the present invention. FIG. 58 is a longitudinal sectional view of a dc motor in which a motor controlling system of the invention is incorporated, FIGS. 59 and 60 are transverse sectional views showing a centrifugal switch in different positions, and FIG. 61 is a diagrammatic representation showing electric connection of the motor of FIG. 58.

Referring to FIG. 58, the motor shown is similar to the motor of FIG. 13 but includes a centrifugal switch generally denoted at 200 in place of the commutator 14 and the associated brushes of FIG. 13. Thus, the centrifugal switch 200 is located between an iron core 214 and a commutator 210 on a rotary motor shaft 201.

Referring now to FIGS. 59 and 60, the centrifugal switch 200 includes a centrifugal switch body 208 which is secured to the rotary motor shaft 201 and accordingly is rotated together with a rotor of the motor. An annular permanent magnet 202 is located around the center of the centrifugal switch 200.

The centrifugal switch 200 includes three centrifugal switch contacts 203 each secured to the switch body 208 by means of a fastening screw 203a and connected to a commutator element 210a, 210b or 210c as indicated at a point C in FIG. 61. Another switch contact 206 is secured similarly to the switch body 208 by means of a fastening screw 206a and connected to a terminal as indicated at a point a in FIG. 61. A further switch contact 207 is secured similar to the switch body 208 by means of a fastening screw 207a and connected to a terminal as indicated at a point b in FIG. 61.

The centrifugal switch contact 203 has at an end thereof a contact member 205 for contacting with the switch contact 206 or 207 to selectively connect the terminal (a, b of FIG. 61) to the commutator 210. The switch contact 203 further has a weight member 204 for centrifugally moving the switch contact 203 effectively in a radially outward direction. The weight member 204 has a property of being attracted by the annular permanent magnet 202 and may naturally be a permanent magnet itself. Thus, the centrifugal switch contact 203 has the contact member 205 thereon normally pressed against the switch contact 206 by a spring force of the switch contact 203 itself and also by an attracting force between the weight member 204 and the annular permanent magnet 202.

Now, operation of the centrifugal switch will be described.

While the rotational frequency and hence the rotational speed of the centrifugal switch body 208 are sufficiently low, the centrifugal force acting on the weight member 204 is smaller than the sum total of the spring force of the centrifugal switch contact 203 and the attracting force acting between the annular permanent magnet 202 and the weight member 204 so that the contact member 205 is contacted with and electrically connected to the switch contact 206 as seen in FIG. 59. In this instance, the terminal a of FIG. 61 is connected to the commutator terminal c so that electric current flows from a brush 212 through the commutator element 210a, a coil $L_2$, another coil $L_1$, and the commutator 201b to another brush 213.

Meanwhile, if the rotational speed of the centrifugal switch body 208 rises until the centrifugal force acting on the weight member 204 becomes greater than a resultant force of the spring force of the centrifugal switch contact 203 and the attracting force acting between the annular permanent magnet 202 and the weight member 204, then the contact member 205 of the centrifugal switch contact 203 is moved out of contact with the contact member 206. At this instant, the commutator terminal c is at a neutral position from both of the terminal a and the terminal b as seen from FIG. 61 so that electric current does not flow through the coils $L_1$ and $L_2$. Consequently, the rotational speed of the motor tends to drop. However, since the weight member 204 is spaced away from the annular permanent magnet 202, the attracting force acting therebetween now is very small while the centrifugal force acting on the weight member 204 is great comparing with the spring force of the centrifugal switch contact 203. Consequently, the contact member 205 now becomes contacted with and electrically connected to the switch contact 207 (refer to FIG. 59). In this instance, the commutator terminal c of FIG. 61 is connected to the terminal b so that electric current flows from the brush 212 through the commutator element 210a and then only through the coil $L_1$ and through the commutator element 201b to the brush 213. As a result, the motor is further accelerated until a predetermined high speed is reached, and accordingly the contact member 205 of the centrifugal switch contact 203 will not be brought out of contact with the switch contact 207.

If the rotational speed of the motor drops due to increase of a load applied to the motor or by some other reason until the spring force of the centrifugal switch contact 203 becomes relatively greater than the centrifugal force acting on the switch member 204, the contact member 205 will be moved away from the switch contact 207. At this instant, no electric current flows through the coils $L_1$, $L_2$, which will further drop the rotational speed of the motor. Finally, the annular permanent magnet 202 and the weight member 204 are contacted with each other, restoring the initial condition as seen in FIG. 59. Consequently, electric current flows again through the coils $L_1$, $L_2$ to drive the motor.

A driving circuit where the centrifugal switch described above is employed may be a well known motor driving circuit of the bridge type such as, for example, a modification to the motor driving circuit of FIG. 31 wherein the transistors $Tr_8$ and $Tr_9$ are omitted.

FIGS. 62 to 67 show a fifth embodiment of motor controlling system of the present invention. In the present embodiment, a modified centrifugal switch is incorporated in a motor to which the motor controlling system of the invention is applied, and in FIGS. 62 to 67, like parts or components are denoted by like reference symbols to those of FIGS. 58 to 61. Referring to FIGS. 62 to 67, a centrifugal switch body 208 is secured to a rotary shaft 201 of a motor and accordingly is rotated together with a rotor of the motor. An annular permanent magnet 202 is located around the center of the centrifugal switch 200.

Figure 62:
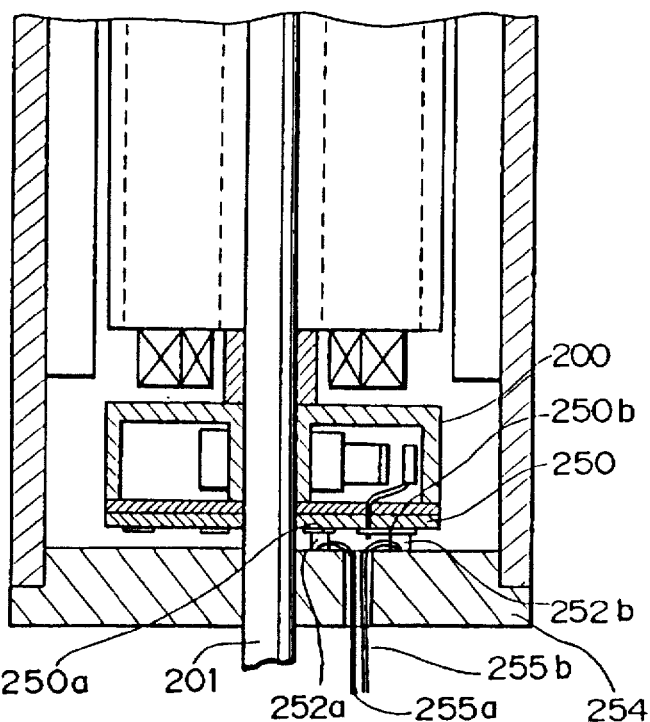
FIG. 62 is a longitudinal sectional view of a dc motor showing a fifth embodiment of motor controlling system of the invention.
Figure 65:
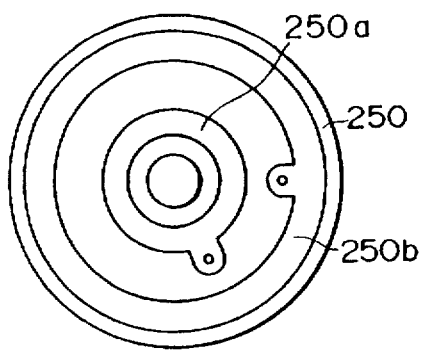
FIG. 65 is a bottom plan view of a rotary disk of the motor controlling system of FIG. 62.

The centrifugal switch includes a centrifugal switch contact 203 secured to the switch body 208 by means of a fastening screw 203a and connected to a ring-shaped pattern 250a on a rotary disk 250 as shown in FIGS. 62 and 65. Another switch contact 207 is secured similarly to the switch body 208 by means of a fastening screw 207a and connected to another ring-shaped pattern 250b on the rotary disk 250.

The centrifugal switch contact 203 has at an end thereof a contact member 205 for contacting with the switch contact 207. The switch contact 203 further has a weight member 204 for centrifugally moving the switch contact 203 effectively in a radially outward direction. The weight member 204 has a property of being attracted by the annular permanent magnet 202 and may naturally be a permanent magnet itself. Thus, the centrifugal switch contact 203 has the contact member 205 thereon normally spaced away from the switch contact 207 by a spring force of the switch contact 203 itself and an attracting force between the weight member 204 and the annular permanent magnet 202. A pair of sliding contacts 252a, 252b are secured at one ends thereof to a bottom wall 254 of the motor and are slidably contacted at the opposite ends thereof with the ring-shaped patterns 250a, 250b on the rotary disk 250, respectively.

Figure 63:
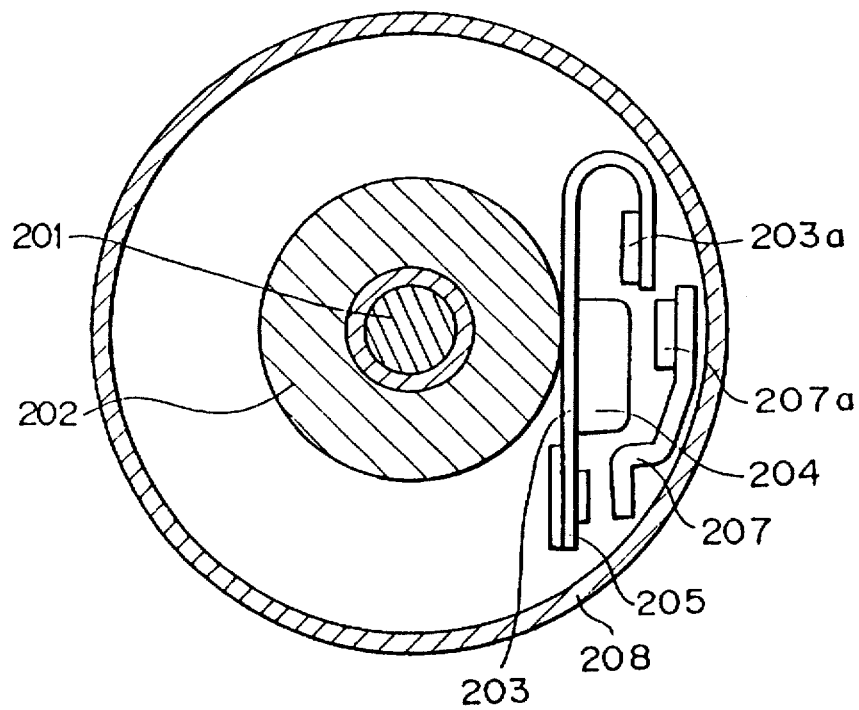
FIG. 63 is a transverse sectional view of the motor of FIG. 62 showing a modified centrifugal switch at a normal inoperative position.

While the rotational frequency and hence the rotational speed of the centrifugal switch body 208 are sufficiently low, the centrifugal force acting on the weight member 204 is smaller than the sum total of the spring force of the centrifugal switch contact 203 and the attracting force acting between the annular permanent magnet 202 and the weight member 204 so that the contact member 205 is spaced away from the contact 207 as seen in FIG. 63. In this instance, the ring-shaped patterns 250a, 250b are not electrically connected to each other.

Figure 64:
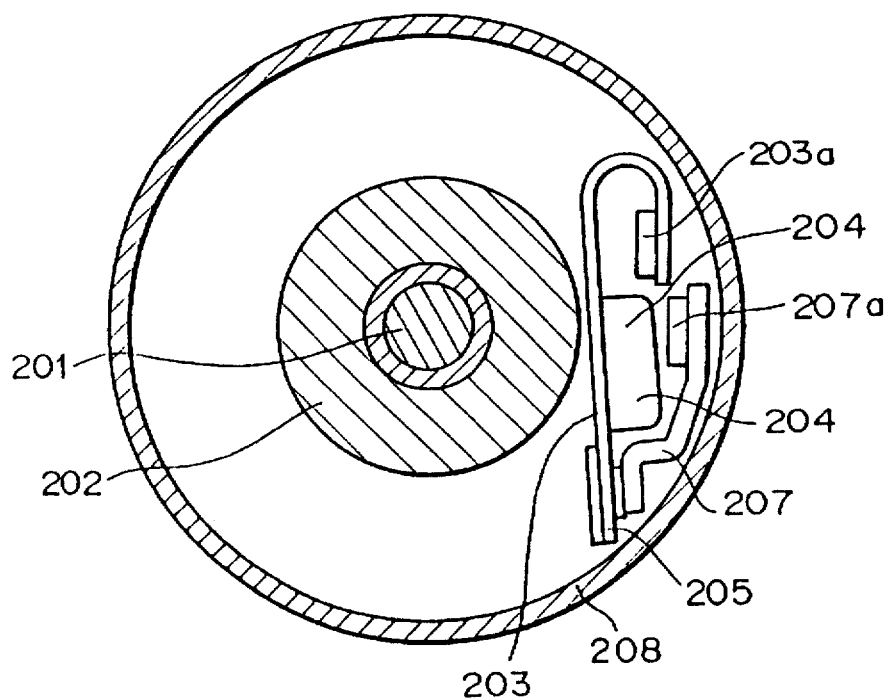
FIG. 64 is a similar view but showing the modified centrifugal switch at an actuated operative position.

Meanwhile, if the rotational speed of the centrifugal switch body 208 rises until the centrifugal force acting on the weight member 204 becomes greater than a resultant force of the spring force of the centrifugal switch contact 203 and the attracting force acting between the annular permanent magnet 202 and the weight member 204, then the contact member 205 of the centrifugal switch contact 203 is contacted with and electrically connected to the switch contact 207 (refer to FIG. 64). Consequently, the ring-shaped patterns 250a and 250b are electrically connected to each other and accordingly the sliding contacts 252a and 252b are electrically connected to each other.

The sliding contacts 252a, 252b are connected to leads 255a, 255b, respectively, so that electric connection and disconnection thereof may be transmitted to a circuit outside the motor.

If the rotational speed of the motor drops due to increase of a load applied to the motor or by some other reason until the spring force of the centrifugal switch contact 203 becomes relatively greater than the centrifugal force acting on the weight member 204, the contact member 205 will be moved away from the switch contact 207.

Figure 67:
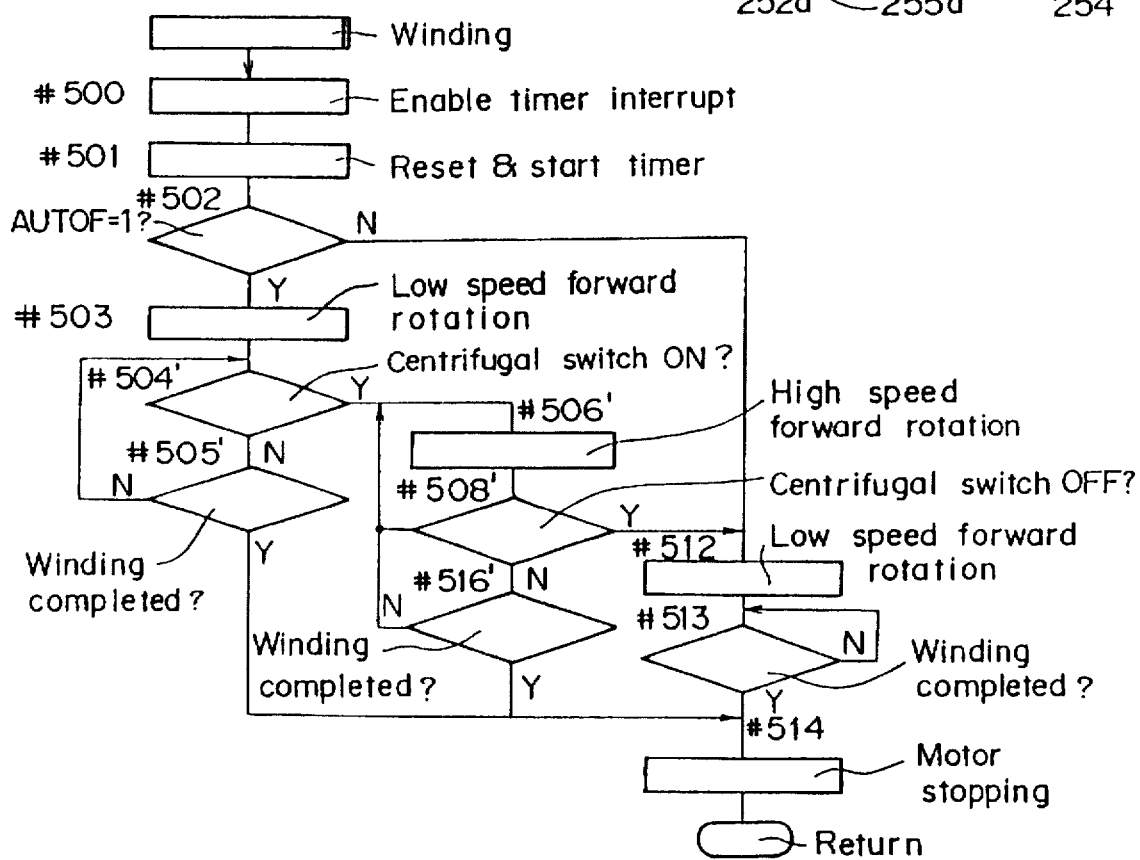
FIG. 67 is a flow chart illustrating a winding subroutine of the motor controlling system of FIG. 62.
Figure 66:
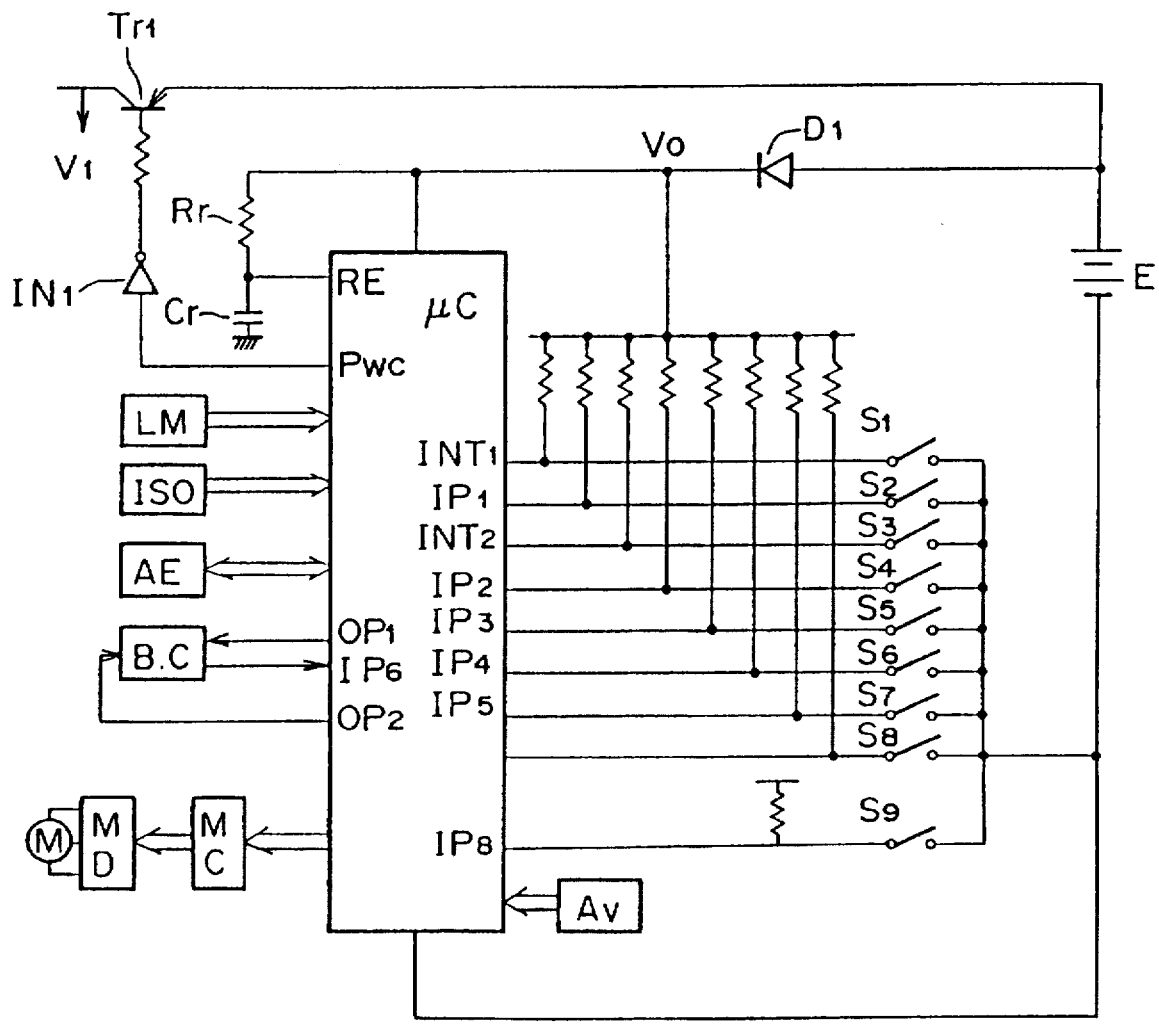
FIG. 66 is a circuit diagram showing an modified electric circuit of the motor controlling system of FIG. 62.

Construction of a motor driving circuit wherein the centrifugal switch of FIGS. 62 to 65 is employed is shown in FIG. 66, and operation of the motor driving circuit is illustrated in a flow chart of FIG. 67. It is to be noted that the circuit of FIG. 66 is a modification to the circuit of FIG. 23 while the flow chart of FIG. 67 is a modification to the flow chart of FIG. 41. Accordingly, description of like components and like steps of operation which are denoted by like reference numerals or symbols will be omitted herein to avoid redundancy.

Referring to FIG. 66, it can be seen that an additional switch $S_9$ is provided. This switch $S_9$ corresponds to a switch including the switch contacts 205, 207 described above.

Referring now to FIG. 67, it can be seen that the steps #502 to #516 of the routine of FIG. 41 are replaced by a significantly reduced number of steps. In particular, in case the auto flag AUTOF indicating that the voltage of the power source is higher than a predetermined voltage level at which change-over of the speed of the motor is allowed is in the set state at step #502, the motor is controlled at step #503 to rotate in a low speed high torque condition in the forward direction whereafter the microcomputer µC waits at step #504' until the centrifugal switch $S_9$ is turned on. Then, when the centrifugal switch $S_9$ is turned on, the motor is changed over at step #506' to rotate in a high speed low torque condition in the forward rotation. Thus, if winding of a film is completed during the high speed low torque forward rotation of the motor, which is determined at step #516' within a loop including the steps #506', #508' and #516', then the motor is stopped at step #514. On the other hand, if the load applied to the motor increases during the high speed low torque forward rotation of the motor so that the rotational speed is reduced until the centrifugal switch $S_9$ is turned off, which is determined at step #508' within the loop, then the motor is controlled at step #512 to rotate at a low speed in the forward direction again in order to complete the intended winding of the film.

In this manner, where a centrifugal switch such as the centrifugal switch 200 of the embodiments of FIGS. 58 to 61 and FIGS. 62 to 67 is incorporated in a dc motor, the number of steps of operation in a routine of a microcomputer can be reduced significantly.

As apparent from the foregoing description, according to the present invention, a dc motor can be changed over between a high speed low torque rotational condition and a low speed high torque rotational condition by change-over of electrical connection thereof. Accordingly, a driving force of the motor can be utilized effectively with a simple and compact mechanical construction of the motor. Besides, according to a motor controlling system of the present invention, the driving condition of the dc motor can be changed over in response to a given condition of the motor. Accordingly, the motor can be driven with high efficiency.

What is claimed is:

1. A dc motor, comprising:

a first coil;

a first commutator mounted for rotation and connected to said first coil;

a first brush mounted for contacting with said first commutator;

a second coil;

a second commutator mounted for rotation and connected to said second coil;

a second brush mounted for contacting with said second commutator;

a rotary motor shaft for transmitting rotational power to the outside of said motor;

said first commutator and brush and said second commutator and brush being located adjacent only one of the opposite ends of said rotary motor shaft and said two commutators are arranged side by side in a direction of extension of the rotary motor shaft; and power transmitting lines connected to said first and second brushes and said lines extending from the outside to the inside of said dc motor through a portion adjacent one end of said rotary motor shaft.

2. A dc motor according to claim 1, wherein said second coil is wound in an overlapping relationship around said first coil.

3. A dc motor according to claim 2, wherein said motor further comprises an iron core on which said first coil is wound.

4. A dc motor according to claim 1, wherein said first commutator and brush and said second commutator and brushare located adjacent the same end of said rotary motor shaft with said power transmitting means.

5. A dc motor according to claim 1, wherein said first commutator and brush and said second commutator and brush are located adjacent opposite ends of said rotary motor shaft with said first and second coils interposed therebetween respectively.

6. A dc motor, comprising:

a first coil;

a first commutator mounted for rotation and connected to said first coil;

a first brush mounted for contacting with said first commutator;

a second coil;

a second commutator mounted for rotation and connected to said second coil;

a second brush mounted for contacting with said second commutator; and a rotary motor shaft for transmitting a rotational power to the outside of said motor;

said first and second coils being wound in a juxtaposed relationship about a radial axis of said rotary motor shaft.

7. A dc motor according to claim 6, further comprising power transmitting means which transmits electric power from a portion of said motor adjacent an end of said rotary motor shaft to said first and second brushes.

8. A dc motor according to claim 7, wherein said first commutator and brush and said second commutator and brush are located adjacent the same end of said rotary motor shaft with said power transmitting means.

9. A dc motor according to claim 6, further comprising power transmitting means which transmits electric power from portions of said motor adjacent opposite ends of said rotary motor shaft to said first and second brushes.

10. A dc motor according to claim 9, wherein said first commutator and brush and said second commutator and brush are located adjacent the opposite ends of said rotary motor shaft with said first and second coils interposed therebetween, respectively.

11. A dc motor, comprising:

a first coil;

a first commutator mounted for rotation and connected to said first coil;

a first brush mounted in contacting relationship with said first commutator;

a second coil;

a second commutator mounted for rotation and connected to said second coil;

a second brush mounted in contacting relationship with said second commutator;

a rotary motor shaft for transmitting rotational power; and said first and second coils are wound alternately in a radial direction of said rotary motor shaft.

12. A dc motor according to claim 11, further comprising power transmitting means which transmits electric power from a portion of said motor adjacent an end of said rotary motor shaft to said first and second brushes.

13. A dc motor according to claim 12, wherein said first commutator and brush and said second commutator and brush are located adjacent the same end of said rotary motor shaft with said power transmitting means.

14. A dc motor according to claim 11, further comprising power transmitting means which transmits electric power from portions of said motor adjacent opposite ends of said rotary motor shaft to said first and second brushes.

15. A dc motor according to claim 14, wherein said first commutator and brush and said second commutator and brush are located adjacent the opposite ends of said rotary motor shaft with said first and second coils interposed therebetween, respectively.

16. A dc motor, comprising:

a first coil;

a first commutator mounted for rotation and connected to said first coil;

a first brush mounted for contacting with said first commutator;

a second coil;

a second commutator mounted for rotation and connected to said second coil;

a second brush mounted for contacting with said second commutator;

a rotary motor shaft for transmitting rotational power to the outside of said motor; and said first commutator and brush and said second commutator and brush being located adjacent only one of the opposite ends of said rotary motor shaft and said two commutators are arranged side by side in a direction of extension of the rotary motor shaft.

17. A dc motor according to claim 16, wherein said first commutator and brush and said second commutator and brush are located at axially separated positions on said rotary motor shaft.

18. A dc motor according to claim 16, wherein said first commutator has a greater length along an axial direction of said rotary motor shaft than said second commutator, and said second commutator is located outside and around said first commutator.

19. A dc motor according to claim 16, further comprising a housing including a cover located adjacent an axial end of said rotary motor shaft, said housing further including a cylindrical member having a side wall portion and an integral cover portion which is located adjacent the other axial end of said rotary motor shaft.

20. A dc motor according to claim 19, wherein electric power is supplied from an external power source to said dc motor via said cover.

* * * * *

UNITED STATES PATENT AND TRADEMARK OFFICE
CERTIFICATE OF CORRECTION

PATENT NO.    : 5,798,625
DATED         : August 25, 1998
INVENTOR(S)   : Junichi Tanii et al.

It is certified that error appears in the above-indentified patent and that said Letters Patent is hereby corrected as shown below:

On title page, item:

[62] Division of Ser. No. 727,101, July 9, 1991, Pat. No. 5,461,694, which is a continuation of Ser. No. 023,847, March 9, 1987, now Pat. No. 5,123,079.

Signed and Sealed this

Fourteenth Day of September, 1999

Attest:

Q. TODD DICKINSON

*Attesting Officer*   *Acting Commissioner of Patents and Trademarks*